(12) United States Patent
van den Berg et al.

(10) Patent No.: US 11,551,131 B2
(45) Date of Patent: Jan. 10, 2023

(54) HAMILTONIAN SIMULATION BASED ON SIMULTANEOUS-DIAGONALIZATION

(71) Applicant: International Business Machines Corporation, Armonk, NY (US)

(72) Inventors: Ewout van den Berg, Bronxville, NY (US); Paul Kristan Temme, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 377 days.

(21) Appl. No.: 16/803,076

(22) Filed: Feb. 27, 2020

(65) Prior Publication Data

US 2021/0272000 A1 Sep. 2, 2021

(51) Int. Cl.
*G06N 10/20* (2022.01)
*G06N 10/00* (2022.01)
(Continued)

(52) U.S. Cl.
CPC ............. *G06N 10/00* (2019.01); *G06F 7/723* (2013.01); *G06F 9/30029* (2013.01);
(Continued)

(58) Field of Classification Search
CPC ........ G06N 10/00; G06N 10/20; G06F 7/723; G06F 9/30029; G06F 17/16; G06F 30/20; G06F 2111/10; G06F 2111/08
See application file for complete search history.

(56) References Cited

U.S. PATENT DOCUMENTS 9,819,347 B2 11/2017 Hastings et al.
11,348,027 B1 * 5/2022 Huang .................. G06N 10/70
(Continued)

OTHER PUBLICATIONS

Gokhale et al., Minimizing State Preparations in Variational Quantum Eigensolver by Partitioning into Commuting Families, Aug. 1, 2019, pp. 1-24 (Year: 2019).*
(Continued)

*Primary Examiner* — Nghia M Doan
(74) *Attorney, Agent, or Firm* — Amin, Turocy & Watson, LLP

(57) ABSTRACT

Systems and techniques that facilitate Hamiltonian simulation based on simultaneous-diagonalization are provided. In various embodiments, a partition component can partition one or more Pauli operators of a Hamiltonian into one or more subsets of commuting Pauli operators. In various embodiments, a diagonalization component can generate one or more simultaneous-diagonalization circuits corresponding to the one or more subsets. In various aspects, a one of the one or more simultaneous-diagonalization circuits can diagonalize the commuting Pauli operators in a corresponding one of the one or more subsets. In various embodiments, an exponentiation component can generate one or more exponentiation circuits corresponding to the one or more subsets. In various aspects, a one of the one or more exponentiation circuits can exponentiate the simultaneously diagonalized commuting Pauli operators in a corresponding one of the one or more subsets. In various embodiments, a simulation component can concatenate the one or more simultaneous-diagonalization circuits, the one or more exponentiation circuits, and one or more adjoints of the one or more simultaneous-diagonalization circuits of the one or more subsets to simulate a time evolution of the Hamiltonian.

20 Claims, 38 Drawing Sheets

(51) Int. Cl.
  *G06F 7/72*    (2006.01)
  *G06F 17/16*   (2006.01)
  *G06F 9/30*    (2018.01)
  *G06F 30/20*   (2020.01)
  *G06F 111/10*  (2020.01)

(52) U.S. Cl.
  CPC .............. *G06F 17/16* (2013.01); *G06F 30/20* (2020.01); *G06F 2111/10* (2020.01)

(56) References Cited

U.S. PATENT DOCUMENTS

2018/0269906 A1* 9/2018 Haah ...................... G06N 10/70
2019/0354897 A1* 11/2019 Horesh .................. G06N 20/00

OTHER PUBLICATIONS

Jena, Partitioning Pauli Operators: in Theory and in Practice, 2019, pp. i-35 (Year: 2019).*
Mell et al., "The NIST Definition of Cloud Computing," Recommendations of the National Institute of Standards and Technology, NIST Special Publication 800-145, Sep. 2011, 7 pages.
Harrow, "Applications of coherent classical communication and the Schur transform to quantum information theory," arXiv:quant-ph/0512255, Dec. 30, 2005, 178 pages.
Gokhale et al., "Minimizing State Preparations in Variational Quantum Eigensolver by Partitioning into Commuting Families," arXiv:1907.13623v1 [quant-ph], Jul. 31, 2019, 23 pages.
Tranter et al., "Ordering of Trotterization: Impact on Errors in Quantum Simulation of Electronic Structure," arXiv:1912.07555v1 [quant-ph], Dec. 17, 2019, 36 pages.
Aaronson et al., "Improved Simulation of Stabilizer Circuits," arXiv:quant-ph/0406196, 2004, 15 pages.
Aleksandrowicz et al., "Qiskit: An Open-source Framework for Quantum Computing," https://zenodo.org/record/2562111#.XIQIX2g3ng, 2019, 5 pages.
Berlekamp, "The Technology of Error-Correcting Codes," Proceedings of the IEEE, vol. 68, Issue 5, 1980, 30 pages.
Berry et al., "Black-box Hamiltonian simulation and unitary implementation," Quantum Information & Computation, arXiv:0910.4157 [quant-ph], 2012, 19 pages.
Berry et al., "Simulating Hamiltonian dynamics with a truncated Taylor series," Physical Review Letters, arXiv:1412.4687 [quant-ph], 5 pages.
Bollobas, "Modern Graph Theory," Graduate Texts in Mathematics, 2013, 412 pages.
Bravyi et al., "Fermionic quantum computation," Annals of Physics, arXiv:quant-ph/0003137, 2002, 18 pages.
Childs et al., "Toward the first quantum simulation with quantum speedup," PNAS, arXiv:1711.10980 [quant-ph], 2018, 63 pages.
Childs et al., "Hamiltonian Simulation Using Linear Combinations of Unitary Operations," Quantum Information & Computation, arXiv:1202.5822 [quant-ph], Feb. 27, 2012, 18 pages.
Choo et al., "Fermionic neural-network states for ab-initio electronic structure," arXiv:1909.12852, Sep. 27, 2019, 6 pages.
Feynman, "Simulating Physics with Computers," International Journal of Theoretical Physics, vol. 21, Nos. 6-7, 1982, 22 pages.
Garcia et al., "Efficient Inner-product Algorithm for Stabilizer States," arXiv:1210.6646, Aug. 7, 2013, 14 pages.
Gottesman, "The Heisenberg Representation of Quantum Computers," Proceedings of the 22nd International Colloquium on Group Theoretical Methods in Physics, arXiv:quant-ph/9807006, 1998, 20 pages.
Hagberg et al., "Exploring network structure, dynamics, and function using NetworkX," Proceedings of the 7th Python in Science Conference, Aug. 2008, 6 pages.
Horn et al., "Matrix Analysis," 1985, 662 pages.
Jordan et al., "Uber das Paulische Aquivalenzverbot," Zeitschrift fur Physik, Jan. 26, 1928, 21 pages.
Lloyd, "Universal quantum simulators," Science, vol. 273, Aug. 23, 1996, 6 pages.
Hao et al., "Optimal Hamiltonian Simulation by Quantum Signal Processing," Physical Review Letters, arXiv:1606.02685v2 [quant-ph], 2017, 6 pages.
Nielsen et al., "Quantum Computation and Quantum Information," 2010, 710 pages.
Patel et al., "Optimal synthesis of linear reversible circuits," Quantum Information and Computation, vol. 8, Nos. 3 & 4, 2008, 13 pages.
Sarkar et al., "On sets of commuting and anticommuting Paulis," arXiv:1909.08123, Nov. 12, 2019, 14 pages.
Suzuki, "General theory of fractal path integrals with applications to many-body theories and statistical physics," Journal of Mathematical Physics, Feb. 1991, 9 pages.
Szabo et al., "Modern Quantum Chemistry: Introduction to Advanced Electronic Structure Theory," 1989, 481 pages.
Tranter et al., "A comparison of the Bravyi-Kitaev and Jordan-Wigner transformations for the quantum simulation of quantum chemistry," Journal of Chemical Theory and Computation, arXiv:1812.02233 [quant-ph], 46 pages.
Trotter, "On the product of semi-groups of operators," Proceedings of the American Mathematical Society, vol. 10, Issue 4, 1959, 7 pages.
Crawford et al., "Efficient quantum measurement of Pauli operators," arXiv:1908.06942 [quant-ph], Aug. 19, 2019, 15 pages.

* cited by examiner

Algorithm 1 Diagonalization of the X block.

Input: the input to this function is a tableau $T = [X, Z, S]$ of size $m \times 2n + 1$, consisting of the X and Z blocks, as well as a sign vector $S$. We use the convention that indexing of the X or Z blocks corresponds to indexing the tableau at the corresponding location. Swapping or sweeping rows applies to the entire tableau. Swapping columns $i$ and $j$ means swapping these columns in both the X and Z blocks.

1: $k \leftarrow 1$
2: repeat
3:    Search for index $(i, j)$ with $k \leq i \leq m$ and $k \leq j \leq n$ such that $X[i, j] = 1$
4:    if (index found) then
5:      Swap rows $i$ and $k$; swap columns $j$ and $k$
6:      for $i \in [m]$ such that $i \neq k$ and $X[i, k] = 1$ do
7:        Sweep row $i$ with row $k$
8:      end for
9:      $k \leftarrow k + 1$
10:    end if
11: until (index could not be found)
12: $k_z \leftarrow k$
13: repeat
14:    Search for index $(i, j)$ with $k \leq i \leq m$ and $k \leq j \leq n$ such that $Z[i, j] = 1$
15:    if (index found) then
16:      Swap rows $i$ and $k$; swap columns $j$ and $k$
17:      for $i \in [m]$ such that $i \neq k$ and $Z[i, k] = 1$ do
18:        Sweep row $i$ with row $k$
19:      end for
20:      $k \leftarrow k + 1$
21:    end if
22: until (index could not be found)
23: for $j \in \{k_z, \ldots, k - 1\}$ do
24:    Apply gate $H(j)$
25: end for
26: for $i \in \{1, \ldots, k\}$ and $j \in \{k, \ldots, n\}$ such that $X[i, j] = 1$ do
27:    Apply gate $CNOT(i, j)$
28: end for

Algorithm 2 Pairwise update of Z, clear X.
Input: Tableau $T$ with diagonal $X$ of rank $k$.
1: for $i \in \{2, \ldots, k\}$ do
2:     for $j \in \{1, \ldots, i-1\}$ do
3:         Apply $CZ(i,j)$ if $Z[i,j] = 1$
4:     end for
5: end for
6: for $i \in \{1, \ldots, k\}$ do
7:     Apply $S(i)$ if $Z[i,i] = 1$
8:     Apply $H(i)$
9: end for

---
Algorithm 3 Update of Z using CNOT operations, clear X.
---
Input: Tableau $T$ with diagonal $X$ of rank $k$.
1:  for $i \in \{1,\ldots,k\}$ do
2:     if $\left(\sum_{j=i}^{i} Z[i,j] \text{ is even}\right)$ then
3:        Apply $S(i)$
4:     end if
5:     for $j \in \{1,\ldots,i-1\}$ do
6:        if $Z[i,j] = 1$ then
7:           Apply CNOT$(i,j)$
8:           Sweep row $i$ with row $j$
9:        end if
10:    end for
11: end for
12: for $i \in \{1,\ldots,k\}$ do
13:    Apply $S(i)$, $H(i)$
14: end for
---

FIG. 14

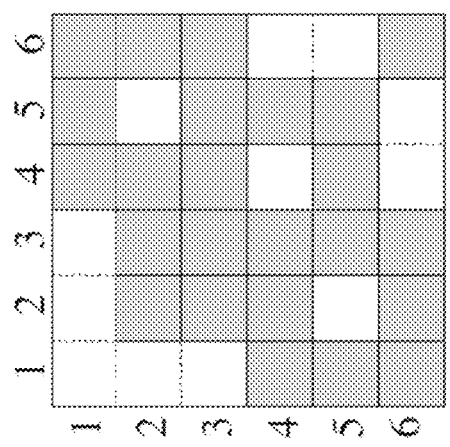
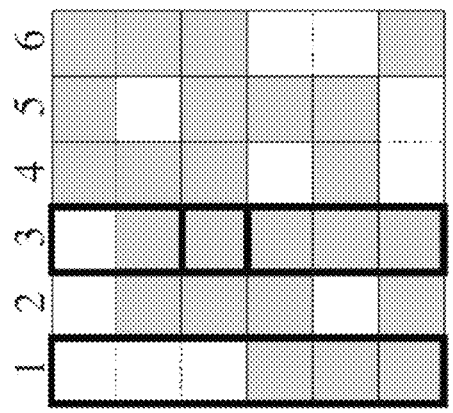
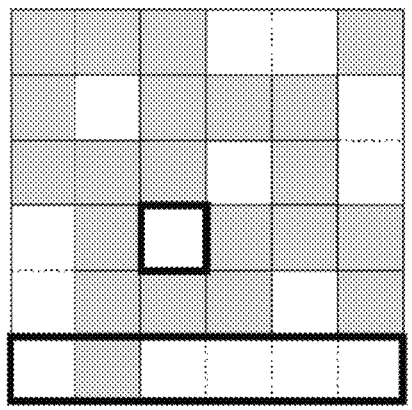
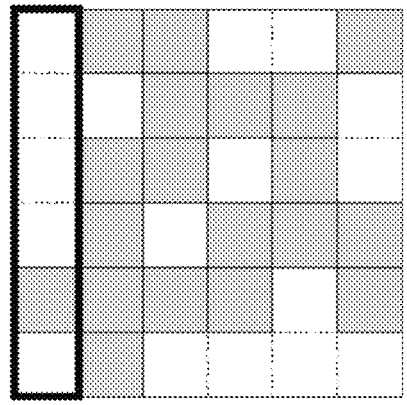
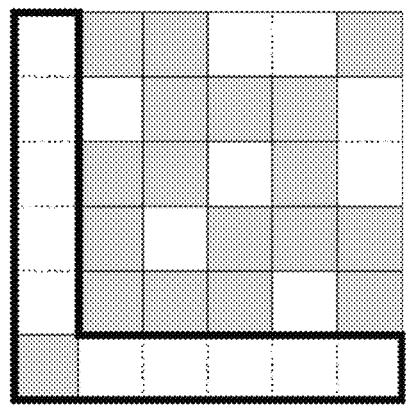
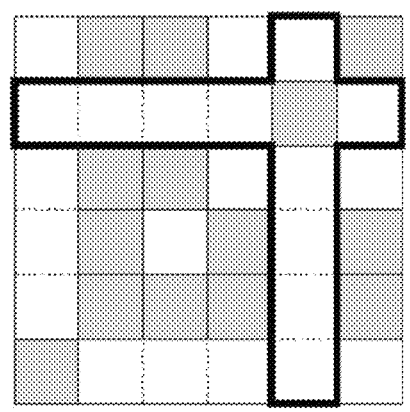
FIG. 16

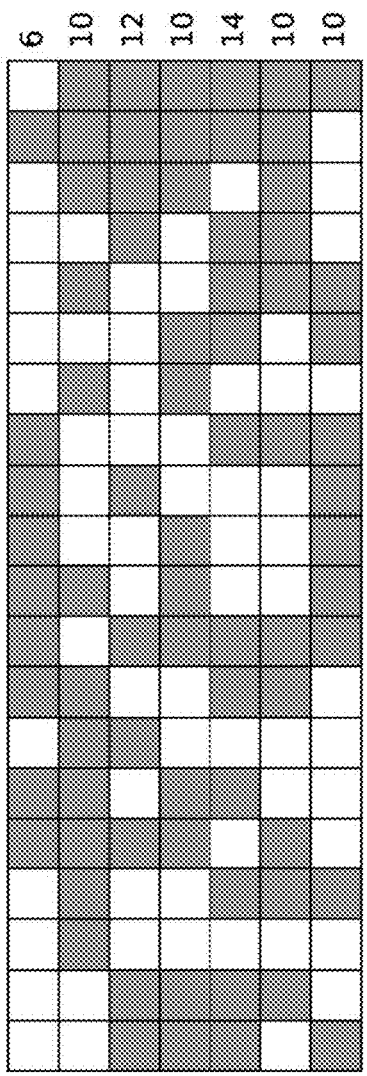
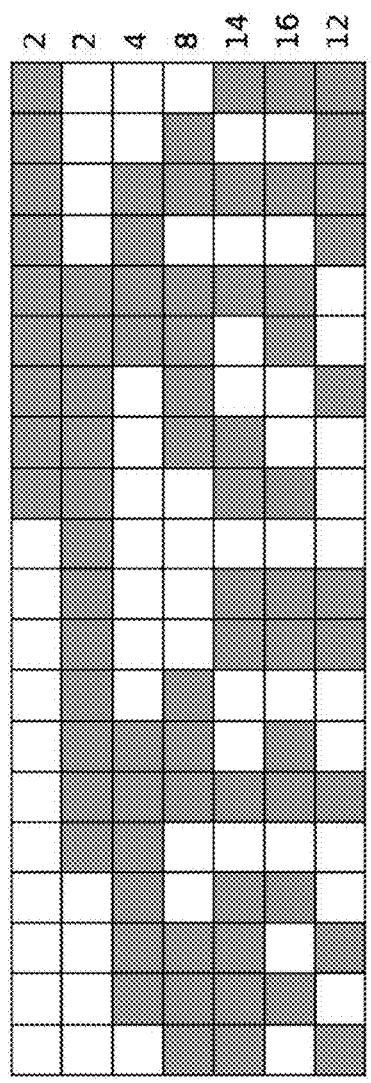
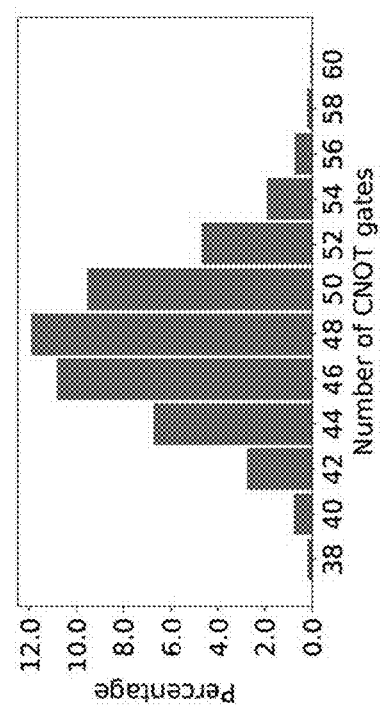
FIG. 17

← 2600

| n | Algorithm | Circuit U | | | Simulation | | | | Simulation (optimized) | | | |
|---|---|---|---|---|---|---|---|---|---|---|---|---|
| | | | | | CNOT | | | | CNOT | | | |
| | | cnot | single | depth | total | exp. | single | depth | total | exp. | single | depth |
| 5 | gmc | 6 | 12 | 8 | 28 | 16 | 28 | 34 | 25 | 13 | 28 | 32 |
| | cz | 5 | 11 | 8 | 25 | 15 | 27 | 33 | 23 | 13 | 27 | 32 |
| | cnot | 5 | 14 | 7 | 25 | 15 | 33 | 33 | 23 | 13 | 33 | 32 |
| | cnot-log2 | 4 | 14 | 7 | 25 | 17 | 33 | 33 | 22 | 14 | 33 | 31 |
| | cnot-best | 4 | 14 | 7 | 24 | 16 | 33 | 32 | 22 | 14 | 33 | 31 |
| | greedy-1 | 4 | 11 | 8 | 22 | 14 | 28 | 32 | 21 | 13 | 28 | 31 |
| | greedy-2 | 4 | 9 | 6 | 23 | 15 | 23 | 31 | 21 | 13 | 23 | 29 |
| | direct | — | — | — | 30 | 30 | 34 | 43 | 28 | 28 | 33 | 40 |
| 10 | gmc | 25 | 28 | 17 | 106 | 56 | 66 | 94 | 95 | 45 | 66 | 84 |
| | cz | 22 | 23 | 16 | 103 | 56 | 57 | 92 | 89 | 45 | 57 | 82 |
| | cnot | 22 | 26 | 14 | 103 | 56 | 63 | 89 | 90 | 46 | 63 | 80 |
| | cnot-log2 | 21 | 26 | 15 | 96 | 54 | 63 | 90 | 87 | 45 | 63 | 81 |
| | cnot-best | 19 | 26 | 15 | 93 | 55 | 63 | 90 | 84 | 46 | 63 | 82 |
| | greedy-1 | 14 | 25 | 17 | 86 | 58 | 60 | 95 | 74 | 46 | 60 | 83 |
| | greedy-2 | 14 | 21 | 18 | 85 | 57 | 53 | 95 | 74 | 46 | 53 | 84 |
| | direct | — | — | — | 118 | 118 | 123 | 142 | 109 | 109 | 114 | 132 |
| 15 | gmc | 58 | 45 | 24 | 234 | 118 | 104 | 174 | 216 | 100 | 104 | 157 |
| | cz | 51 | 35 | 23 | 221 | 119 | 85 | 172 | 202 | 100 | 85 | 154 |
| | cnot | 52 | 38 | 23 | 225 | 121 | 92 | 174 | 205 | 101 | 92 | 157 |
| | cnot-log2 | 48 | 38 | 26 | 217 | 121 | 92 | 181 | 198 | 102 | 92 | 163 |
| | cnot-best | 45 | 38 | 27 | 210 | 120 | 92 | 183 | 191 | 101 | 92 | 165 |
| | greedy-1 | 32 | 40 | 29 | 184 | 120 | 94 | 186 | 162 | 98 | 94 | 165 |
| | greedy-2 | 32 | 35 | 31 | 182 | 118 | 85 | 189 | 163 | 99 | 85 | 171 |
| | direct | — | — | — | 256 | 256 | 268 | 292 | 234 | 234 | 244 | 270 |
| 20 | gmc | 102 | 62 | 33 | 414 | 210 | 144 | 287 | 388 | 184 | 144 | 262 |
| | cz | 96 | 46 | 32 | 402 | 210 | 112 | 286 | 376 | 184 | 112 | 260 |
| | cnot | 95 | 51 | 31 | 398 | 208 | 123 | 281 | 373 | 183 | 123 | 258 |
| | cnot-log2 | 90 | 51 | 35 | 388 | 208 | 123 | 289 | 364 | 184 | 123 | 266 |
| | cnot-best | 82 | 51 | 43 | 372 | 208 | 123 | 306 | 348 | 184 | 123 | 282 |
| | greedy-1 | 58 | 56 | 47 | 326 | 210 | 133 | 313 | 296 | 180 | 133 | 284 |
| | greedy-2 | 56 | 51 | 47 | 322 | 210 | 123 | 314 | 292 | 180 | 123 | 284 |
| | direct | — | — | — | 458 | 458 | 459 | 505 | 424 | 424 | 423 | 468 |
| 25 | gmc | 151 | 81 | 41 | 626 | 324 | 186 | 417 | 586 | 284 | 186 | 380 |
| | cz | 147 | 60 | 40 | 617 | 323 | 144 | 416 | 578 | 284 | 144 | 380 |
| | cnot | 150 | 63 | 40 | 630 | 330 | 150 | 423 | 590 | 290 | 150 | 386 |
| | cnot-log2 | 142 | 63 | 51 | 614 | 330 | 150 | 444 | 573 | 289 | 150 | 408 |
| | cnot-best | 129 | 63 | 62 | 588 | 330 | 150 | 466 | 548 | 290 | 150 | 420 |
| | greedy-1 | 92 | 74 | 69 | 506 | 322 | 173 | 472 | 470 | 286 | 173 | 438 |
| | greedy-2 | 92 | 66 | 71 | 510 | 320 | 157 | 481 | 469 | 285 | 157 | 440 |
| | direct | — | — | — | 707 | 707 | 714 | 784 | 651 | 651 | 660 | 708 |

---
Algorithm 4 Random generator sets for commuting Paulis.
---
Input: Pauli size $n$.
1: Initialize an empty tableau $T = [X, Z]$ with blocks of size $n \times n$
2: for $i \in [n]$ do
3:     Draw integer $r$ uniformly at random from $[0, \ldots, 2^{n+1-i}]$
4:     Set $X[i, i] = 1$
5:     if $r = 2^{n+1-i}$ then
6:         Exchange $X[i, i]$ and $Z[i, i]$
7:     else
8:         for $j \in [i, n]$ do
9:             Set $Z[i, j] = Z[j, i] = (r \bmod 2)$
10:            $r \leftarrow \lfloor r/2 \rfloor$
11:        end for
12:     end if
13: end for
14: Return the tableau with random signs
---

| m | Algorithm | CNOT count | | | Single qubit | | | Depth | | |
|---|---|---|---|---|---|---|---|---|---|---|
| | | base | opt | md | base | opt | md | base | opt | md |
| 3 | cz | 74 | 75 | 72 | 38 | 38 | 38 | 65 | 66 | 62 |
| | cnot | 74 | 75 | 72 | 43 | 43 | 43 | 65 | 66 | 62 |
| | cnot-log2 | 74 | 75 | 72 | 43 | 43 | 43 | 65 | 66 | 63 |
| | cnot-best | 74 | 75 | 72 | 43 | 43 | 43 | 65 | 66 | 62 |
| | greedy-1 | 74 | 75 | 72 | 39 | 39 | 39 | 65 | 66 | 62 |
| | greedy-2 | 74 | 76 | 72 | 38 | 38 | 38 | 64 | 66 | 61 |
| | direct | 77 | 77 | 76 | 77 | 78 | 76 | 85 | 84 | 84 |
| 10 | cz | 227 | 214 | 201 | 72 | 72 | 72 | 159 | 147 | 135 |
| | cnot | 227 | 212 | 200 | 76 | 76 | 76 | 158 | 146 | 132 |
| | cnot-log2 | 225 | 210 | 198 | 76 | 76 | 76 | 159 | 147 | 134 |
| | cnot-best | 220 | 208 | 194 | 76 | 76 | 76 | 163 | 151 | 137 |
| | greedy-1 | 212 | 201 | 186 | 79 | 79 | 79 | 162 | 152 | 137 |
| | greedy-2 | 211 | 199 | 185 | 72 | 72 | 72 | 165 | 153 | 138 |
| | direct | 236 | 220 | 203 | 242 | 221 | 204 | 259 | 244 | 226 |
| 50 | cz | 702 | 602 | 569 | 142 | 142 | 142 | 616 | 518 | 483 |
| | cnot | 701 | 589 | 566 | 153 | 153 | 153 | 614 | 505 | 480 |
| | cnot-log2 | 691 | 580 | 556 | 153 | 153 | 153 | 621 | 512 | 489 |
| | cnot-best | 675 | 564 | 544 | 153 | 153 | 153 | 638 | 529 | 508 |
| | greedy-1 | 626 | 526 | 491 | 163 | 163 | 163 | 643 | 546 | 508 |
| | greedy-2 | 628 | 525 | 488 | 153 | 153 | 153 | 650 | 548 | 510 |
| | direct | 1134 | 1005 | 959 | 1152 | 1018 | 977 | 1251 | 1117 | 1068 |
| 200 | cz | 2209 | 1601 | 1544 | 292 | 292 | 292 | 2273 | 1668 | 1600 |
| | cnot | 2186 | 1598 | 1536 | 303 | 303 | 303 | 2249 | 1664 | 1601 |
| | cnot-log2 | 2177 | 1588 | 1522 | 303 | 303 | 303 | 2257 | 1671 | 1605 |
| | cnot-best | 2161 | 1572 | 1506 | 303 | 303 | 303 | 2273 | 1688 | 1622 |
| | greedy-1 | 2123 | 1518 | 1457 | 313 | 313 | 313 | 2290 | 1690 | 1625 |
| | greedy-2 | 2128 | 1518 | 1459 | 303 | 303 | 303 | 2300 | 1692 | 1631 |
| | direct | 4526 | 3708 | 3714 | 4574 | 3823 | 3752 | 4986 | 4238 | 4151 |

Algorithm 5 Normalization of full-rank tableau.

Input: Full-rank tableau $T = [X, Z]$ with block size $m \times n$ such that $m \geq n$.

1: Initialize $\mathcal{I} = \emptyset$
2: for $k \in [n]$ do
3:     Search for index $i$ with $i \geq k$ such that $X[i, k] = 1$
4:     if index not found then
5:         $\mathcal{I} \leftarrow \mathcal{I} \cup \{k\}$
6:         Exchange $X[:, k]$ and $Z[:, k]$
7:         Search for index $i$ with $i \geq k$ such that $X[i, k] = 1$
8:     end if
9:     Swap rows $i$ and $k$
10:    for $j \in [m]$ such that $j \neq k$ and $X[j, k] = 1$ do
11:        Sweep row $j$ with row $k$
12:    end for
13: end for
14: Return the updated tableau along with $\mathcal{I}$.

FIG. 30

| Mol. | basis | # | paulis | rep. | largest first | | | independent set | | | sequential | | |
|---|---|---|---|---|---|---|---|---|---|---|---|---|---|
| BeH$_2$ | STO3g | 14 | 666 | BK | 33 | 19 | 54 | 23 | 22 | 106 | 32 | 14 | 106 |
|  |  |  |  | JW | 33 | 19 | 52 | 25 | 16 | 106 | 31 | 14 | 106 |
|  |  |  |  | P | 37 | 16 | 47 | 21 | 27 | 106 | 31 | 13 | 106 |
| C$_2$ | STO3g | 20 | 3079 | BK | 68 | 28 | 204 | 68 | 35 | 211 | 75 | 34 | 211 |
|  |  |  |  | JW | 63 | 36 | 204 | 70 | 34 | 211 | 76 | 33 | 177 |
|  |  |  |  | P | 63 | 32 | 204 | 74 | 30 | 211 | 79 | 26 | 211 |
| H$_2$O | 6-31G* | 36 | 41915 | BK | 483 | 68 | 667 | -- | -- | -- | 414 | 76 | 667 |
|  |  |  |  | JW | 460 | 68 | 667 | -- | -- | -- | 426 | 75 | 667 |
|  |  |  |  | P | 469 | 68 | 667 | -- | -- | -- | 422 | 74 | 667 |
| H$_2$O | 6-31G | 26 | 12732 | BK | 204 | 50 | 352 | 210 | 46 | 352 | 202 | 45 | 352 |
|  |  |  |  | JW | 204 | 50 | 352 | 199 | 49 | 352 | 193 | 50 | 352 |
|  |  |  |  | P | 193 | 56 | 342 | 204 | 46 | 352 | 202 | 46 | 352 |
| H$_2$O | STO3g | 14 | 1086 | BK | 48 | 23 | 72 | 43 | 20 | 106 | 47 | 20 | 106 |
|  |  |  |  | JW | 48 | 23 | 72 | 45 | 18 | 106 | 49 | 16 | 106 |
|  |  |  |  | P | 48 | 23 | 75 | 44 | 18 | 106 | 45 | 20 | 106 |
| H$_2$O | ccpvdz | 48 | 128793 | BK | -- | -- | -- | -- | -- | -- | 796 | 116 | 1177 |
|  |  |  |  | JW | -- | -- | -- | -- | -- | -- | 802 | 114 | 1177 |
|  |  |  |  | P | -- | -- | -- | -- | -- | -- | 821 | 112 | 1177 |
| H$_2$ | 6-31G | 8 | 185 | BK | 9 | 20 | 32 | 8 | 20 | 37 | 9 | 16 | 37 |
|  |  |  |  | JW | 9 | 20 | 29 | 8 | 20 | 37 | 11 | 16 | 37 |
|  |  |  |  | P | 10 | 16 | 29 | 8 | 20 | 37 | 9 | 16 | 37 |
| H$_2$ | STO3g | 4 | 15 | BK | 2 | 7 | 11 | 2 | 7 | 11 | 2 | 7 | 11 |
|  |  |  |  | JW | 2 | 7 | 11 | 2 | 7 | 11 | 2 | 7 | 11 |
|  |  |  |  | P | 2 | 7 | 11 | 2 | 7 | 11 | 2 | 7 | 11 |
| HCl | STO3g | 20 | 5851 | BK | 117 | 42 | 199 | 149 | 33 | 211 | 126 | 33 | 211 |
|  |  |  |  | JW | 113 | 38 | 184 | 144 | 34 | 211 | 125 | 36 | 211 |
|  |  |  |  | P | 115 | 40 | 192 | 147 | 32 | 211 | 123 | 36 | 211 |
| LiH | STO3g | 12 | 631 | BK | 38 | 10 | 68 | 25 | 25 | 79 | 38 | 12 | 79 |
|  |  |  |  | JW | 38 | 11 | 62 | 24 | 24 | 79 | 35 | 12 | 79 |
|  |  |  |  | P | 38 | 10 | 68 | 24 | 25 | 79 | 37 | 10 | 79 |
| NH$_3$ | STO3g | 16 | 3057 | BK | 92 | 24 | 137 | 86 | 28 | 137 | 96 | 26 | 137 |
|  |  |  |  | JW | 93 | 22 | 137 | 87 | 28 | 137 | 94 | 24 | 137 |
|  |  |  |  | P | 96 | 25 | 137 | 85 | 28 | 137 | 93 | 26 | 137 |

FIG. 31

| Method | BeH$_2$ sto-3g | C$_2$ 6-31g | H$_2$O sto-3g | H$_2$O 6-31g | H$_2$O 4-31g | H$_2$O cc-pvdz | H$_2$ sto-3g | H$_2$ 6-31g | HCl sto-3g | LiH sto-3g | NH$_3$ sto-3g |
|---|---|---|---|---|---|---|---|---|---|---|---|
| cz | 2,162 | 10,232 | 177,800 | 45,956 | 3,370 | 621,416 | 438 | 28 | 19,236 | 1,980 | 9,272 |
| cz-rnd | 1,870 | 8,920 | 150,568 | 39,086 | 2,884 | 507,468 | 392 | 28 | 16,536 | 1,678 | 7,980 |
| cnot | 2,968 | 14,856 | 311,792 | 71,412 | 4,402 | 1,177,624 | 530 | 34 | 28,156 | 2,616 | 12,672 |
| cnot-log2 | 2,888 | 14,672 | 308,400 | 70,482 | 4,314 | 1,168,166 | 512 | 32 | 27,864 | 2,552 | 12,516 |
| cnot-best | 2,852 | 14,534 | 305,228 | 69,792 | 4,258 | 1,159,544 | 498 | 32 | 27,472 | 2,508 | 12,360 |
| greedy-1 | 2,152 | 10,190 | 176,174 | 45,830 | 3,372 | 614,688 | 438 | 28 | 19,084 | 1,980 | 9,216 |
| greedy-2 | 2,226 | 10,358 | 180,292 | 46,496 | 3,412 | 628,566 | 434 | 30 | 19,606 | 2,036 | 9,354 |
| direct | 3,662 | 19,732 | 366,152 | 94,394 | 6,210 | 1,284,042 | 896 | 40 | 39,274 | 3,276 | 14,462 |
| direct-rnd | 3,352 | 19,390 | 365,486 | 93,864 | 5,750 | 1,283,034 | 744 | 36 | 38,894 | 2,882 | 14,052 |

CNOT count

| Method | BeH$_2$ | C$_2$ | H$_2$O | H$_2$O | H$_2$O | H$_2$O | H$_2$ | H$_2$ | HCl | LiH | NH$_3$ |
|---|---|---|---|---|---|---|---|---|---|---|---|
| cz | 2,632 | 12,252 | 197,968 | 53,748 | 4,144 | 675,152 | 597 | 45 | 23,071 | 2,476 | 11,463 |
| cz-rnd | 2,228 | 10,860 | 169,937 | 46,762 | 3,645 | 558,418 | 547 | 45 | 20,282 | 2,164 | 10,112 |
| cnot | 3,374 | 16,289 | 305,025 | 74,961 | 5,145 | 1,124,391 | 695 | 61 | 30,689 | 3,087 | 14,531 |
| cnot-log2 | 3,346 | 16,262 | 306,391 | 75,050 | 5,118 | 1,130,922 | 701 | 60 | 30,746 | 3,058 | 14,469 |
| cnot-best | 3,317 | 16,196 | 306,892 | 74,851 | 5,097 | 1,135,219 | 697 | 60 | 30,583 | 3,047 | 14,414 |
| greedy-1 | 2,639 | 12,343 | 200,344 | 54,211 | 4,170 | 689,060 | 598 | 45 | 23,135 | 2,484 | 11,511 |
| greedy-2 | 2,706 | 12,418 | 204,638 | 54,827 | 4,165 | 704,256 | 585 | 45 | 23,574 | 2,503 | 11,549 |
| direct | 5,148 | 26,591 | 468,176 | 124,024 | 8,640 | 1,604,480 | 1,297 | 67 | 52,855 | 4,689 | 19,896 |
| direct-rnd | 4,818 | 26,216 | 467,617 | 123,631 | 8,243 | 1,603,611 | 1,140 | 63 | 52,427 | 4,248 | 19,365 |

Circuit depth

| cz | 1,442 | 6,197 | 77,687 | 23,704 | 2,376 | 223,043 | 411 | 25 | 11,527 | 1,345 | 6,179 |
| cz-rnd | 1,442 | 6,197 | 77,687 | 23,704 | 2,376 | 223,043 | 411 | 25 | 11,527 | 1,345 | 6,179 |
| cnot | 2,582 | 10,105 | 117,795 | 37,168 | 4,056 | 323,863 | 733 | 67 | 18,555 | 2,425 | 10,259 |
| cnot-log2 | 2,582 | 10,105 | 117,795 | 37,168 | 4,056 | 323,863 | 733 | 67 | 18,555 | 2,425 | 10,259 |
| cnot-best | 2,582 | 10,105 | 117,795 | 37,168 | 4,056 | 323,863 | 733 | 67 | 18,555 | 2,425 | 10,259 |
| greedy-1 | 1,192 | 5,401 | 65,891 | 20,440 | 2,050 | 193,249 | 339 | 21 | 10,045 | 1,117 | 5,551 |
| greedy-2 | 1,398 | 5,623 | 67,945 | 21,112 | 2,236 | 194,863 | 403 | 25 | 10,411 | 1,321 | 5,667 |
| direct | 3,920 | 21,393 | 328,223 | 93,220 | 6,880 | 1,036,434 | 1,001 | 45 | 41,249 | 3,577 | 17,097 |
| direct-rnd | 3,696 | 21,014 | 327,977 | 93,138 | 6,436 | 1,036,486 | 935 | 43 | 40,833 | 3,165 | 16,621 |
| cz | 1,472 | 6,367 | 80,767 | 24,726 | 2,352 | 228,193 | 281 | 19 | 11,787 | 1,411 | 5,747 |
| cz-rnd | 1,472 | 6,367 | 80,767 | 24,726 | 2,352 | 228,193 | 281 | 19 | 11,787 | 1,411 | 5,747 |
| cnot | 2,642 | 10,589 | 118,335 | 38,334 | 4,088 | 326,919 | 657 | 71 | 18,995 | 2,577 | 10,811 |
| cnot-log2 | 2,642 | 10,589 | 118,335 | 38,334 | 4,088 | 326,919 | 657 | 71 | 18,995 | 2,577 | 10,811 |
| cnot-best | 2,642 | 10,589 | 118,335 | 38,334 | 4,088 | 326,919 | 657 | 71 | 18,995 | 2,577 | 10,811 |
| greedy-1 | 1,328 | 5,901 | 80,063 | 23,966 | 2,194 | 232,743 | 281 | 19 | 11,105 | 1,281 | 5,759 |
| greedy-2 | 1,402 | 6,339 | 80,657 | 24,824 | 2,302 | 232,527 | 281 | 19 | 11,721 | 1,425 | 5,959 |
| direct | 4,258 | 22,530 | 369,157 | 105,192 | 7,262 | 1,206,990 | 619 | 19 | 44,943 | 3,667 | 15,715 |
| direct-rnd | 3,732 | 22,071 | 368,375 | 104,296 | 6,610 | 1,206,104 | 531 | 19 | 44,080 | 3,349 | 15,150 |
| cz | 1,366 | 6,195 | 79,305 | 24,224 | 2,034 | 231,859 | 297 | 19 | 10,737 | 1,243 | 5,757 |
| cz-rnd | 1,366 | 6,195 | 79,305 | 24,224 | 2,034 | 231,859 | 297 | 19 | 10,737 | 1,243 | 5,757 |
| cnot | 2,646 | 10,719 | 118,173 | 38,272 | 4,020 | 329,561 | 623 | 71 | 18,259 | 2,689 | 10,371 |
| cnot-log2 | 2,646 | 10,719 | 118,173 | 38,272 | 4,020 | 329,561 | 623 | 71 | 18,259 | 2,689 | 10,371 |
| cnot-best | 2,646 | 10,719 | 118,173 | 38,272 | 4,020 | 329,561 | 623 | 71 | 18,259 | 2,689 | 10,371 |
| greedy-1 | 1,334 | 6,391 | 85,931 | 25,296 | 2,046 | 256,419 | 313 | 19 | 11,353 | 1,199 | 6,089 |
| greedy-2 | 1,414 | 6,693 | 85,821 | 25,728 | 2,158 | 253,069 | 309 | 19 | 11,595 | 1,295 | 6,145 |
| direct | 3,710 | 20,131 | 340,708 | 95,026 | 6,020 | 1,115,800 | 625 | 19 | 39,977 | 3,277 | 15,926 |
| direct-rnd | 3,392 | 19,599 | 340,765 | 94,680 | 5,678 | 1,115,394 | 559 | 19 | 39,058 | 2,841 | 14,978 |

Single-qubit count

| Method | BeH$_2$ STO3G | C$_2$ 6-31G* | H$_2$O STO3G | H$_2$O 6-31G | H$_2$O 6-31G* | H$_2$O cc-pVDZ | H$_2$ 6-31G | H$_2$ 6-31G* | HCl STO3G | LiH STO3G | NH$_3$ STO3G |
|---|---|---|---|---|---|---|---|---|---|---|---|
| cz | 2,162 | 10,232 | 177,800 | 45,956 | 3,370 | 621,416 | 438 | 28 | 19,336 | 1,980 | 9,272 |
| greedy-1 | 2,152 | 10,190 | 176,174 | 45,830 | 3,272 | 614,688 | 438 | 28 | 19,084 | 1,980 | 9,216 |
| greedy-2 | 2,226 | 10,358 | 180,292 | 46,496 | 3,412 | 628,566 | 434 | 30 | 19,606 | 2,036 | 9,354 |
| direct | 3,062 | 19,732 | 366,152 | 94,394 | 6,210 | 1,284,042 | 896 | 40 | 39,274 | 3,276 | 14,462 |
| cz | 2,682 | 14,492 | 237,834 | 63,612 | 4,316 | 758,514 | 478 | 24 | 27,238 | 2,602 | 12,524 |
| greedy-1 | 2,618 | 13,932 | 223,076 | 61,042 | 4,264 | 692,734 | 478 | 24 | 26,114 | 2,552 | 12,144 |
| greedy-2 | 2,678 | 14,056 | 228,688 | 62,740 | 4,380 | 704,886 | 450 | 24 | 26,672 | 2,566 | 12,238 |
| direct | 4,162 | 23,032 | 391,524 | 108,832 | 7,256 | 1,301,306 | 788 | 30 | 46,888 | 3,862 | 15,928 |
| cz | 2,778 | 13,350 | 230,076 | 61,308 | 4,302 | 777,212 | 488 | 26 | 24,086 | 2,492 | 12,122 |
| greedy-1 | 2,716 | 12,628 | 211,004 | 57,628 | 4,260 | 714,516 | 484 | 26 | 23,182 | 2,442 | 11,658 |
| greedy-2 | 2,792 | 12,696 | 217,898 | 59,424 | 4,226 | 734,266 | 486 | 26 | 23,792 | 2,450 | 11,730 |
| direct | 4,250 | 22,062 | 423,198 | 111,836 | 6,964 | 1,509,184 | 844 | 32 | 45,018 | 3,658 | 16,434 | sequential

| Method | BeH$_2$ STO3G | C$_2$ 6-31G* | H$_2$O STO3G | H$_2$O 6-31G | H$_2$O 6-31G* | H$_2$O cc-pVDZ | H$_2$ 6-31G | H$_2$ 6-31G* | HCl STO3G | LiH STO3G | NH$_3$ STO3G |
|---|---|---|---|---|---|---|---|---|---|---|---|
| cz | 2,140 | 10,040 | 179,120 | 45,912 | 3,296 | — | 418 | 28 | 17,944 | 2,034 | 9,116 |
| greedy-1 | 2,136 | 9,966 | 177,984 | 46,080 | 3,286 | — | 418 | 28 | 17,738 | 2,032 | 9,082 |
| greedy-2 | 2,204 | 9,908 | 182,060 | 47,012 | 3,258 | — | 420 | 30 | 18,204 | 2,100 | 9,246 |
| direct | 3,542 | 19,512 | 378,236 | 95,912 | 5,920 | — | 864 | 40 | 38,596 | 3,296 | 14,730 |
| cz | 2,806 | 13,988 | 231,924 | 60,952 | 4,340 | — | 468 | 24 | 26,330 | 2,556 | 12,026 |
| greedy-1 | 2,752 | 13,500 | 222,066 | 58,570 | 4,276 | — | 468 | 24 | 25,474 | 2,536 | 11,728 |
| greedy-2 | 2,842 | 13,706 | 227,460 | 60,128 | 4,294 | — | 472 | 24 | 25,802 | 2,540 | 11,858 |
| direct | 4,340 | 23,018 | 395,596 | 108,644 | 7,064 | — | 788 | 30 | 46,152 | 3,904 | 16,154 |
| cz | 2,838 | 12,630 | 224,882 | 58,914 | 4,310 | — | 534 | 28 | 23,638 | 2,462 | 12,218 |
| greedy-1 | 2,724 | 12,208 | 210,390 | 55,478 | 4,260 | — | 520 | 28 | 22,656 | 2,404 | 11,684 |
| greedy-2 | 2,804 | 12,404 | 218,376 | 57,012 | 4,252 | — | 522 | 26 | 23,338 | 2,420 | 11,914 |
| direct | 4,168 | 21,594 | 438,016 | 111,836 | 7,066 | — | 802 | 32 | 44,208 | 3,570 | 16,320 | largest first

| Method | BeH$_2$ STO3G | C$_2$ 6-31G* | H$_2$O STO3G | H$_2$O 6-31G | H$_2$O 6-31G* | H$_2$O cc-pVDZ | H$_2$ 6-31G | H$_2$ 6-31G* | HCl STO3G | LiH STO3G | NH$_3$ STO3G |
|---|---|---|---|---|---|---|---|---|---|---|---|
| cz | 3,124 | 18,490 | — | 94,094 | 5,178 | — | 522 | 28 | 38,610 | 2,764 | 16,154 |
| greedy-1 | 2,862 | 16,528 | — | 84,402 | 4,754 | — | 500 | 28 | 32,648 | 2,476 | 14,572 |
| greedy-2 | 2,810 | 16,828 | — | 84,956 | 4,780 | — | 502 | 30 | 33,790 | 2,480 | 14,578 |
| direct | 4,596 | 26,876 | — | 144,680 | 7,708 | — | 940 | 48 | 55,002 | 4,142 | 19,480 |
| cz | 3,192 | 20,006 | — | 100,522 | 5,764 | — | 510 | 24 | 42,154 | 2,808 | 16,374 |
| greedy-1 | 2,968 | 18,214 | — | 90,070 | 5,434 | — | 504 | 24 | 37,584 | 2,706 | 15,110 |
| greedy-2 | 3,056 | 18,388 | — | 91,384 | 5,430 | — | 490 | 24 | 37,874 | 2,654 | 15,044 |
| direct | 5,028 | 29,124 | — | 145,340 | 8,500 | — | 876 | 30 | 59,796 | 4,582 | 19,402 |
| cz | 2,930 | 20,270 | — | 100,352 | 5,478 | — | 512 | 28 | 36,898 | 2,538 | 16,252 |
| greedy-1 | 2,774 | 17,724 | — | 88,224 | 5,136 | — | 520 | 26 | 34,820 | 2,434 | 14,686 |
| greedy-2 | 2,778 | 17,908 | — | 89,642 | 5,180 | — | 524 | 28 | 35,304 | 2,488 | 14,676 |
| direct | 4,938 | 28,008 | — | 149,600 | 8,164 | — | 820 | 32 | 57,350 | 4,274 | 20,216 | independent set

| Method | BeH$_2$ strong | C$_2$ strong | H$_2$O 6-31G | H$_2$O 6-31G | H$_2$O 6-31G | H$_2$O strong | H$_2$ 6-31G | H$_2$ strong | HCl strong | LiH strong | NH$_3$ strong |
|---|---|---|---|---|---|---|---|---|---|---|---|
| cz       | 2,632 | 12,252 | 197,968 | 53,748  | 4,144 | 675,152   | 597   | 45 | 23,071 | 2,476 | 11,463 |
| greedy-1 | 2,639 | 12,343 | 200,344 | 54,211  | 4,170 | 680,000   | 598   | 45 | 23,135 | 2,484 | 11,511 |
| greedy-2 | 2,706 | 12,418 | 204,638 | 54,827  | 4,165 | 704,256   | 585   | 45 | 23,574 | 2,509 | 11,549 |
| direct   | 5,148 | 26,591 | 468,176 | 124,024 | 8,640 | 1,604,480 | 1,297 | 67 | 52,855 | 4,689 | 19,896 |
| cz       | 3,106 | 15,385 | 232,718 | 66,870  | 5,031 | 713,895   | 665   | 40 | 29,451 | 3,012 | 14,476 |
| greedy-1 | 3,126 | 15,700 | 241,321 | 68,108  | 5,128 | 747,577   | 660   | 40 | 29,949 | 3,045 | 14,510 |
| greedy-2 | 3,127 | 15,778 | 246,652 | 69,765  | 5,170 | 761,281   | 682   | 40 | 30,479 | 3,035 | 14,575 |
| direct   | 5,462 | 28,930 | 480,574 | 135,023 | 9,339 | 1,579,383 | 1,082 | 47 | 58,898 | 5,055 | 20,482 |
| cz       | 3,211 | 14,547 | 222,324 | 64,066  | 5,067 | 723,084   | 675   | 42 | 27,072 | 2,972 | 14,006 |
| greedy-1 | 3,226 | 14,794 | 230,178 | 65,109  | 5,077 | 761,581   | 691   | 42 | 27,548 | 2,979 | 14,199 |
| greedy-2 | 3,263 | 15,023 | 236,216 | 66,650  | 5,078 | 783,561   | 685   | 42 | 28,017 | 2,942 | 14,081 |
| direct   | 5,482 | 27,492 | 505,346 | 135,925 | 8,905 | 1,768,728 | 1,109 | 49 | 55,852 | 4,816 | 20,747 | sequential

| Method | BeH$_2$ | C$_2$ | H$_2$O | H$_2$O | H$_2$O | H$_2$O | H$_2$ | H$_2$ | HCl | LiH | NH$_3$ |
|---|---|---|---|---|---|---|---|---|---|---|---|
| cz       | 2,637 | 12,047 | 202,774 | 54,350  | 4,114 | — | 578   | 45 | 22,043 | 2,526 | 11,410 |
| greedy-1 | 2,625 | 12,073 | 205,027 | 54,882  | 4,143 | — | 582   | 45 | 21,995 | 2,534 | 11,443 |
| greedy-2 | 2,669 | 11,976 | 208,817 | 55,735  | 4,169 | — | 567   | 45 | 22,348 | 2,572 | 11,541 |
| direct   | 5,056 | 25,724 | 472,407 | 124,417 | 8,341 | — | 1,201 | 67 | 51,747 | 4,720 | 19,977 |
| cz       | 3,240 | 15,164 | 235,537 | 65,397  | 5,087 | — | 658   | 40 | 29,047 | 2,976 | 14,158 |
| greedy-1 | 3,230 | 15,452 | 242,472 | 66,241  | 5,113 | — | 657   | 40 | 29,471 | 3,020 | 14,186 |
| greedy-2 | 3,267 | 15,697 | 248,194 | 67,843  | 5,102 | — | 659   | 40 | 29,650 | 2,988 | 14,238 |
| direct   | 5,623 | 28,708 | 481,724 | 134,483 | 9,149 | — | 1,084 | 47 | 58,032 | 5,176 | 20,661 |
| cz       | 3,243 | 14,178 | 226,834 | 63,108  | 5,056 | — | 723   | 42 | 26,766 | 2,962 | 14,132 |
| greedy-1 | 3,245 | 14,492 | 231,382 | 63,627  | 5,102 | — | 720   | 42 | 26,975 | 2,950 | 14,185 |
| greedy-2 | 3,319 | 14,760 | 239,250 | 65,045  | 5,151 | — | 713   | 42 | 27,483 | 2,953 | 14,233 |
| direct   | 5,421 | 26,792 | 514,274 | 124,821 | 9,000 | — | 1,082 | 49 | 54,649 | 4,717 | 20,585 | largest first

| Method | BeH$_2$ | C$_2$ | H$_2$O | H$_2$O | H$_2$O | H$_2$O | H$_2$ | H$_2$ | HCl | LiH | NH$_3$ |
|---|---|---|---|---|---|---|---|---|---|---|---|
| cz       | 3,445 | 17,245 | — | 81,963  | 5,575  | — | 666   | 45 | 34,713 | 3,150 | 16,186 |
| greedy-1 | 3,397 | 18,131 | — | 89,008  | 5,544  | — | 667   | 45 | 36,317 | 2,997 | 16,567 |
| greedy-2 | 3,316 | 18,485 | — | 90,229  | 5,521  | — | 645   | 45 | 36,636 | 2,996 | 16,682 |
| direct   | 5,688 | 31,457 | — | 162,892 | 9,457  | — | 1,241 | 73 | 63,628 | 5,135 | 23,380 |
| cz       | 3,369 | 18,867 | — | 87,745  | 6,058  | — | 686   | 40 | 38,437 | 3,167 | 16,917 |
| greedy-1 | 3,513 | 19,784 | — | 94,168  | 6,239  | — | 700   | 40 | 40,071 | 3,218 | 17,381 |
| greedy-2 | 3,559 | 20,031 | — | 96,185  | 6,153  | — | 673   | 40 | 40,559 | 3,151 | 17,357 |
| direct   | 6,172 | 33,873 | — | 164,848 | 10,275 | — | 1,156 | 47 | 68,945 | 5,638 | 23,333 |
| cz       | 3,338 | 18,886 | — | 90,278  | 5,920  | — | 681   | 42 | 37,505 | 3,002 | 16,932 |
| greedy-1 | 3,380 | 19,683 | — | 93,367  | 5,936  | — | 721   | 42 | 38,179 | 2,999 | 16,961 |
| greedy-2 | 3,304 | 19,882 | — | 95,243  | 5,956  | — | 720   | 42 | 38,644 | 3,070 | 16,893 |
| direct   | 6,068 | 32,496 | — | 168,310 | 9,856  | — | 1,082 | 49 | 66,235 | 5,335 | 24,195 | independent set

FIG. 34

HAMILTONIAN SIMULATION BASED ON SIMULTANEOUS-DIAGONALIZATION

BACKGROUND

The subject disclosure relates to Hamiltonian simulation, and more specifically to Hamiltonian simulation based on simultaneous-diagonalization.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate Hamiltonian simulation based on simultaneous-diagonalization are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a partition component that can partition one or more Pauli operators of a Hamiltonian into one or more subsets of commuting Pauli operators. In various embodiments, the computer-executable components can comprise a diagonalization component that can generate one or more simultaneous-diagonalization circuits corresponding to the one or more subsets. In various aspects, a one of the one or more simultaneous-diagonalization circuits can diagonalize the commuting Pauli operators in a corresponding one of the one or more subsets.

According to one or more embodiments, the above-described system can be implemented as a computer-implemented method and/or computer program product.

DESCRIPTION OF THE DRAWINGS

FIG. 11 illustrates an example, non-limiting algorithm for diagonalizing an X-block of a tableau in accordance with one or more embodiments described herein.

FIG. 13 illustrates an example, non-limiting algorithm for facilitating pairwise updating of a Z-block of a tableau in accordance with one or more embodiments described herein.

FIG. 14 illustrates an example, non-limiting algorithm for facilitating updating of a Z-block of tableau via CNOT operations in accordance with one or more embodiments described herein.

FIG. 16 illustrates example, non-limiting diagrams that depict normalization of a Z-block of a tableau in accordance with one or more embodiments described herein.

FIG. 17 illustrates example, non-limiting diagrams that depict CNOT reduction in accordance with one or more embodiments described herein.

FIGS. 26-35 illustrate exemplary, non-limiting experimental results and associated algorithms in accordance with one or more embodiments described herein.

DETAILED DESCRIPTION

Figure 1:
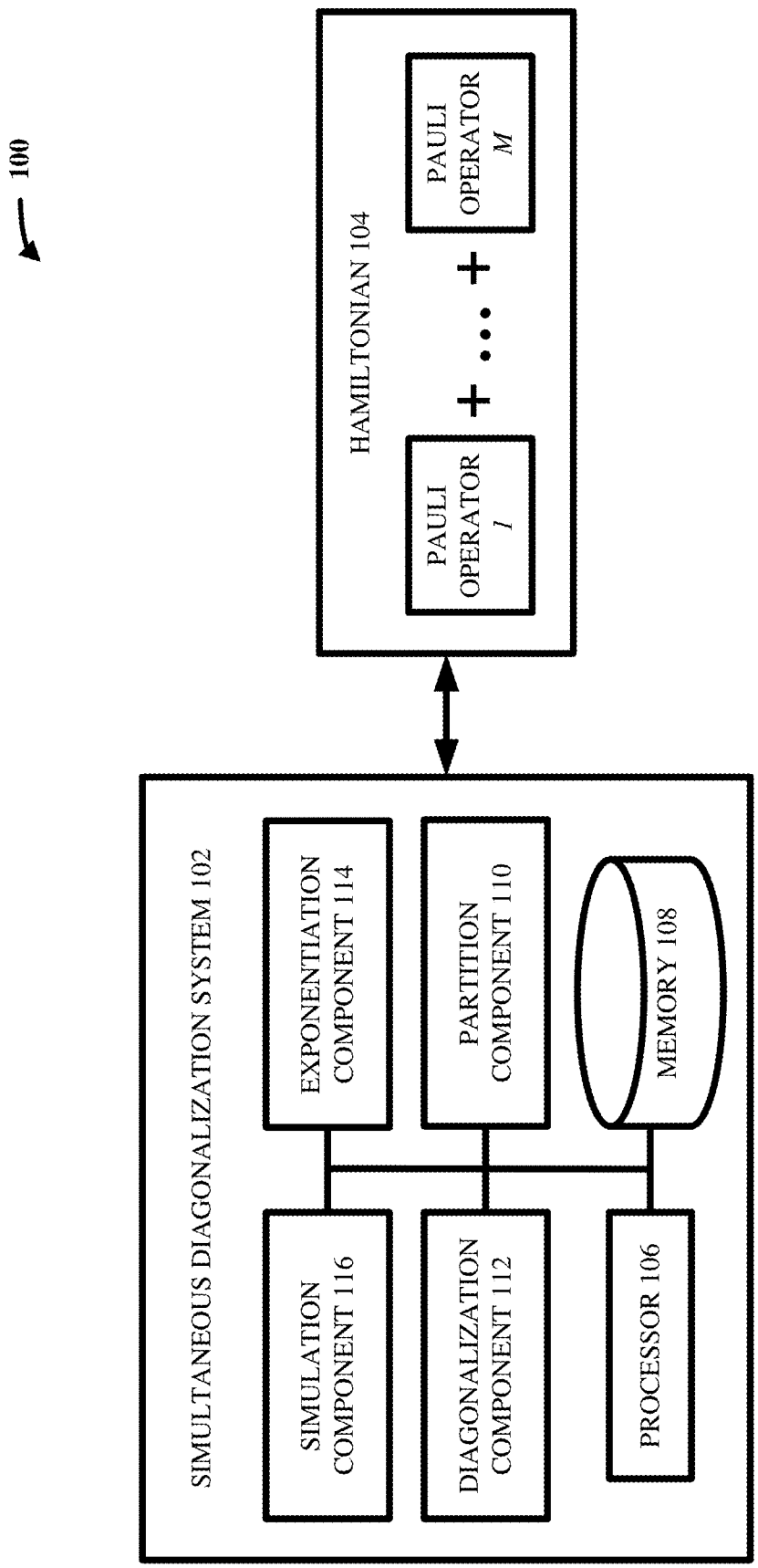
FIG. 1 illustrates a block diagram of an example, non-limiting system that facilitates Hamiltonian simulation based on simultaneous-diagonalization in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Simulation of quantum systems (e.g., quantum chemistry, molecular simulation) is an important application of quantum computers. This can be facilitated by simulating the time evolution of a Hamiltonian. The time evolution of a Hamiltonian H is given by $e^{itH}$, where $i=\sqrt{-1}$ and t represents time. Generally, the main challenge is to generate an efficient quantum circuit (e.g., sequence of quantum operators/matrices) that implements and/or closely approximates this time evolution. Various approaches have been developed for this task, such as product formulas, quantum walks, linear combinations of unitaries, truncated Taylor series, and quantum signal processing.

Product formulas can be applied when, as is often the case, the Hamiltonian can be decomposed as the sum $H=\Sigma_j H_j$, such that the time evolution of each of the terms $H_j$ is readily evaluated. Through successive application of the terms with appropriately chosen time steps, it is possible to simulate the original Hamiltonian H. For instance, using the Lie-Trotter product formula, the following obtains:

$$e^{itH} = \lim_{k \to \infty} \left( \prod_j e^{i(t/k)H_j} \right)^k$$

In the non-asymptotic regime, the Trotter scheme provides a first-order approximation, with the norm of the difference between the exact and approximate time evolution operators scaling as $O(t^2/k)$. More advanced higher-order schemes, such as those by Suzuki, are also available. The approximation errors arising in the use of product formulas are ultimately caused by non-commuting terms in the Hamiltonian.

Using a suitable transformation (e.g., Jordan-Wigner, Bravyi-Kitaev, parity encoding), a Hamiltonian H can be expressed as a weighted sum of Pauli operators $P_j$, such that $H=\Sigma_j \alpha_j P_j$ for any suitable weights $\alpha_j$. The goal is then to simulate the time evolution of the Hamiltonian H by generating quantum circuits that evaluate and/or approximate the expression $e^{itH}=e^{it\Sigma_j \alpha_j P_j}=e^{i\Sigma_j \theta_j P_j}$, where $\theta_j = t\alpha_j$. When given any set of mutually commuting Pauli operators $P_1$ through $P_m$, for any suitable integer m, the exponent of the sum is equal to products of the individual exponents, provided that the time slices for each operator add up to t. That is, it holds that $$e^{itH} = e^{i\sum_{j=1}^{m} \theta_j P_j} = \prod_{j=1}^{m} e^{i\theta_j P_j}$$

whenever the operators $P_j$ commute. Generally, this expression can be evaluated using Trotter-Suzuki type product formulas, which are based on direct exponentiation of each of the individual Pauli operators with suitably chosen simulation times. For instance, each term $e^{i\theta_j P_j}$ can be evaluated individually by generating a diagonalization circuit, an exponentiation circuit, and an adjoint diagonalization circuit for each $P_j$, and the product $\prod_{j=1}^{m} e^{i\theta_j P_j}$ can be evaluated by appropriately concatenating all those individual circuits together. The resultant quantum circuit can be applied to input qubits to simulate the time evolution of those qubits according to the given Hamiltonian H.

Various embodiments of the invention can improve (e.g., reduce) the overall complexity of such quantum circuits. Specifically, one or more embodiments of the invention can reduce depth and CNOT count (e.g., number of controlled NOT gates) of such quantum circuits. In other words, various embodiments of the invention can facilitate simulation of the time evolution of a Hamiltonian by using fewer quantum computing resources, which constitutes a concrete and technical improvement in computing efficiency.

As described herein, various embodiments of the invention can achieve these technical benefits by leveraging simultaneous-diagonalization of commuting Pauli operators (e.g., Pauli operators that commute with respect to matrix multiplication). As used herein, the term "simultaneous-diagonalization" can mean that, for a set of commuting Pauli operators, there exists at least one unitary operator that can diagonalize all the commuting Pauli operators in the set (e.g., for a set of 17 commuting Pauli operators, there exists a unitary operator that can diagonalize all 17 of the commuting Pauli operators; thus, diagonalization of all 17 of the commuting Pauli operators can be facilitated without having to generate 17 separate and/or different diagonalization operators). As explained below, when using product formulas to simulate Hamiltonians comprising sums of Pauli operators, it can be beneficial to partition the Pauli operators into one or more subsets of commuting Pauli operators. This is because products of exponentials of commuting Pauli operators can coincide with the exponential of the sum of the Pauli operators. Product formulas can then be applied to these partitioned operators, and exponentiation of each subset can be done exactly using the product of the individual terms within the subset. This can be done by exponentiating each term individually by rotating the basis such that the resulting operator consists of only identity and Pauli-Z operators, such that each term is diagonal. Circuits for exponentiation of the diagonal term are then readily available.

As explained herein, instead of diagonalizing each term independently, various embodiments of the invention can leverage the fact that commuting Pauli operators can be simultaneously diagonalized. That is, for a given set of commuting Pauli operators $P_j$ there exists an operator/circuit U such that $U^\dagger P_j U$ is diagonal for all elements $P_j$ in the set. In other words, for commuting Pauli operators, there is at least one diagonalization operator/circuit U that can diagonalize all of the commuting Pauli operators, such that different diagonalization operators are not required for each of the different commuting Pauli operators. Diagonalization for all the commuting Pauli operators can then be facilitated by applying U once, and then the diagonalized commuting Pauli operators can be exponentiated directly. After this, un-diagonalization can be facilitated by applying $U^\dagger$ (e.g., adjoint of U) once. Various techniques for constructing simultaneous-diagonalization circuits (e.g., for constructing U based on given commuting Pauli operators) are provided herein (e.g., based on stabilizer codes and/or Clifford operations). Moreover, various embodiments of the invention can utilize reordering of exponentiation circuits to further reduce circuit complexity.

Embodiments described herein include systems, computer-implemented methods, apparatus, and/or computer program products that facilitate Hamiltonian simulation (e.g., simulation of the time evolution of a Hamiltonian) based on simultaneous-diagonalization. In various embodiments, a Hamiltonian can be expressed as a weighted sum of Pauli operators. The four primary Pauli matrices are 2×2, complex, Hermitian, unitary matrices, which include:

$$\sigma_i = I = \begin{bmatrix} 1 & 0 \\ 0 & 1 \end{bmatrix}; \sigma_x = X = \begin{bmatrix} 0 & 1 \\ 1 & 0 \end{bmatrix};$$

$$\sigma_y = Y = \begin{bmatrix} 0 & -i \\ i & 0 \end{bmatrix}; \sigma_z = Z = \begin{bmatrix} 1 & 0 \\ 0 & -1 \end{bmatrix}$$

In various aspects, n-Pauli operators (referred to herein as Pauli operators for sake of brevity) can be $2^n \times 2^n$ matrices (e.g., so as to operate on n qubits) formed by applying the Kronecker product to a string of n 2×2 Pauli matrices, for any suitable integer n (e.g., $ZXIY = \sigma_z \otimes \sigma_x \otimes \sigma_i \otimes \sigma_y$ is $2^4 \times 2^4$ Pauli operator formed by the tensor product).

In various embodiments, a partition component can partition the Pauli operators of the Hamiltonian into one or more subsets of commuting Pauli operators. In other words, the partition component can separate into discrete subsets (e.g., discrete partitions, discrete groups) the Pauli operators of the Hamiltonian such that, for each subset, all the Pauli operators in the subset commute with each other. In various instances, the Hamiltonian can be expressed as a weighted sum of commuting Pauli operators (e.g., such that all the Pauli operators of the Hamiltonian commute with each other). In such cases, the set of Pauli operators can be considered a single subset. In various other instances, the Hamiltonian can be expressed as a weighted sum of Pauli operators, not all of which commute with each other. In such cases, the partition component can partition the Pauli operators into two or more subsets of commuting Pauli operators. For example, consider a Hamiltonian $H = P_1 + P_2 + P_3 + P_4 + P_5$. In this example, each Pauli operator is weighted equally for simplicity. However, in various instances, any suitable weights (e.g., $\alpha_j$) can be implemented. If all five of the Pauli operators commute with each other, then the partition component can partition the Pauli operators into a single subset (e.g., one subset containing $P_1$ to $P_5$). If, on the other hand, $P_1$, $P_2$, and $P_4$ commute with each other, $P_3$ and $P_5$ commute with each other, and $P_1$, $P_2$, and $P_4$ do not commute with $P_3$ and $P_5$, then the partition component can partition the Pauli operators into two subsets (e.g., a first subset containing $P_2$, and $P_4$ and a second subset containing $P_3$ and $P_5$). In various aspects, the partition component can reorder the Pauli operators in the sum to reflect such subsets (e.g., $H = P_1 + P_2 + P_4 + P_3 + P_5$).

In various embodiments, a diagonalization component can generate one or more simultaneous-diagonalization circuits (e.g., simultaneous-diagonalization operators/matrices) that correspond to the one or more subsets. That is, the diagonalization component can, in various cases, generate a simultaneous-diagonalization circuit U for each subset, such that the simultaneous-diagonalization circuit U diagonalizes all the commuting Pauli operators in the subset. To continue the above example where $H = P_1 + P_2 + P_3 + P_4 + P_5$ and where all five of the Pauli operators commute with each other, the diagonalization component can generate a single simultaneous-diagonalization matrix U, such that $U^\dagger P_1 U$ is diagonal, $U^\dagger P_2 U$ is diagonal, $U^\dagger P_3 U$ is diagonal, $U^\dagger P_4 U$ is diagonal, and $U^\dagger P_5 U$ is diagonal. On the other hand, consider the above example where $H = P_1 + P_2 + P_4 + P_3 + P_5$, where $P_1$, $P_2$, and $P_4$ are partitioned into a first subset (e.g., subset a), and where $P_3$ and $P_5$ are partitioned into a second subset (e.g., subset b). In such case, the diagonalization component can generate two simultaneous-diagonalization circuits $U_a$ and $U_b$, such that $U_a^\dagger P_1 U_a$ is diagonal, $U_a^\dagger P_2 U_a$ is diagonal, and $U_a^\dagger P_4 U_a$ is diagonal, and such that $U_b^\dagger P_3 U_b$ is diagonal and $U_b^\dagger P_5 U_b$ is diagonal. Various techniques for generating such simultaneous-diagonalization circuits are described herein (e.g., based on tableau representations). Note that in either example, fewer than five diagonalization circuits are required even though the Hamiltonian is the sum of five Pauli operators. Due to the fact that commuting Pauli operators can be simultaneously diagonalized (e.g., diagonalized by the same diagonalization circuit), a separate and/or unique diagonalization circuit/matrix/operator is not required for each Pauli operator of the Hamiltonian. Instead, the diagonalization component can generate a diagonalization circuit/matrix/operator for each subset of commuting Pauli operators, rather than for each individual Pauli operator. This can result in improved/reduced quantum circuit complexity (e.g., can make it easier to cancel unnecessary CNOT gates by reordering exponentials).

In various instances, the diagonalization component can generate the one or more simultaneous-diagonalization circuits such that the resulting diagonalized commuting Pauli operators are signed strings of identity and Pauli-Z matrices (e.g., such that $U_a^\dagger P_1 U_a$ is a string of $\sigma_i$ and/or $\sigma_z$ matrices with a ± sign, $U_a^\dagger P_2 U_a$ is a string of $\sigma_i$ and/or a matrices with a ± sign, $U_a^\dagger P_4 U_a$ is a string of $\sigma_i$ and/or $\sigma_z$ matrices with a ± sign, $U_b^\dagger P_3 U_b$ is a string of $\sigma_i$ and/or $\sigma_z$ matrices with a ± sign, and $U_b^\dagger P_5 U_b$ is a string of $\sigma_i$ and/or $\sigma_z$ matrices with a ± sign). Techniques for generating such simultaneous-diagonalization circuits are described herein.

In various embodiments, an exponentiation component can generate one or more exponentiation circuits (e.g., exponentiation operators/matrices) that can correspond to the one or more subsets. That is, the exponentiation component can, in various cases, generate an exponentiation circuit W for each subset, such that the exponentiation circuit W exponentiates the diagonalized commuting Pauli operators in the subset. In various embodiments, the exponentiation circuit W can be formed by generating an individual exponentiation circuit for each diagonalized commuting Pauli operator in the subset (e.g., exponentiating each diagonalized commuting Pauli operator individually in the subset) and appropriately concatenating those individual exponentiation circuits. For instance, consider the above example where $H=P_1+P_2+P_3+P_4+P_5$ and where all five of the Pauli operators commute with each other. In such case, the exponentiation component can generate an individual exponentiation circuit for each of the Pauli operators in the subset (e.g., generate a $W_1$ that exponentiates the diagonalized version of $P_1$, generate a $W_2$ that exponentiates the diagonalized version of $P_2$, generate a $W_3$ that exponentiates the diagonalized version of $P_3$, generate a $W_4$ that exponentiates the diagonalized version of $P_4$, and generate a $W_5$ that exponentiates the diagonalized version of $P_5$), and can appropriately concatenate those individual exponentiation circuits into an overall exponentiation circuit (e.g., $W=W_5W_4W_3W_2W_1$). Additionally, consider the above example where $H=P_1+P_2+P_4+P_3+P_5$, where $P_1$, $P_2$, and $P_4$ are partitioned into a first subset (e.g., subset a), and where $P_3$ and $P_5$ are partitioned into a second subset (e.g., subset b). In such case, the exponentiation component can generate an overall exponentiation circuit for each subset (e.g., $W_a$ to exponentiate the diagonalized commuting Pauli operators in subset a, and $W_b$ to exponentiate the diagonalized commuting Pauli operators in subset b). In various instances, the exponentiation component can generate these overall exponentiation circuits by generating and appropriately concatenating individual exponentiation circuits for each individual diagonalized Pauli operator in each subset (e.g., $W_a=W_{a4}W_{a2}W_{a1}$, where $W_{a4}$ exponentiates the diagonalized version of $P_4$, where $W_{a2}$ exponentiates the diagonalized version of $P_2$, and where $W_{a1}$ exponentiates the diagonalized version of $P_1$; and $W_b=W_{b5}W_{b3}$, where $W_{b5}$ exponentiates the diagonalized version of $P_5$, and where $W_{b3}$ exponentiates the diagonalized version of $P_3$).

In various embodiments, a simulation component can concatenate the one or more simultaneous-diagonalization circuits, the one or more exponentiation circuits, and one or more adjoints of the simultaneous-diagonalization circuits to simulate a time evolution of each subset.

Consider the above example where $H=P_1+P_2+P_3+P_4+P_5$ and where all five of the Pauli operators commute with each other. As explained above, the diagonalization component can generate the simultaneous-diagonalization circuit U and the exponentiation component can generate the exponentiation circuit $W=W_5W_4W_3W_2W_1$. In various aspects, the simulation component can simulate each individual Pauli operator by concatenating the simultaneous-diagonalization circuit U, the individual exponentiation circuit of the Pauli operator, and the adjoint of U. That is, the simulation component can form the circuit $U^\dagger W_1 U$ to simulate $P_1$, can form the circuit $U^\dagger W_2 U$ to simulate $P_2$, can form the circuit $U^\dagger W_3 U$ to simulate $P_3$, can form the circuit $U^\dagger W_4 U$ to simulate $P_4$, and can form the circuit $U^\dagger W_5 U$ to simulate $P_5$. In various aspects, the simulation component can appropriately concatenate these circuits to simulate the entire subset. That is, the simulation component can generate the following circuit:

$$U^\dagger W_5 U U^\dagger U U^\dagger W_3 U U^\dagger W_2 U U^\dagger W_1 U = U^\dagger W_5 W_4 W_3 W_2 W_1 U = U^\dagger WU$$

As shown, leveraging the fact that commuting Pauli operators can be simultaneously diagonalized allows for simplification of the quantum circuit that simulates the time evolution of the subset (e.g., since only one diagonalization circuit U is needed to diagonalize all of $P_1$ to $P_5$, the concatenation of the individual diagonalization and exponentiation circuits generates several repeating $UU^\dagger$ terms in the circuit, which can be eliminated since $UU^\dagger$ equals identity).

Consider the above example where $H=P_1+P_2+P_4+P_3+P_5$, where $P_1$, $P_2$, and $P_4$ are partitioned into a first subset (e.g., subset a), and where $P_3$ and $P_5$ are partitioned into a second subset (e.g., subset b). As explained above, the diagonalization component can generate the simultaneous-diagonalization circuits $U_a$ and $U_b$, and the exponentiation component can generate the exponentiation circuits $W_a=W_{a4}W_{a2}W_{a1}$ and $W_b=W_{b5}W_{b3}$. In various aspects, the simulation component can simulate each individual Pauli operator by concatenating the simultaneous-diagonalization circuit, the individual exponentiation circuit of the Pauli operator, and the adjoint of the simultaneous-diagonalization circuit. That is, the simulation component can form the circuit $U_a^\dagger W_{a1} U_a$ to simulate $P_1$, can form the circuit $U_a^\dagger W_{a2} U_a$ to simulate $P_2$, can form the circuit $U_a^\dagger W_{a4} U_a$ to simulate $P_4$, can form the circuit $U_b^\dagger W_{b3} U_b$ to simulate $P_3$, and can form the circuit $U_b^\dagger W_{b5} U_b$ to simulate $P_5$. In various aspects, the simulation component can appropriately concatenate these circuits to simulate each subset. That is, the simulation component can generate the following circuit to simulate subset a $$U_a^\dagger W_{a4} U_a U_a^\dagger W_{a2} U_a U_a^\dagger W_{a1} U_a = U_a^\dagger W_{a4} W_{a2} W_{a1} U_a = U_a^\dagger W_a U_a$$

and can generate the following circuit to simulate subset b $$U_b^\dagger W_{b5} U_b U_b^\dagger W_{b3} U_b = U_b^\dagger W_{b5} W_{b3} U_b = U_b^\dagger W_b U_b$$

As shown, leveraging the fact that commuting Pauli operators can be simultaneously diagonalized allows for simplification of the quantum circuit that simulates the time evolution of each subset (e.g., since only one diagonalization circuit $U_a$ is needed to diagonalize all of $P_1$, $P_2$, and $P_4$, the concatenation of the individual diagonalization and exponentiation circuits for subset a generates several repeating $U_a U^\dagger_a$ terms in the circuit, which can be eliminated since $U_a U^\dagger_a$ equals identity; since only one diagonalization circuit $U_b$ is needed to diagonalize all of $P_3$ and $P_5$, the concatenation of the individual diagonalization and exponentiation circuits for subset b generates $U_b U^\dagger_b$ terms in the circuit, which can be eliminated since $U_b U^\dagger_b$ equals identity). In various instances, the simulation component can appropriately concatenate the above resulting, simplified circuits associated with each subset to simulate the time evolution of the entire Hamiltonian (e.g., can generate the circuit $U_b^\dagger W_b U_b U_a^\dagger W_a U_a$).

In various cases, since the diagonalized commuting Pauli operators can be strings of identity and Pauli-Z matrices (as explained above), additional simplification can be facilitated by reordering the exponentiation circuits to cancel adjacent gates that equate to identity. In various instances, such simplification can be much more easily facilitated when simultaneous-diagonalization is implemented, as compared to basis changes of individual terms.

As briefly shown above and as explained in more detail herein, partitioning a Hamiltonian into one or more subsets of commuting Pauli operators and simultaneously diagonalizing the commuting Pauli operators in each subset can, in various instances, yield quantum circuits for simulating the time evolution of the Hamiltonian with reduced/improved complexity (e.g., shortened depth, fewer CNOT gates) as compared to quantum circuits generated by directly diagonalizing and exponentiating each Pauli operator individually/independently. In various cases, the fact that commuting Pauli operators can be simultaneously diagonalized means that a diagonalization circuit can be generated for each subset of commuting Pauli operators, rather than for each individual Pauli operator, which can result in more efficient quantum circuits for simulating time evolution of Hamiltonians (e.g., simulation of time evolution by using/expending fewer quantum computing resources). Such computing efficiency benefits constitute concrete and technical improvements to the field of quantum simulation.

Various embodiments of the invention can be employed to use hardware and/or software to solve problems that are highly technical in nature (e.g., to facilitate Hamiltonian simulation based on simultaneous-diagonalization), that are not abstract and that cannot be performed as a set of mental acts by a human. Further, some of the processes performed can be performed by a specialized computer (e.g., Pauli operator partitioner, simultaneous diagonalizer, exponentiator, time evolution simulator) for carrying out defined tasks related to Hamiltonian simulation based on simultaneous-diagonalization (e.g., receiving a Hamiltonian expressed as a sum of Pauli operators, partitioning the Pauli operators into one or more subsets of commuting Pauli operators, generating for each subset a simultaneous-diagonalization circuit that diagonalizes all the commuting Pauli operators in the subset, generating for each subset an exponentiation circuit that exponentiates the diagonalized commuting Pauli operators in the subset, concatenating the generated circuits to simulate the time evolution of the Hamiltonian). Such defined tasks are not performed manually by humans. Moreover, partitioning Pauli operators into commuting subsets and making use of simultaneous-diagonalization can yield significant efficiency gains in the field of Hamiltonian simulation (e.g., reduced circuit complexity), as described herein. Various embodiments of the invention are inherently and inextricably tied to computer technology and cannot be implemented outside of a computing environment. In various instances, embodiments of the invention can integrate into a practical application the principle of simultaneous-diagonalization so as to facilitate more efficient Hamiltonian simulation (e.g., embodiments of the invention can generate quantum circuits for simulating the time evolution of Hamiltonians, and such quantum circuits can utilize fewer quantum computing resources due to the application of simultaneous-diagonalization). The accurate and/or approximate simulation of the time evolution of Hamiltonians by using fewer computing resources is clearly a useful and practical application. Moreover, various embodiments of the invention can provide technical improvements to and solve problems that arise in the field of Hamiltonian simulation. Since embodiments of the invention can utilize simultaneous-diagonalization of commuting Pauli operators to facilitate Hamiltonian simulation with fewer computing resources (e.g., fewer CNOT gates, smaller circuit depth), embodiments of the invention constitute concrete technical improvements in the field of Hamiltonian simulation. Furthermore, various embodiments of the invention can control real-world devices based on the disclosed teachings (e.g., can generate real-world quantum circuits for simulating Hamiltonians, can actually simulate Hamiltonians by applying the generated quantum circuits thereby facilitating quantum chemistry simulations/experiments). Such embodiments thus constitute a concrete and tangible technical improvement in the field of Hamiltonian simulation.

Figure 2:
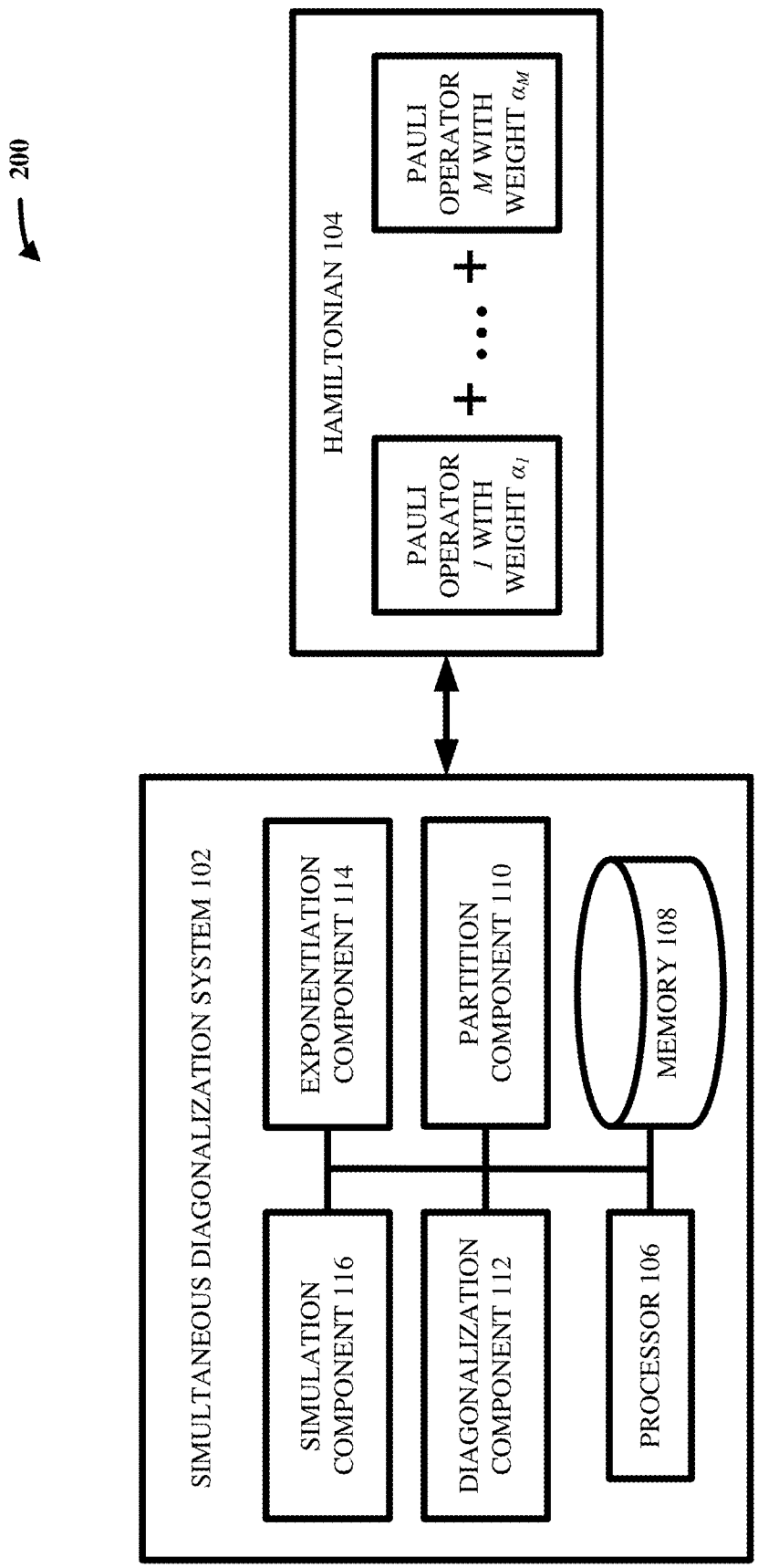
FIG. 2 illustrates a block diagram of an example, non-limiting system including weighted Pauli operators that facilitates Hamiltonian simulation based on simultaneous-diagonalization in accordance with one or more embodiments described herein.

FIG. 1 illustrates a block diagram of an example, non-limiting system 100 that can facilitate Hamiltonian simulation based on simultaneous-diagonalization in accordance with one or more embodiments described herein. As shown, a simultaneous-diagonalization system 102 can facilitate simulation of a time evolution of a Hamiltonian 104 based on simultaneous-diagonalization. In various aspects, the Hamiltonian 104 can be any suitable operator corresponding to the sum of kinetic energies and potential energies for any suitable particles in any suitable quantum system to be tested/simulated. As shown, the Hamiltonian 104 can, in various embodiments, be expressed as the weighted sum of one or more Pauli operators (e.g., Pauli operator 1 to Pauli operator M, for any suitable integer M). Although FIG. 1 depicts the Pauli operators 1 to M as being equally weighted (e.g., $\alpha_j=1$ for all j), it should be appreciated that this is for simplicity of illustration and that any suitable weights can be incorporated in various embodiments of the invention, as shown in FIG. 2 (e.g., where Pauli operator 1 has weight $\alpha_1$, where Pauli operator M has weight am). In various aspects, each of the Pauli operators 1 to M can be an n-Pauli operator (e.g., any suitable $2^n \times 2^n$ matrix formed by n 2×2 Pauli matrices strung together via the Kronecker product). In various instances, n can be the number of qubits on which the Pauli operators 1 to M operate.

In various embodiments, the simultaneous-diagonalization system 102 can comprise a processor 106 (e.g., computer processing unit, microprocessor) and a computer-readable memory 108 that is operably connected to the processor 106. The memory 108 can store computer-executable instructions which, upon execution by the processor 106, can cause the processor 106 and/or other components of the simultaneous-diagonalization system 102 (e.g., partition component 110, diagonalization component 112, exponentiation component 114, simulation component 116) to perform one or more acts. In various embodiments, the memory 108 can store computer-executable components (e.g., partition component 110, diagonalization component 112, exponentiation component 114, simulation component 116), and the processor 106 can execute the computer-executable components.

In various embodiments, the simultaneous-diagonalization system 102 can comprise a partition component 110. In various aspects, the partition component 110 can partition (e.g., separate, divide, distribute, allocate) the Pauli operators 1 to M into one or more subsets of commuting Pauli operators. That is, in various instances, each subset can contain/include Pauli operators that commute with each other and can exclude Pauli operators that do not commute with those Pauli operators already in the subset. In various aspects, partitioning can be facilitated by applying graph coloring (e.g., which can be implemented via graphing/networking software) to a graph whose nodes correspond to the Pauli operators and whose edges connect nodes which do not commute. The resulting coloring can be such that all nodes sharing the same color commute. In various embodiments, any suitable technique for partitioning Pauli operators into commuting subsets can be implemented, such as largest-first and/or independent-set. In various instances, a sequential greedy partitioning technique can be implemented, in which each of the Pauli operators of the Hamiltonian is sequentially added to a first subset it commutes with, creating a new set if needed (e.g., initialize by creating a first subset that is empty, place a first Pauli operator of the Hamiltonian into the first subset, place a second Pauli operator of the Hamiltonian into the first subset if the second Pauli operator commutes with the all the Pauli operators in the first subset, place the second Pauli operator into a second subset if it does not commute with the first subset, and continue in such fashion until all Pauli operators of the Hamiltonian have been partitioned). In various instances, largest-first, independent set, and sequential greedy partitioning can provide similar results in terms of number of partitions, as well as median and maximum partition size. In various instances, the maximum partition size can be much larger than the number of qubits (e.g., terms in each of the Pauli operators). In various instances, graph coloring algorithms implemented via graphing/networking software can be used to facilitate partitioning.

In various embodiments, the simultaneous-diagonalization system 102 can comprise a diagonalization component 112. In various aspects, the diagonalization component 112 can generate one or more simultaneous-diagonalization circuits (e.g., operators, matrices) corresponding to the one or more subsets of commuting Pauli operators. As explained above, for any given set of commuting Pauli operators, there exists a diagonalization circuit that can diagonalize each of the commuting Pauli operators in the set. For instance, if a set contains q commuting Pauli operators for any suitable integer q, there exists a simultaneous-diagonalization circuit U such that U can diagonalize all q of the commuting Pauli operators in the set. This means that, rather than requiring q separate and/or unique diagonalization circuits, only a single diagonalization circuit can be required to diagonalize the set of commuting Pauli operators. If there are g subsets of commuting Pauli operators, for any suitable integer g≤q, then the diagonalization component 112 can generate g simultaneous-diagonalization circuits (e.g., one for and/or respectively corresponding to each subset of commuting Pauli operators). As explained herein, this can lead to significant reductions of circuit complexity (e.g., depth, CNOT count). In various aspects, the one or more simultaneous-diagonalization circuits can be constructed so that the resulting diagonalized commuting Pauli operators are strings of identity and Pauli-Z matrices. As explained herein, this can allow further reduction of circuit complexity (e.g., by reordering exponentiation circuits to cancel adjacent gates/circuits that equate to identity). Various techniques which the diagonalization component 112 can use to generate such simultaneous-diagonalization circuits are described herein (e.g., Clifford operations on tableau representations).

In various embodiments, the simultaneous-diagonalization system 102 can comprise an exponentiation component 114. In various aspects, the exponentiation component 114 can generate one or more exponentiation circuits (e.g., operators, matrices) corresponding to the one or more subsets of commuting Pauli operators. As explained above, for each subset, a respectively corresponding exponentiation circuit can exponentiate the simultaneously diagonalized commuting Pauli operators.

Below is an example, non-limiting discussion of generating exponentiation circuits for individual Pauli operators and of how they can be combined. Given a Hermitian operator M (which can be unrelated to the integer M in FIG. 1) with eigen decomposition $M = Q \Lambda Q^\dagger = \Sigma_k \lambda_k |q_k\rangle\langle q_k|$, it holds that exponentiation of the matrix is equivalent to exponentiation of the individual eigenvalues; that is, $$e^{i\theta M} = Q e^{i\theta \Lambda} Q^\dagger = \Sigma_k e^{i\theta \lambda_k} |q_k\rangle\langle q_k|$$

Alternatively, it is possible to look at operators $D = Q^\dagger$ that diagonalize M, that is $DMD^\dagger = \Lambda$. The identity and Pauli-Z matrices are already diagonal, and so they are trivially diagonalized by D=1. From this, it follows that $$e^{i\theta\sigma_i} = e^{i\theta}I, \text{ and } e^{i\theta\sigma_z} = \begin{bmatrix} e^{i\theta} & 0 \\ 0 & e^{-i\theta} \end{bmatrix} =: R_z(\theta)$$

The remaining two Pauli matrices $\sigma_x$ and $\sigma_y$ can be diagonalized to $\Lambda = \sigma_z$ with the following operators:

$$D_x = H = \frac{1}{\sqrt{2}}\begin{bmatrix} 1 & 1 \\ 1 & -1 \end{bmatrix}, \text{ and } D_y = HSX = \begin{bmatrix} i & 1 \\ -i & 1 \end{bmatrix}, \text{ where } S = \begin{bmatrix} 1 & 0 \\ 0 & i \end{bmatrix}$$

Here, H can represent the Hadamard gate and S can represent the phase gate. It then follows that $e^{i\theta\sigma_x} = e^{i\theta D_x^\dagger \sigma_z D_x} = D_x^\dagger e^{i\theta\sigma_z} D_x = D_x^\dagger R_z(\theta) D_x$ and $e^{i\theta\sigma_y} = e^{i\theta D_y^\dagger \sigma_z D_y} = D_y^\dagger e^{i\theta\sigma_z} D_y = D_y^\dagger R_z(\theta) D_y$. For quantum circuit implementation, this can mean that a 2×2 Pauli matrix can be exponentiated by first applying the appropriate diagonalization operator D, followed by the rotation operator $R_z(\theta)$, followed by the adjoint diagonalization operator $D^\dagger$.

To exponentiate general n-Pauli operators, first diagonalize the matrix by applying the tensor product of the diagonalization operators corresponding to each of the terms. The resulting diagonal is the tensor product of $\sigma_i$ and a matrices (e.g., strings of identify and Pauli-Z matrices); a $\sigma_i$ for each I term in the n-Pauli operator and a a for each of the X, Y, or Z terms in the n-Pauli operator. For a given element in the computational basis, the sign induced by the $\sigma_z$ diagonal terms can be determined and the overall sign can be maintained in an ancilla qubit using CNOT operators. The rotation operator $R_z(\theta)$ can then be applied to the ancilla to achieve the exponentiation of the eigenvalue. The ancilla can then be uncomputed by reapplying the CNOT gates, and the procedure can be completed by applying the adjoint diagonalization operator.

In various embodiments, the simultaneous-diagonalization system 102 can comprise a simulation component 116. In various aspects, the simulation component 116 can, for each subset, concatenate the simultaneous-diagonalization circuit, the exponentiation circuit, and an adjoint of the simultaneous-diagonalization circuit, thereby yielding a quantum circuit that can simulate the time evolution of the subset, which quantum circuit can have a reduced complexity (e.g., reduced depth and/or reduced CNOT count) as compared to analogous quantum circuits constructed without simultaneous-diagonalization.

Figure 3:
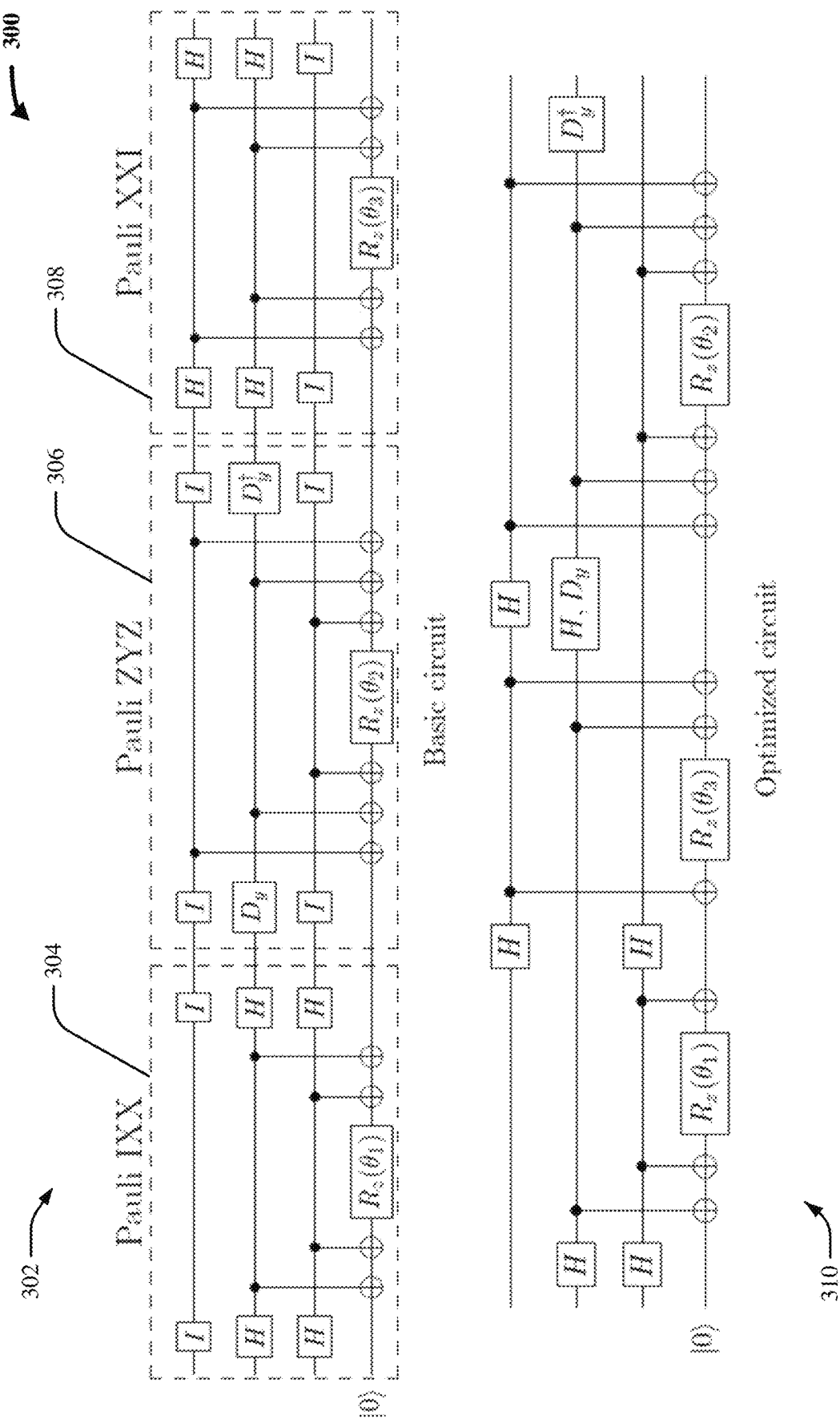
FIG. 3 illustrates example quantum circuits that facilitate Hamiltonian simulation the complexity of which can be reduced by simultaneous-diagonalization.

FIG. 3 illustrates example quantum circuits 300 that can facilitate Hamiltonian simulation, the circuit complexity of which can be reduced by simultaneous-diagonalization. As a non-limiting, illustrative example, consider three commuting Pauli operators IXX, ZYZ, and XXI with respective angles $\theta_1$, $\theta_2$, and $\theta_3$. FIG. 3 depicts a basic circuit 302 that exponentiates IXX, ZYZ, and XXI via individual exponentiation of the terms in the group of Pauli operators. The circuit 304 can exponentiate the Pauli operator IXX (e.g., the leftmost I⊗H⊗H diagonalizes IXX, the middle CNOT gates and rotation gate $R_z(\theta_1)$ exponentiate the diagonalized terms, and the rightmost I⊗H⊗H is the adjoint diagonalization operator). Similarly, the circuit 306 can exponentiate the Pauli operator ZYZ, and the circuit 308 can exponentiate the Pauli operator XXI. In various aspects, various remarks can apply. First, in the diagonalization of $\sigma_y$, a NOT operator (X) can be included to ensure diagonalization to $\sigma_z$ rather than $-\sigma_z$. In various instances, this term can be omitted, and for each occurrence of a $\sigma_y$ term multiplication by the corresponding rotation angle $\theta$ by $-1$ can be applied. Second, it can be the case that time evolution needs to be done as a conditional circuit. Instead of making each gate conditional, it can suffice to merely make the $R_z$ gates conditional. Third, for sets of commuting Pauli operators, it is possible to obtain circuits with reduced complexity by appropriately rearranging the order in which the Pauli operators are applied (e.g., when the term on the same qubit repeats, the diagonalization operators on that qubit cancel, as do the CNOT operations). An example of this rearrangement and simplification is shown as optimized circuit 310 (e.g., the exponentiation circuits for ZYZ and XXI can be switched so as to eliminate adjacent CNOTs and cancel unitaries where possible).

Figure 4:
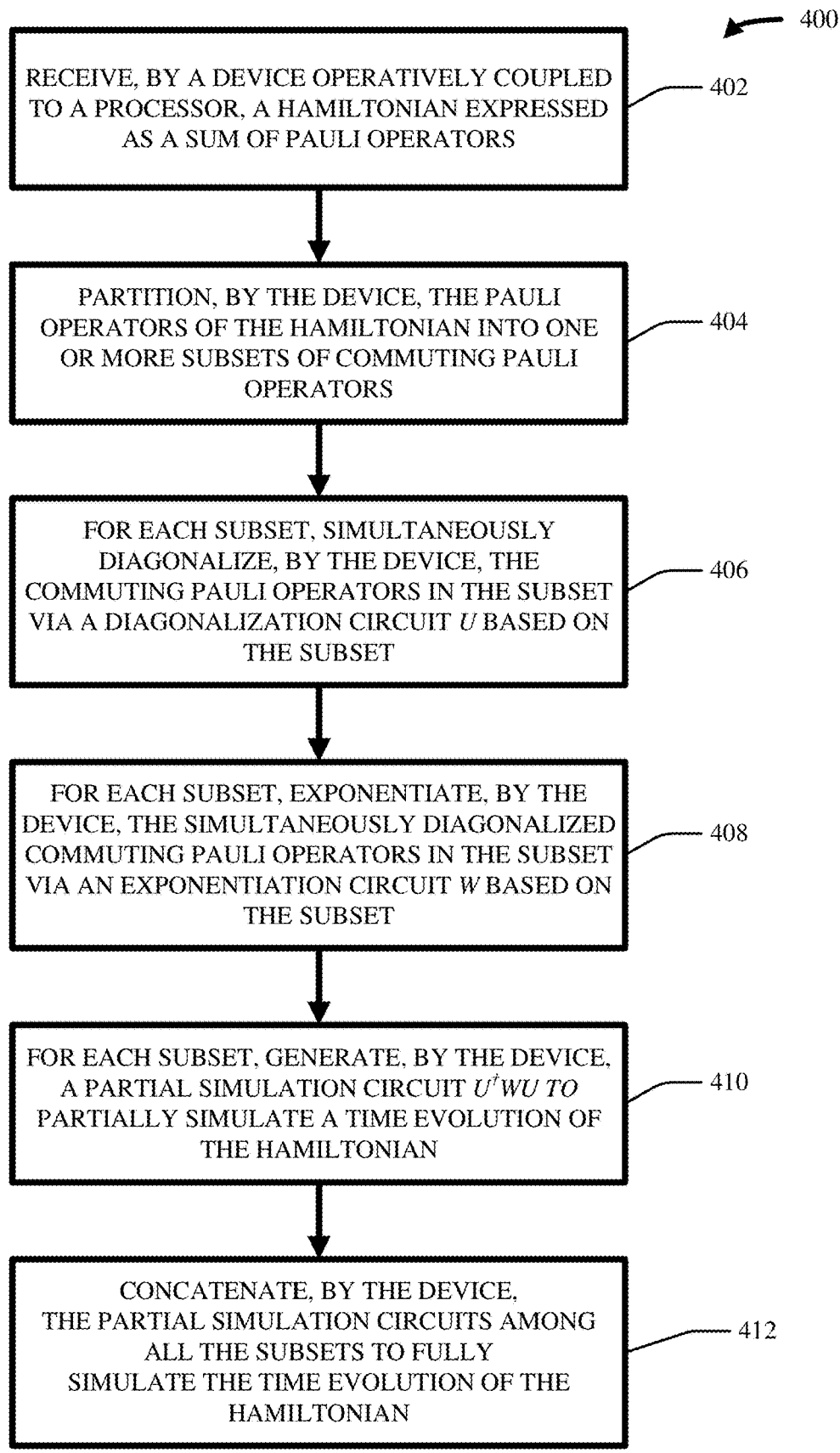
FIG. 4 illustrates a flow diagram of an example, non-limiting computer-implemented method that facilitates Hamiltonian simulation based on simultaneous-diagonalization in accordance with one or more embodiments described herein.

FIG. 4 illustrates a flow diagram of an example, non-limiting computer-implemented method 400 that can facilitate Hamiltonian simulation based on simultaneous-diagonalization in accordance with one or more embodiments described herein. In various aspects, the computer-implemented method 400 can be facilitated by the system 100. In various aspects, act 402 can include receiving, by a device operatively coupled to a processor, a Hamiltonian expressed as a sum of Pauli operators. In various instances, act 404 can include partitioning, by the device, the Pauli operators of the Hamiltonian into one or more subsets of commuting Pauli operators. In various cases, act 406 can include, for each subset, simultaneously diagonalizing, by the device, the commuting Pauli operators in the subset via a diagonalization circuit U based on the subset. In various embodiments, act 408 can include, for each subset, exponentiating, by the device, the simultaneously diagonalized commuting Pauli operators in the subset via an exponentiation circuit W based on the subset. In various aspects, act 410 can include, for each subset, generating, by the device, a partial simulation circuit $U^\dagger WU$ to partially simulate a time evolution of the Hamiltonian (e.g., to simulate that subset). In various instances, act 412 can include concatenating, by the device, the partial simulation circuits among all the subsets to fully simulate the time evolution of the Hamiltonian.

Figure 5:
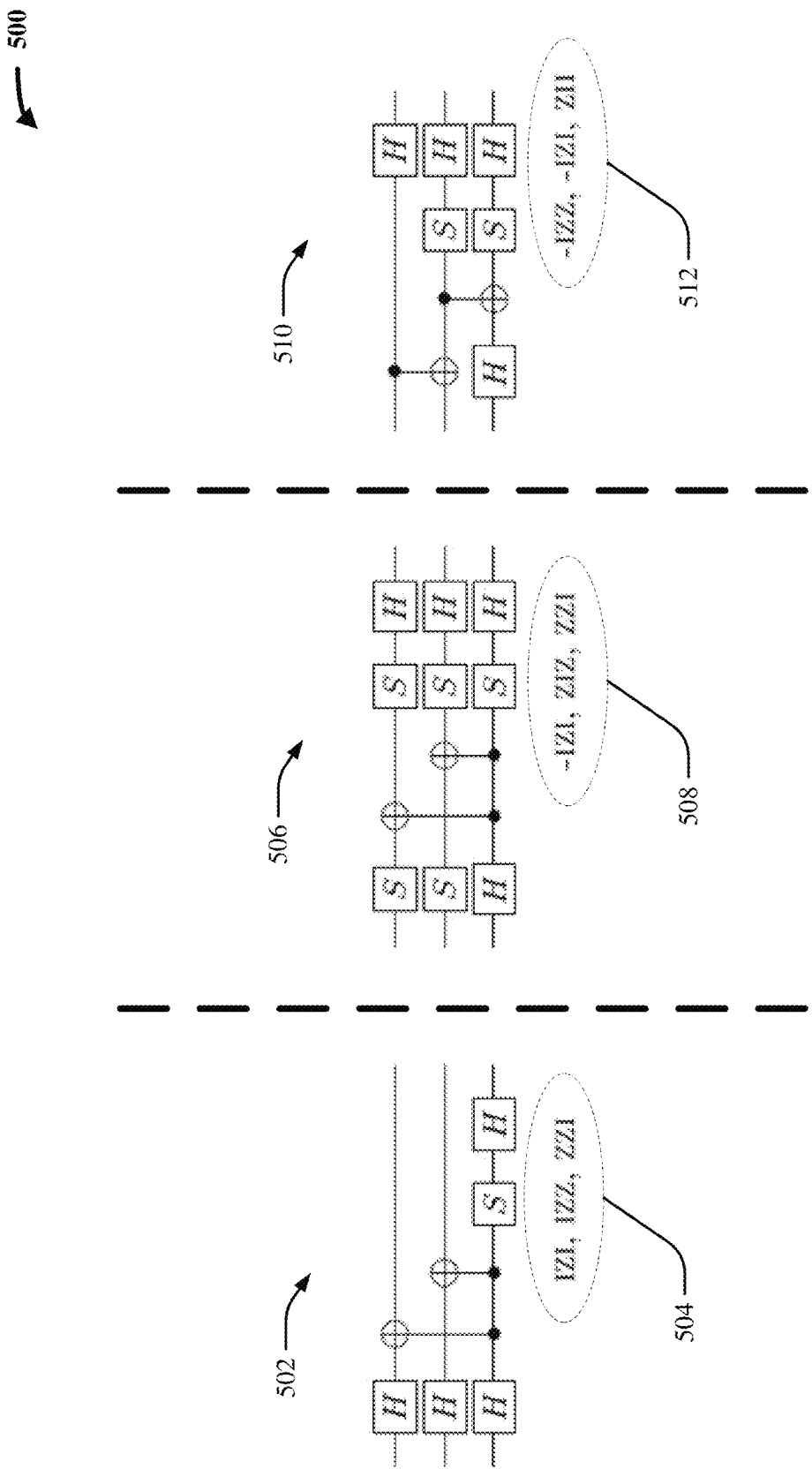
FIG. 5 illustrates example, non-limiting simultaneous-diagonalization circuits that facilitate Hamiltonian simulation based on simultaneous-diagonalization in accordance with one or more embodiments described herein.

FIG. 5 illustrates example, non-limiting simultaneous-diagonalization circuits 500 that can facilitate Hamiltonian simulation based on simultaneous-diagonalization in accordance with one or more embodiments described herein. As mentioned above, for any set of mutually commuting operators, there exists a unitary U that simultaneously diagonalizes each of the operators in the set. Applying this to a set of commuting n-Pauli operators $\{P_j\}_{j=1}^m$, there exists a unitary $U \in \mathbb{C}^{2^n \times 2^n}$ (where C here can represent the set of complex numbers), such that $UP_jU^\dagger = \Lambda_j$ is diagonal for all $j \in [1, m]$. Moreover, not only are the resulting operators diagonal, they are in fact Pauli operators themselves, consisting only of $\sigma_i$ and $\sigma_z$ terms along with a sign (e.g., strings of $\sigma_i$ and/or $\sigma_z$ matrices multiplied by a $\pm$ sign). As an example, consider again the three commuting Pauli operators IXX, ZYZ, and XXI with respective angles $\theta_1$, $\theta_2$, and $\theta_3$. FIG. 5 depicts three different, example simultaneous-diagonalization circuits 502, 506, and 510, any of which can be generated by the diagonalization component 112 to simultaneously diagonalize the Pauli operators IXX, ZYZ, and XXI. Numeral 504 illustrates the resulting diagonalized Pauli operators after application of the simultaneous-diagonalization circuit 502 to the three Pauli operators. As shown by numeral 504, the simultaneous-diagonalization circuit 502 can diagonalize IXX into IZI, can diagonalize ZYZ into IZZ, and can diagonalize XXI into ZZI. Similarly, numeral 508 shows the resulting, diagonalized Pauli operators after application of the simultaneous-diagonalization circuit 506 to the IXX, ZYZ, and XXI, and numeral 512 shows the resulting, diagonalized Pauli operators after application of the simultaneous-diagonalization circuit 510. The simultaneous-diagonalization circuits 502, 506, and 510 can be constructed (e.g., via tableau manipulations as explained below) to generate diagonalized strings of identity and Pauli-Z matrices.

Figure 6:
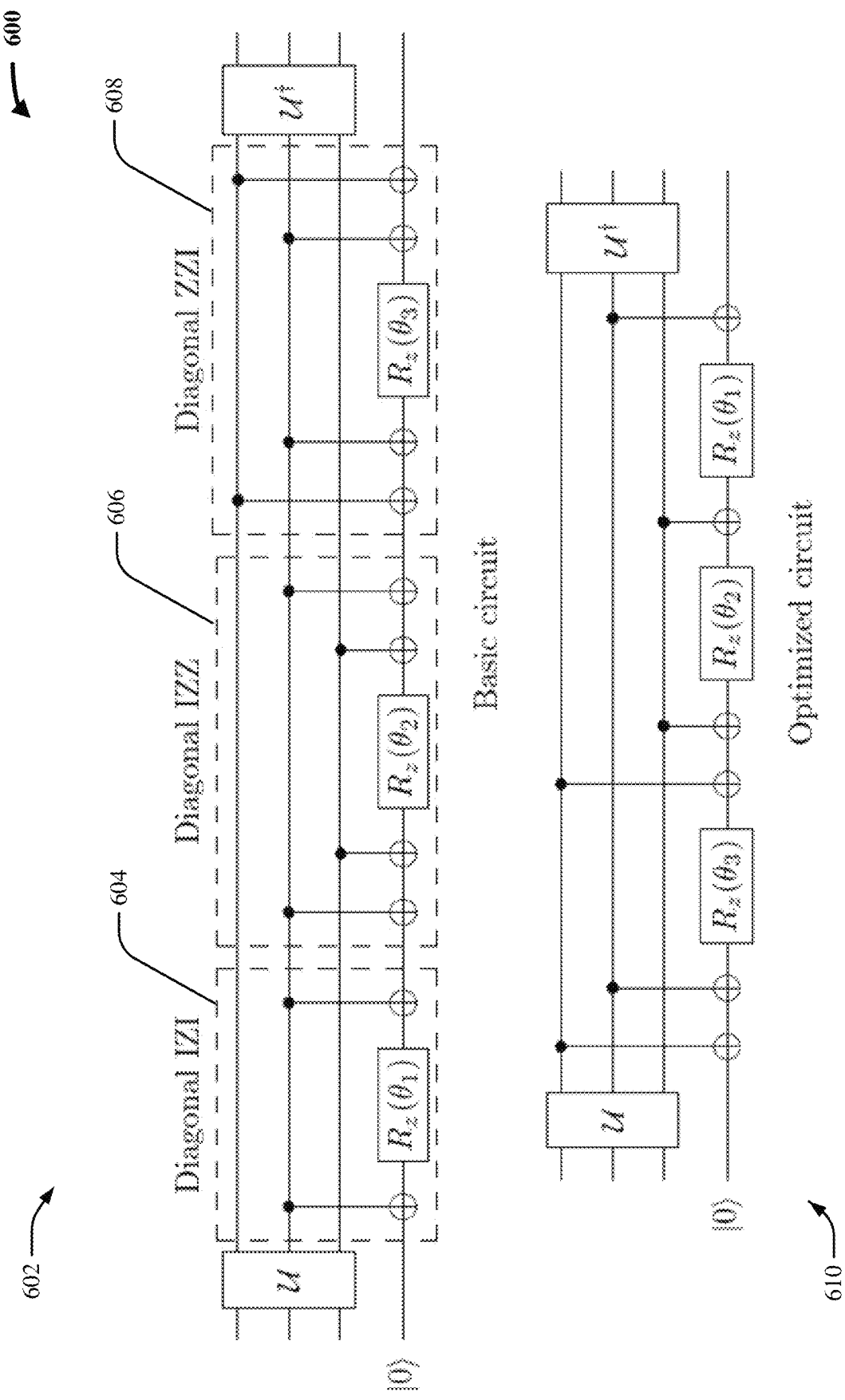
FIG. 6 illustrates example, non-limiting quantum circuits with reduced complexity that facilitate Hamiltonian simulation based on simultaneous-diagonalization in accordance with one or more embodiments described herein.

Various benefits of applying simultaneous-diagonalization in the Hamiltonian simulation context can be seen when looking at the exponentiation of the sum of commuting Pauli operators, as shown in FIG. 6. FIG. 6 illustrates example, non-limiting quantum circuits 600 with reduced complexity that can facilitate Hamiltonian simulation based on simultaneous-diagonalization in accordance with one or more embodiments described herein. Since the exponentiation of the sum of commuting Pauli operators is equal to the product of the individual exponents, the following obtains when simultaneous-diagonalization is applied:

$$e^{i\sum_{j=1}^m \theta_j P_j} = \prod_{j=1}^m e^{i\theta_j P_j} = \prod_{j=1}^m (U^\dagger e^{i\theta_j \Lambda_j} U) = U^\dagger \prod_{j=1}^m (e^{i\theta_j \Lambda_j}) U$$

The last equality follows from the fact that successive $UU^\dagger$ terms cancel, thereby allowing application of the diagonalization operator U and its adjoint $U^\dagger$ only once overall, instead of once for each individual term (e.g., which would be a total of m times). Since exponentiation of diagonal Pauli operators can be facilitated as described above, everything can be concatenated together to obtain the basic circuit 602. FIG. 6 illustrates a non-limiting example when the simultaneous-diagonalization circuit 502 is implemented as the operator U. As mentioned above, the simultaneous-diagonalization circuit 502 (e.g., U in FIG. 6) can diagonalize IXX into IZI, can diagonalize ZYZ into IZZ, and can diagonalize XXI into ZZI. As shown, the exponentiation circuit 604 can be applied to exponentiate the diagonal IZI, the exponentiation circuit 606 can be applied to exponentiate the diagonal IZZ, and the exponentiation circuit 608 can be applied to exponentiate the diagonal ZZI. If needed, the sign of the diagonalized terms can be incorporated in the rotation angle. As mentioned above, additional simplification can be facilitated by rearranging the exponentiation circuits to cancel adjacent gates that multiply to identity, as shown by circuit 610.

In various embodiments, a benefit of simultaneous-diagonalization is that, aside from the $R_z$ gates, each term in the circuit consists entirely of CNOT gates. This can provide much more room for optimization by rearrangement/reordering, since instead of having to match four terms (I, X, Y, and Z), only two terms need to be considered (I and Z). This can make it significantly easier to find orderings of the terms that reduce the number of CNOT gates in the circuit. Indeed, as shown in FIG. 3, the optimized circuit 310 has a total of 12 CNOT gates. In contrast, the optimized circuit 610 has a total of 10 CNOT gates (e.g., six for exponentiation, two in U, and two in U'). In various cases, such benefits can scale with increasing numbers of qubits and/or Pauli operators. In other words, implementation of simultaneous-diagonalization allows for improved/reduced circuit complexity as compared to Hamiltonian simulation techniques that independently diagonalize and exponentiate each Pauli operator.

In practice, it can be unlikely that all terms in a Hamiltonian commute. In such cases, it can be beneficial to partition the terms into subsets of commuting operators. For each of these subsets, simultaneous-diagonalization can be applied for simulating that part of the Hamiltonian.

Figure 7:
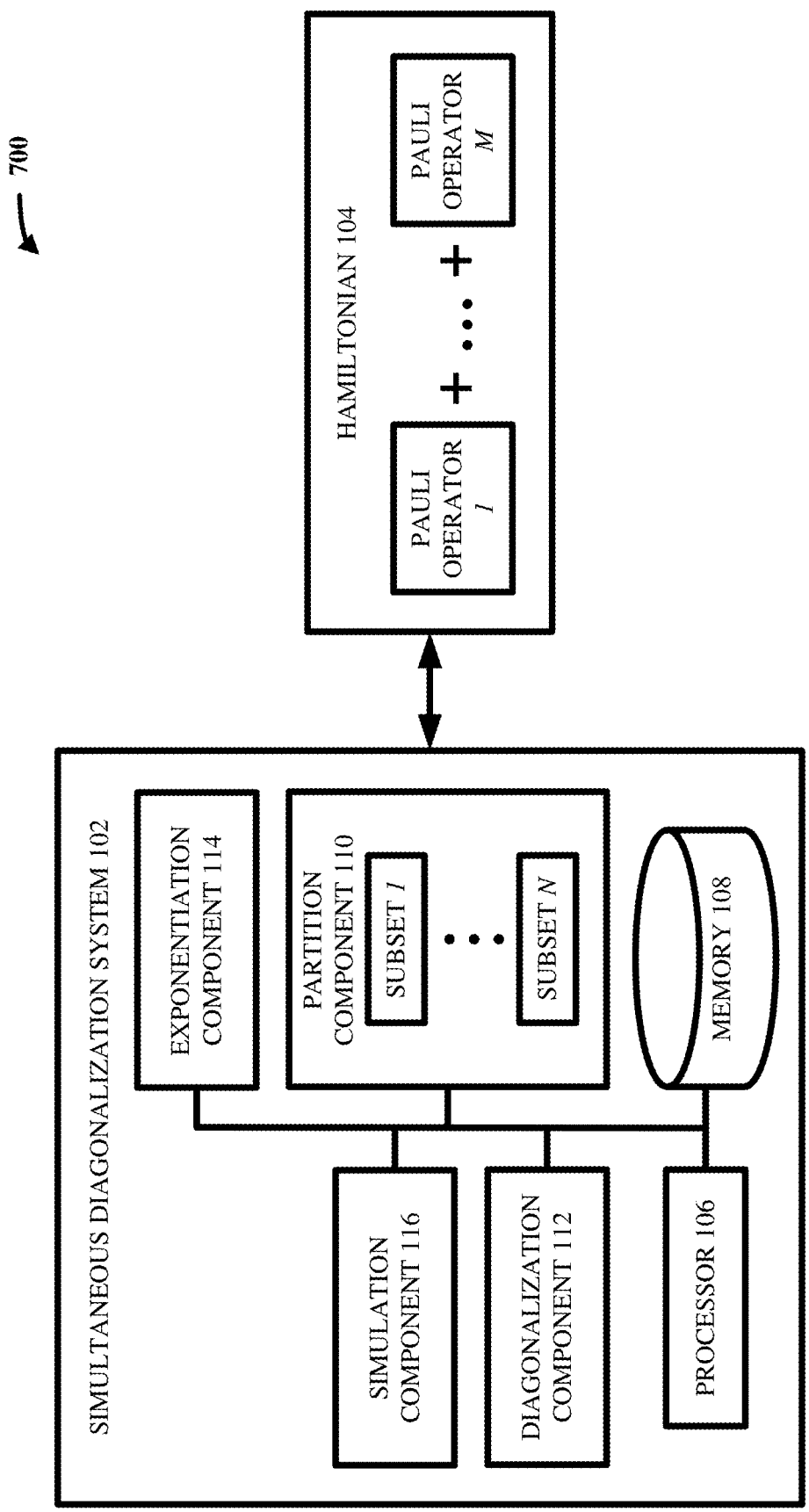
FIG. 7 illustrates a block diagram of an example, non-limiting system including subsets of commuting Pauli operators that facilitates Hamiltonian simulation based on simultaneous-diagonalization in accordance with one or more embodiments described herein.

FIG. 7 illustrates a block diagram of an example, non-limiting system 700 including subsets of commuting Pauli operators that can facilitate Hamiltonian simulation based on simultaneous-diagonalization in accordance with one or more embodiments described herein.

In various embodiments, the partition component 110 can partition the Pauli operators 1 to M into one or more commuting subsets (e.g., subset 1 to subset N, for any suitable integer N), such that the Pauli operators in each subset can commute with each other. In various instances, N can be less than and/or equal to M. In various aspects, each of the Pauli operators 1 to M can be partitioned into one of the subsets 1 to N. As explained above, any suitable partitioning technique can be implemented in various instances (e.g., independent-set, largest-first, sequential greedy).

Figure 8:
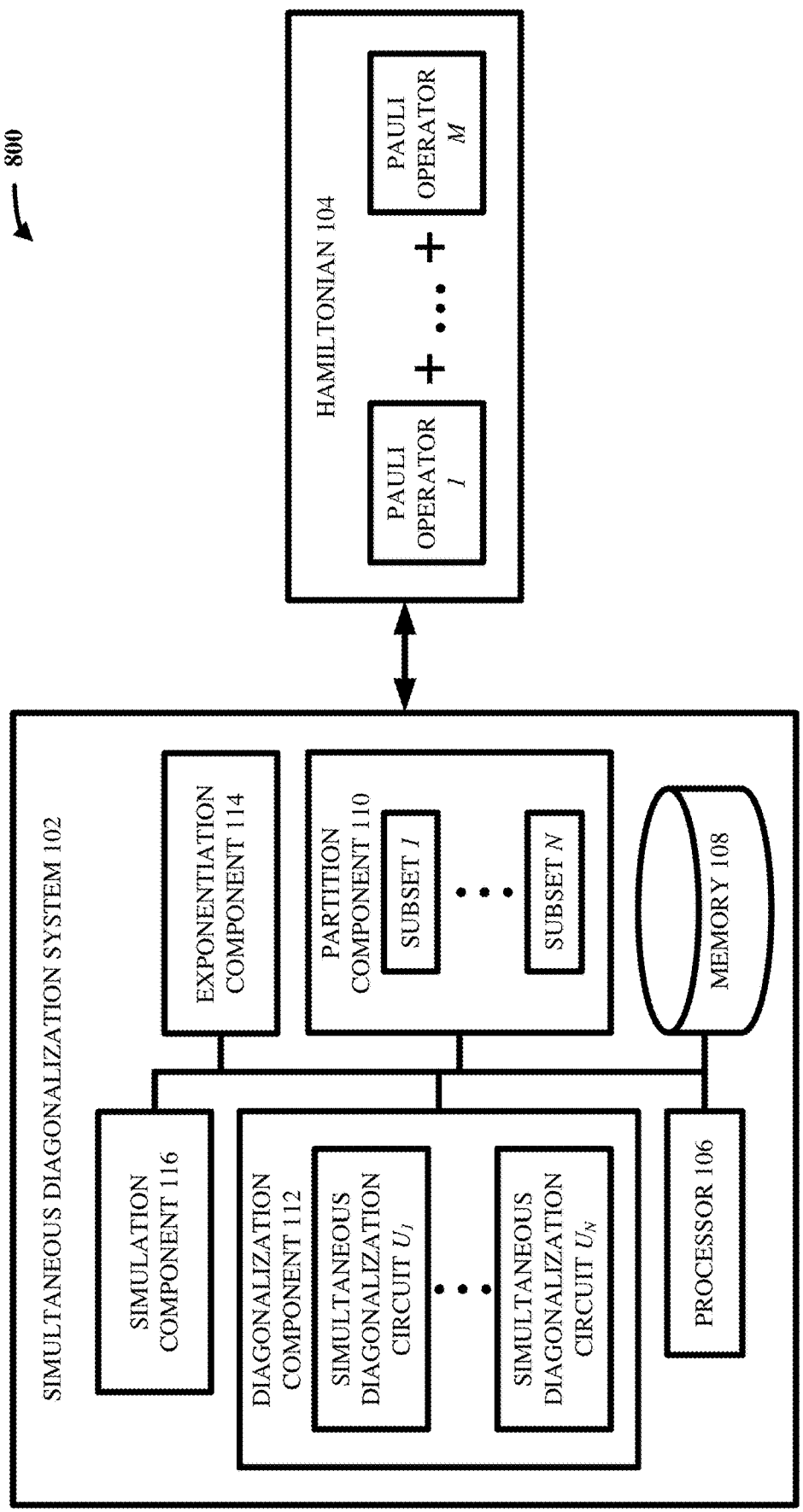
FIG. 8 illustrates a block diagram of an example, non-limiting system including simultaneous-diagonalization circuits that facilitates Hamiltonian simulation based on simultaneous-diagonalization in accordance with one or more embodiments described herein.

FIG. 8 illustrates a block diagram of an example, non-limiting system 800 including simultaneous-diagonalization circuits that can facilitate Hamiltonian simulation based on simultaneous-diagonalization in accordance with one or more embodiments described herein.

In various embodiments, the diagonalization component 112 can generate one or more simultaneous-diagonalization circuits (e.g., $U_1$ to $U_N$). In various instances, the one or more simultaneous-diagonalization circuits can respectively correspond to the one or more subsets (e.g., $U_1$ can diagonalize all of the commuting Pauli operators that are in the subset 1, $U_N$ can diagonalize all the commuting Pauli operators that are in the subset N). As mentioned above, note that there can be one simultaneous-diagonalization circuit for each subset, rather than one diagonalization circuit for each individual Pauli operator.

The below description explains various example, non-limiting details that can be implemented by the diagonalization component 112 in order to construct/generate the one or more simultaneous-diagonalization circuits $U_1$ to $U_N$. Specifically, in various instances, tableau representations (e.g., which can be used to simulate stabilizer circuits) can be implemented to generate the one or more simultaneous-diagonalization circuits $U_1$ to $U_N$.

The tableau representation can be a binary array in which each row represents a single n-Pauli operator. In various instances, the tableau can comprise an X-block and/or a Z-block. The columns of the tableau can be partitioned as [X, Z, s], such that $(X_{i,j}Z_{i,j})$ represents the jth component/term of the ith Pauli operator (e.g., if the 2nd Pauli operator is represented by the string XXZYZ, then $(X_{2,4},Z_{2,4})$ would represent the fourth component/term of XXZYZ, namely Y). The value can be (1,0) for X, (0,1) for Z, (1,1) for Y, and (0,0) for I. Entries in s can be set if the corresponding Pauli operator has a negative sign. For instance, $$\begin{bmatrix} 1001 & 0101 & 0 \\ 0110 & 1101 & 1 \end{bmatrix} = \begin{bmatrix} XZIY \\ -ZYXZ \end{bmatrix}$$

Once the tableau is set up, different operations/manipulations can be applied, as explained below.

Figure 9:
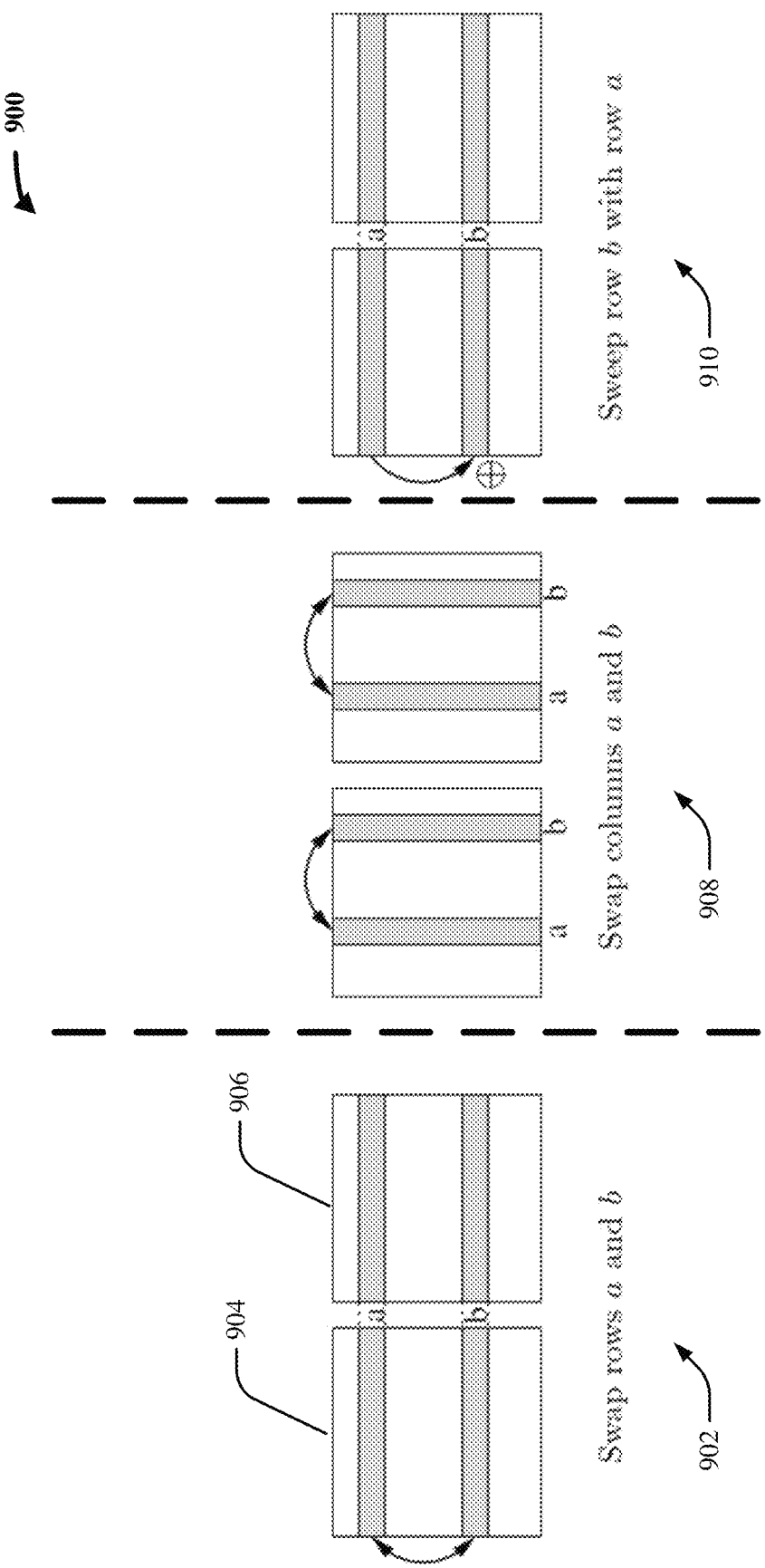
FIG. 9 illustrates example, non-limiting tableau operations that do not generate gates in a quantum circuit in accordance with one or more embodiments described herein.

FIG. 9 illustrates example, non-limiting tableau operations that do not generate gates in a quantum circuit in accordance with one or more embodiments described herein. As shown in FIG. 9, a tableau can comprise an X-block 904 and a Z-block 906. In various embodiments, a row swap 902 can swap a row a with a row b in both the X-block and the Z-block. In various aspects, a column-swap 908 can swap a column a with a column b in both the X-block and the Z-block. In various cases, row swaps can change the logical order of the Pauli operators, and column swaps can change the logical order of the qubits. In various instances, a row sweep 910 can sweep a row a with a row b. In various cases, row sweeping can correspond to multiplication of the operators, which can result in the given entries in the X-block and the Z-block being added modulo two. In various aspects, a sign update can also be performed via any suitable technique. Even though these operations alter the tableau, they do not generate any corresponding gates in the circuit.

Figure 10:
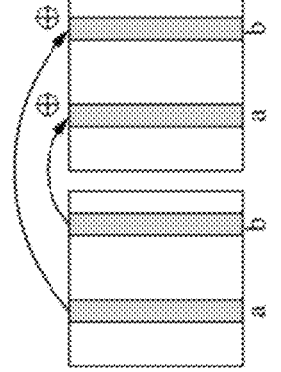
FIG. 10 illustrates example, non-limiting tableau operations in accordance with one or more embodiments described herein.

In addition to these basic operations, operators from the Clifford group can also be applied. Operators C in the Clifford group are unitary and have the property that $CPC^\dagger$ is a Pauli operator for any Pauli operator P. The Clifford group can be generated by three gates: the Hadamard gate (H), the phase gate (S), and the conditional-NOT gate (CNOT), which are illustrated in FIG. 10. FIG. 10 illustrates example, non-limiting tableau operations in accordance with one or more embodiments described herein. The Hadamard gate applied to a column (qubit) can result in the exchange of the corresponding columns in the X-block and the Z-block. The phase gate can add a given column in the X-block to the matching column in the Z-block, along with appropriate updates to the signs, as shown in FIG. 10. The CNOT gate (e.g., where CX(a,b) means the negation of qubit b conditional on qubit a) can have the effect of adding column a to column b in the X-block, and adding column b to column a in the Z-block. From these basic three operations, another gate can be formed: the conditional-Z gate (e.g., CZ(a,b)), which can be equivalent to successively applying H(b), CX(a,b,), and H(b), and can have the effect of adding columns a and b of the X-block to columns a and b of the Z-block, respectively.

To facilitate simultaneous-diagonalization, the diagonalization component 112 can generate a tableau for each of the one or more subsets 1 to N and can perform the following procedures/manipulations on each tableau to generate the one or more simultaneous-diagonalization circuits $U_1$ to $U_N$ (e.g., manipulating N tableaus to generate N corresponding simultaneous-diagonalization circuits for N corresponding subsets of commuting Pauli operators). Each tableau can be initialized with the commuting Pauli operators in its corresponding subset. The tableau operations can then be applied in such a way so that the entries in the X-block of the final tableau are all zero. In various algorithms described herein, row swaps and row sweep operations can be used to this effect. Even though these operations do not generate any gates for the circuit, they do alter the tableau and the underlying Pauli operators. In order to obtain the appropriate diagonalization of the original Pauli operators, one of two things can be performed. First, since these operations commute with the Clifford operations, the inverses of the row/column operations can be applied at the end. Second, a parallel tableau can be used on which only the Clifford operations are applied (e.g., yielding 2N tableaus, two for each of the subsets 1 to N). The desired diagonalized Pauli operators can then be represented by the final tableau.

In order to generate each simultaneous-diagonalization circuit, the X-block of the corresponding tableau can be diagonalized and cleared. Discussed below are various algorithms that can be used to diagonalize and clear the X-block of the tableau. In some cases, the rank of the tableau can be needed, which can be defined as the rank of the [X, Z] matrix.

Figure 12:
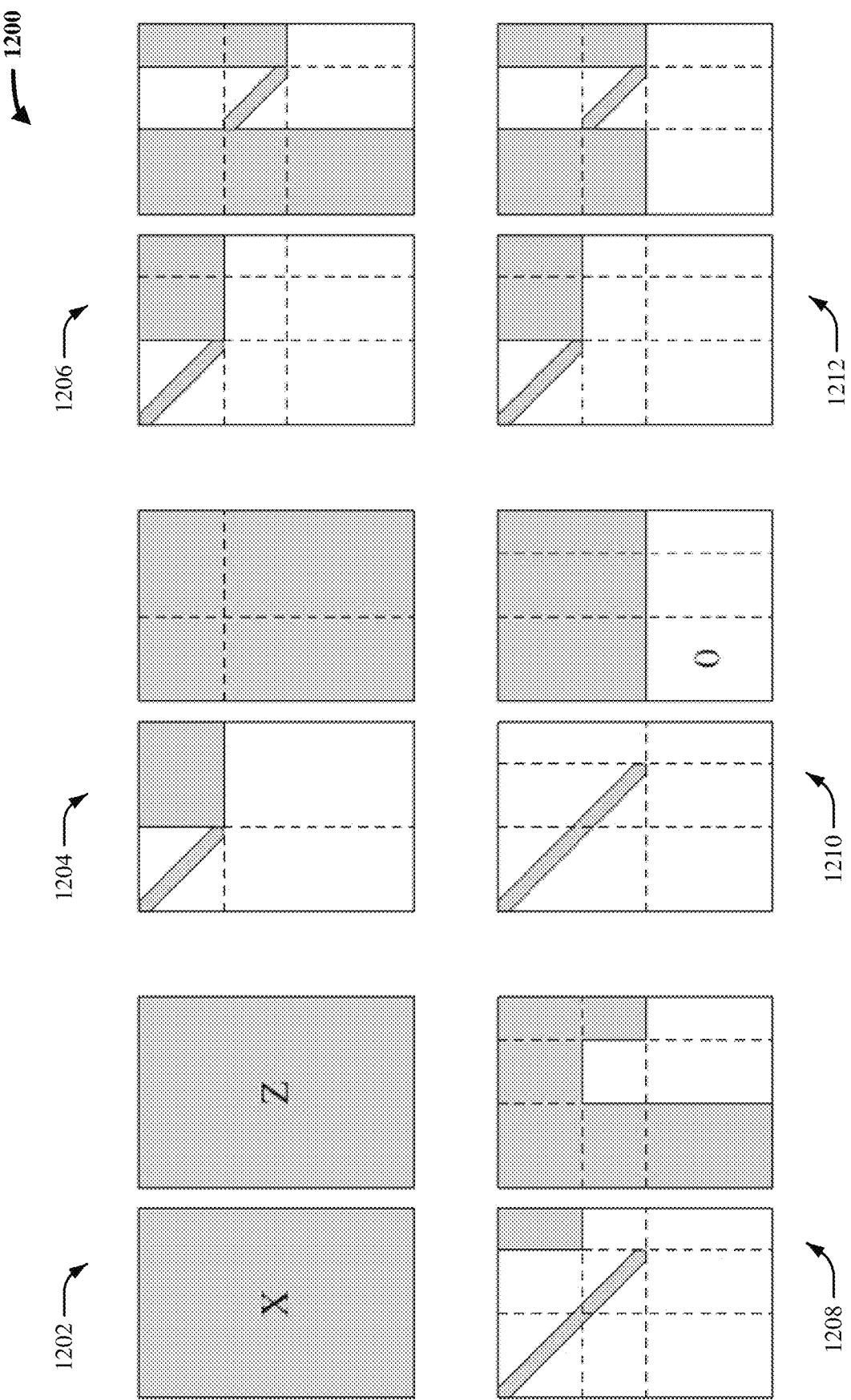
FIG. 12 illustrates example, non-limiting diagrams depicting diagonalization of an X-block of a tableau in accordance with one or more embodiments described herein.

FIG. 11 illustrates an example, non-limiting algorithm 1100 for diagonalizing an X-block of a tableau in accordance with one or more embodiments described herein. FIG. 12 illustrates example, non-limiting diagrams 1200 depicting diagonalization of an X-block of a tableau in accordance with one or more embodiments described herein.

To diagonalize the X-block, the tableau can be manipulated such that only the entries on the diagonal of the X-block are nonzero. Let r be the rank of the matrix [X, Z]. The goal can be to make the first r diagonal elements of the X-block to be one, and all remaining elements in the X-block to be zero. In various instances, the diagonalization component 112 can implement algorithm 1100 (also referred to as algorithm 1) to facilitate such tableau manipulations. At the beginning of algorithm 1100, a tableau corresponding to the commuting Pauli operators in a subset can be generated and/or received. As used in algorithm 1100, m can represent the number of Pauli operators in the subset (e.g., which can be smaller than the total number of Pauli operators of the Hamiltonian), and n can represent the number of qubits on which the Pauli operators operate. At this point, there can be an absence of a clear structure in the tableau, and so the tableau can look something like tableau 1202 in FIG. 12. In tableau 1202, gray can be used to indicate both zero and/or nonzero elements. In the remaining tableaus of FIG. 12, however, gray can be used to indicate nonzero elements. Note that although the herein examples take m>n, the disclosed algorithms and/or manipulations can be implemented with any suitable tableau of any suitable dimensions.

In various aspects, lines 2-11 of algorithm 1100 can represent a first stage of the algorithm 1100, and can facilitate iterative diagonalization of the X-block. Starting at k=1, the algorithm 1100 can first look for a nonzero element in rows and columns of the X-block with indices at least k. If found, the algorithm 1100 can move the nonzero entry (e.g., which is a one since tableaus are binary) to location (k, k) by applying appropriate row and column swaps, can sweep all other nonzero entries in the new column, can increment k, and can continue. If no such item is found, the first stage is complete, and the tableau can have the form shown in tableau 1204 of FIG. 12. In various aspects, lines 13-22 can represent a second stage of the algorithm 1100, and can repeat the same process on the Z-block, starting off at the current k. The tableau at the end of this second stage can have the form shown in tableau 1206 of FIG. 12. In various instances, lines 23-25 can represent a third stage of the algorithm 1100, and can apply Hadamard gates to swap the diagonalized columns in the Z-block with the corresponding columns in the X-block. The tableau at the end of this third stage can have the form shown in tableau 1208 of FIG. 12. If the rank r is less than n, there can be spurious nonzero elements to the right of the diagonal in the X-block. In various cases, lines 26-28 can represents a fourth stage of algorithm 1100, and can sweep these spurious nonzero elements using CNOT operations. The tableau at the end of this fourth stage can have the form shown in tableau 1210 of FIG. 12.

Since the tableau has rank r, it can follow that any row in the X-block with index exceeding r will be zero. It therefore follows that the Pauli operators associated with these rows contain only I and Z terms (e.g., $\sigma_i$ and $\sigma_z$ terms). The Pauli string for rows i with i≤k can consist of all I and Z terms, except for an X or Y term (e.g., $\sigma_x$ and $\sigma_y$ terms) at location i. Moreover, it can be shown (e.g., via proof by contradiction) that rows i in the Z-block with i>r are also zero. This certainly holds for column indices j>k, and so it can be assumed for proof purposes that Z[i,j]=1 with i>r and j≤k. The terms in the Pauli operators for rows i and j commute at all indices except j, where row i has Z and row j has X or Y. The Pauli operators therefore anticommute, which contradicts our assumption that the Pauli operators in the tableau commute. Therefore, it follows that rows i>r in the Z-block are all zero. Note that the CNOT operations in the third stage and the Hadamard operations in the second stage did not affect the values in the bottom-left of the Z-block. It can be concluded that these values must therefore already have been zero at the end of stage two of the algorithm 1100, as shown in tableau 1212 of FIG. 12.

The following result is a direct consequence of the above discussion: The X-block of any tableau corresponding to commuting n-Pauli operators with rank n can be diagonalized using only Hadamard gates.

The fourth stage of the algorithm 1100 can be applicable whenever the rank of the tableau is less than n. In the non-limiting example of FIG. 11, the spurious entries can be cleared using CNOT operations. In various embodiments, there are several ways in which this stage could be improved. For instance, it could be determined whether the corresponding column in the Z-block has fewer nonzero entries. If that were the case, a Hadamard operation could be applied to swap the column and sweep the alternative column instead. Likewise, it would be possible to see if sweeping the column of the Z-block with that of the X-block using a phase gate, followed by a swap would be more efficient. In both of these cases, the number of CNOT operations could be reduced at the cost of single-qubit operations. If two columns in the residual column block are similar, one could be simplified by sweeping with the other using a CNOT operation. Further optimization is possible using any suitable combination of these techniques.

After diagonalization of the X-block, it can be beneficial to update the Z-block, such that all nonzero columns in the X-block are matched with a zero or identical column in the Z-block. Application of combinations of Hadamard and phase gates can then allow clearing (e.g., zeroing out) of the X-block to obtain the simultaneous-diagonalization circuit. As explained below, at least three algorithms/procedures/techniques can facilitate such updating and clearing: pairwise elimination, elimination using CNOT operations, and/or column-based elimination.

First, consider pairwise elimination. Application of the controlled-Z operation on a and b is equivalent to successively applying H(b), CNOT(a,b), and H(b). The overall effect, as illustrated in FIG. 10, is the sweeping of columns a and b in the Z-block with respectively columns b and a of the X-block. This operation can therefore simultaneously eliminate Z[a, b] and Z[b, a] whenever both elements are one. The following result shows that an off-diagonal one is matched by the reflected element: Given a tableau T corresponding to a set of commuting Pauli operators of rank k, applying the diagonalization procedure causes the top-left k-by-k sub-block of the resulting Z-block to be symmetric. To prove this, consider any pair of distinct indices i,j∈[1, k], and denote the string representation of the corresponding Pauli operators of the updated tableau T by $P_i$ and $P_j$. The operations performed during diagonalization preserve commutativity, and $P_i$ and $P_j$ therefore commute. For commutativity, the symbols at locations i and j can be considered; all others are either $\sigma_i$ or $\sigma_z$. It can be verified that symbols $P_i[i]$ and $P_j[i]$ commute if and only if Z[j, i]=0. Likewise, symbols $P_i[j]$ and $P_j[j]$ commute if and only if Z[i,j]=0. It follows that in order for the Pauli operators to commute, it must be that Z[i,j]=Z[j, i]. The result follows by the fact that indices i and j are arbitrary.

With this result, updating the Z-block can reduce to eliminating the lower-triangular entries in the Z-block (e.g., the corresponding upper-triangular entries will be eliminated simultaneously). FIG. 13 illustrates an example, non-limiting algorithm 1300 for facilitating pairwise updating of a Z-block of a tableau in accordance with one or more embodiments described herein. Lines 1-5 of algorithm 1300 (also referred to as algorithm 2) summarize this updating process (e.g., eliminating the lower-triangular entries in the Z-block). After this updating step, clearing of the X-block via single-qubit gates can be facilitated by considering values of the diagonal entries in the Z-block. Lines 6-9 of algorithm 1300 facilitate this clearing. A benefit of algorithm 1300 can be that the elimination process only affects the targeted entries, which means that there is no fill-in. Together with the diagonalization of the X-block, this can provide a classical complexity of $O(n^2 \max(m, n))$, along with the following result: Given a tableau for commuting n-Pauli operators with rank n, diagonalization of the operators can be facilitated using H-CZ-S-H stages with $O(n^2)$ CZ gates. Since the application of the CZ gates does not affect the diagonal entries in the Z-block, it is possible to apply the phase gates first and obtain an H-S-CZ-H scheme.

Figure 15:
FIG. 15 illustrates example, non-limiting diagrams that depict CNOT-updating of a Z-block of a tableau in accordance with one or more embodiments described herein.

Second, consider elimination using CNOT operations. An alternative way of updating the Z-block is based on CNOT operations and is given by algorithm 1400 (also referred to as algorithm 3). FIG. 14 illustrates an example, non-limiting algorithm 1400 for facilitating updating of a Z-block of tableau via CNOT operations in accordance with one or more embodiments described herein. As shown, the main for-loop in lines 1-11 can iteratively ensure that the top-left i-by-i sub-block of the Z-block has ones on the diagonal and zeros elsewhere. The update process for a given i can be depicted by FIG. 15. FIG. 15 illustrates example, non-limiting diagrams 1500 that depict CNOT-updating of a Z-block of a tableau in accordance with one or more embodiments described herein. At the begin of iteration i, the (i−1)×(i−1) sub-block of the Z-block is diagonal, and the desired state at the end of the iteration can be obtained by eliminating any non-zeros occurring in the first i−1 entries in the ith row and column of the Z-block, and by ensuring that Z[i, i]=1. As an example, consider tableau 1502 at the beginning of iteration i. During the iteration, the goal is to eliminate entries Z[4,1] and Z[4,3], and their reflections Z[1,4] and Z[3,4]. Assume that the entry Z[i, i] is 0 or 1 respectively. To eliminate entry Z[1,4], first apply a CNOT (4,1) gate. In addition it also flips the value in Z[i, i] to 1 or 0 respectively, and fills in element X[1,4], as shown in tableau 1504 of FIG. 15. Aside from this, there can be some further updates to the entries of column i with indices exceeding i; these can be irrelevant to the current iteration and can be dealt with in later iterations. Next, eliminate the undesirable fill of element X[1,4] by sweeping row 4 with row 1, which also can clear up element Z[4,1]. Note that this is not a coincidence: since the X-block is diagonal again, it follows from the above discussion that the corresponding block in the Z-block is symmetric. Again, additional updates beyond the block boundaries can be ignored for later iterations. This can result in the tableau 1506 shown in FIG. 15. As the next step, entries Z[3,4] and Z[4,3] can be eliminated by applying CNOT(4,3) as shown in tableau 1508, followed by a sweep of row 4 with row 3, as shown in tableau 1510. Application of the CNOT operation again can cause the value of Z[i, i] to flip to 0 or 1 respectively. Now, it can be beneficial to ensure that the Z[i, i] entry is one. In various aspects, it is possible to facilitate this by checking the latest value and applying S(i) whenever the value is zero. In various embodiments, this can instead by facilitated by setting the value appropriately at the beginning and ensuring that, at the end of all value flips, it ends at the one value. For this, it can be possible to consider the value of Z[i, i] at the beginning and add the number of entries that need to be eliminated and thus incur a flip. If this result value is even, the initial value of Z[i, i] can be changed by applying S(i). This can be facilitated as shown in lines 2-4 of algorithm 1400. Once completed, the first k columns in the Z-block can match those of the X-block. The X-block can then be cleared by applying phase and Hadamard operations on the first k qubits, which is done in lines 12-14 of algorithm 1400. Combined with the diagonalization of the X-block, the following can obtain: Given a tableau for commuting n-Pauli operators with rank n, diagonalization of the operators can be facilitated using H-S-CX-S-H stages with $O(n^2)$ CX gates. This can be further improved by known methods that show that CNOT circuits consisting of $O(n^2)$ gates can be reduced to $O(n^2/\log(n))$ gates. The overall classical complexity of this diagonalization procedure can be $O(mn \min(m, n))$.

Third, consider column-based elimination. In the two above updating/clearing techniques, each iteration for updating the Z-block zeros out exactly two elements. In various instances, it can be better to clear multiple entries at once. Consider a situation where the X-block is diagonal and the initial Z-block is as shown in diagram 1602 of FIG. 16. FIG. 16 illustrates example, non-limiting diagrams 1600 that depict normalization of a Z-block of a tableau in accordance with one or more embodiments described herein. A shown in diagram 1602, the second and third columns are nearly identical, and sweeping one with the other using a CNOT operation would leave only a single non-zero entry in the updated column in the location where the two differed. So, the following approach can be used. Given a set of columns that is yet to be swept, I, first determine the column i∈I that has a minimum number of non-zero off-diagonal elements; that is, the number of CNOT gates needed to clear them. Next, consider the Hamming distance between all pairs of columns i,j∈I, excluding rows i and j. The reason for excluding the entries is that the X-block is diagonal, and therefore the diagonal entries in the Z-block can be easily updated to the desire value using Hadamard or phase gates. The total number of CNOT operations to clear column i with column j is then equal to their off-diagonal distance plus one for the column sweep itself. That is, after sweeping the columns, it can be possible to still need to take care of the remaining entries in the column using elementwise elimination. There are many possible ways to combine these steps. One approach can be to greedily determine the lowest number of CNOT operations needed to clear any of the remaining columns in I (referred to as greedy-1). Once the column has been cleared aside from the diagonal entry, the corresponding column in the X-block can be zeroed out and the entry can be removed from I.

As an example, FIG. 16 illustrates the application of this technique. Starting with I={1,2,3,4,5,6}, first determine the number of off-diagonal elements to sweep in each single column, which turns out to be three in this example. For elimination using pairs of columns, the distance between columns 1 and 3 is one, provided that the diagonal entry in column 3 is updated. Columns 2 and 3 have an off-diagonal distance of two, as do columns 4 and 5. At each iteration, choose the first minimum encountered, in this case columns 1 and 3, as highlighted in diagram 1604. To clear column 1, first update the diagonal entry in column 3 by applying a phase gate. Next, apply a CNOT operation that sweeps column 1 with the updated column 3, to arrive at the Z-block shown in diagram 1606. As seen in FIG. 15, the CNOT operation can cause fill-in of the X-block, which can be eliminated by sweeping row 1 with row 3. Doing so restores diagonality of the X-block and symmetry of the Z-block. The result of this operation can be seen in diagram 1608. What remains is to pairwise eliminate the remaining entries in column 1, and by symmetry of row 1, and clear column 1 of the X-block. This can finalize the clearance of column 1, so 1 can be removed from active set I, and can result in the Z-block shown in diagram 1610. Starting with a new iteration, again count the number of off-diagonal entries to sweep per column. The minimum of two occurs in column 5. Pairwise sweeping does not improve on this, and therefore the entries can be cleared directly, as explained above. Then, clear column 5 of the X-block and remove the column from I. The algorithm can continue in this fashion until I is empty.

As explained above, the greedy-1 approach considers the number of CNOT operations. An alternative approach, referred to as greedy-2, can take into account the number of single-qubit gates when the number of CNOT gates match. Recall that in the first iteration, there were several pairs of columns with a minimal off-diagonal distance of one. The greedy-1 strategy chooses to clear column 1 with column 3, which requires one phase gate to clear the diagonal entry of column 3, a CNOT and CZ operation respectively for sweeping the column and remaining off-diagonal entry, and finally a Hadamard operation to clear column 1 of the X-block. Alternatively, choosing to clear column 2 with column 3 would require an initial CNOT for the column sweep, a CZ for removing the remaining off-diagonal entry, and a Hadamard operation to clear column 2 of the X-block. The latter approach can require the same number of CNOT operations, but can require one fewer single-qubit gate. The greedy-2 technique would therefore choose this option. For this particular example, pairwise elimination requires ten CNOT operations, whereas the greedy approach requires seven and six CNOT operations, respectively. For all three algorithms, the number of single-qubit operations is six. The complexity of column-based elimination of the Z-block is $O(k^4)$, where k is the rank of the tableau. This assumes that at each stage of the algorithm, the distance between all pairs of the remaining columns can be recomputed. More efficient implementations can be possible.

Once the X-block in the tableau is cleared (e.g., via pairwise elimination, elimination using CNOT operations, and/or column-based elimination), it is possible to either undo all row sweep and row swap operations and/or to reapply all Clifford operators on the initial tableau, in order to obtain the diagonalized Pauli operators corresponding to the given subset of commuting Pauli operators. FIG. 17 illustrates example, non-limiting diagrams 1700 that depict CNOT reduction in accordance with one or more embodiments described herein. Diagram 1702 illustrates the transpose of the resulting Z-block for a set of 20 Pauli operators over 7 qubits, represented as columns. In the plot, gray cells represent Pauli-Z terms, while white cells represent identity terms. For exponentiation, CNOT gates can be added to each of the Pauli-Z terms. As illustrated in FIG. 6, CNOT operators can be cancelled between successive Pauli-Z terms on the same qubit. The resulting number of CNOT gates for each of the seven qubits in this example is given on the right of diagram 1702, for a total of 72 CNOT gates. For ease of counting, imaging all-identity Pauli operators before the first and after the last operator and count the number of transition from white to gray and vice versa. In order to reduce the number of transitions, permute the order of the operators within the commuting set. This can be done as shown in diagram 1704, where all operators in qubit one are sorted first. Then recursively partition the operators in the I set, such that all I operators appear before Z operators, and vice versa for the Z set. The resulting binary tree-like structure in diagram 1704 can reduce the total number of CNOT gates needed to implement the circuit from the original 72 down to 58. The order in which the qubits are traversed can make a difference in some instances. Diagram 1706 shows a histogram of the number of CNOT gates required for all possible permutations of traversal order, ranging from 38 to 60 gates. The large rang in gate count indicates that there may still be room for improvement in the ordering strategies. As seen in diagram 1704, qubits that appear earlier in the ordering tend to require fewer CNOT gates. This can be leveraged when optimizing the circuit for a particular quantum processor where operators between non-neighboring qubits are implemented using intermediate swap operations. In this case, the number of CNOT operations between topologically distant qubits can be reduced by having them appear in the ordering earlier. Alternative implementations where CNOT gates are connected to qubits of successive Z terms are possible. Ordering of operators in the Z-block has a classical complexity of O(mn).

In various instances, various of the above-discussed details regarding tableau manipulations can be facilitated and/or implemented by the diagonalization component 112 to generate the one or more simultaneous-diagonalization circuits $U_1$ to $U_N$.

Figure 18:
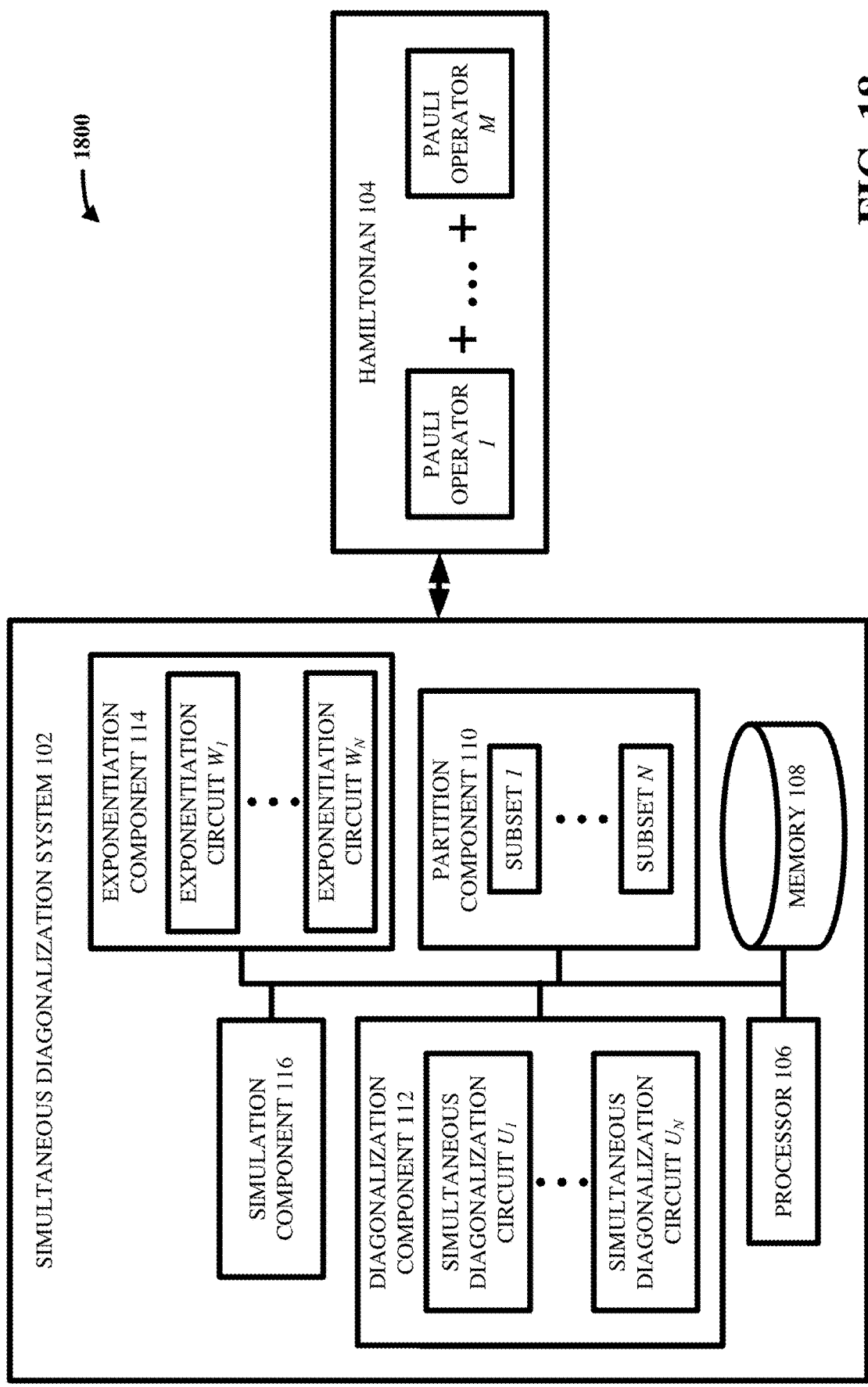
FIG. 18 illustrates a block diagram of an example, non-limiting system including exponentiation circuits that facilitates Hamiltonian simulation based on simultaneous-diagonalization in accordance with one or more embodiments described herein.

FIG. 18 illustrates a block diagram of an example, non-limiting system 1800 including exponentiation circuits that can facilitate Hamiltonian simulation based on simultaneous-diagonalization in accordance with one or more embodiments described herein.

In various embodiments, the exponentiation component 114 can generate (e.g., via any suitable exponentiation technique, as explained above) one or more exponentiation circuits $W_1$ to $W_N$, which can respectively correspond to the one or more subsets 1 to N. In various cases, for each subset, the corresponding exponentiation circuit can exponentiate the diagonalized commuting Pauli operators in the subset.

In various aspects, the simulation component 116 can concatenate the one or more simultaneous-diagonalization circuits $U_1$ to $U_N$, the one or more exponentiation circuits $W_1$ to $W_N$, and one or more adjoints of the one or more simultaneous-diagonalization circuits $U_1$ to $U_N$ in order to simulate a time evolution of the Hamiltonian 104. In various aspects, the simulation component can generate the circuit $U_1^\dagger W_1 U_1$ to simulate subset 1 (e.g., to partially simulate the Hamiltonian 104), and can generate the circuit $U_N^\dagger W_N U_N$ to simulate subset N (e.g., to partially simulate the Hamiltonian 104). In various aspects, the simulation component 116 can concatenate these partial simulation circuits to fully simulate the Hamiltonian.

Figure 19:
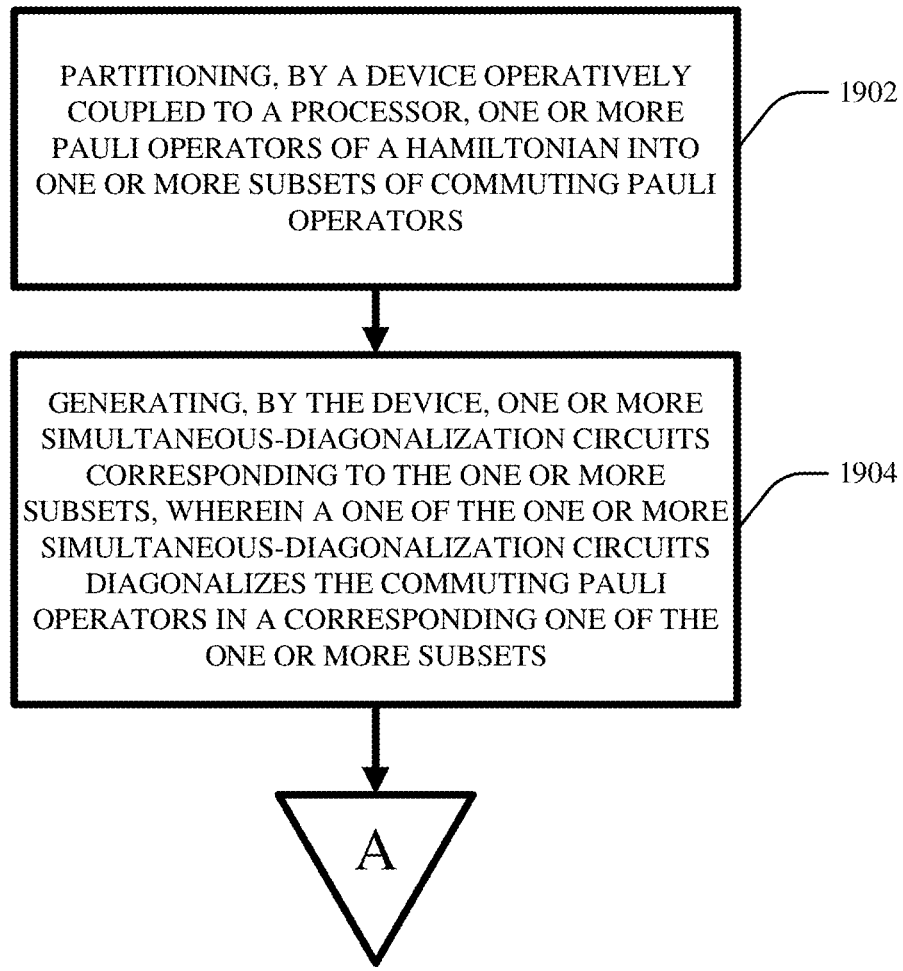
FIG. 19 illustrates a flow diagram of an example, non-limiting computer-implemented method that facilitates Hamiltonian simulation based on simultaneous-diagonalization in accordance with one or more embodiments described herein.

FIG. 19 illustrates a flow diagram of an example, non-limiting computer-implemented method 1900 that can facilitate Hamiltonian simulation based on simultaneous-diagonalization in accordance with one or more embodiments described herein.

In various embodiments, act 1902 can include partitioning, by a device operatively coupled to a processor (e.g., 110), one or more Pauli operators (e.g., 1 to M) of a Hamiltonian (e.g., 104) into one or more subsets (e.g., 1 to N in FIG. 1) of commuting Pauli operators.

In various instances, act 1904 can include generating, by the device (e.g., 112), one or more simultaneous-diagonalization circuits (e.g., 1 to N in FIG. 8) corresponding to the one or more subsets, wherein a one of the one or more simultaneous-diagonalization circuits diagonalizes the commuting Pauli operators in a corresponding one of the one or more subsets.

Figure 20:
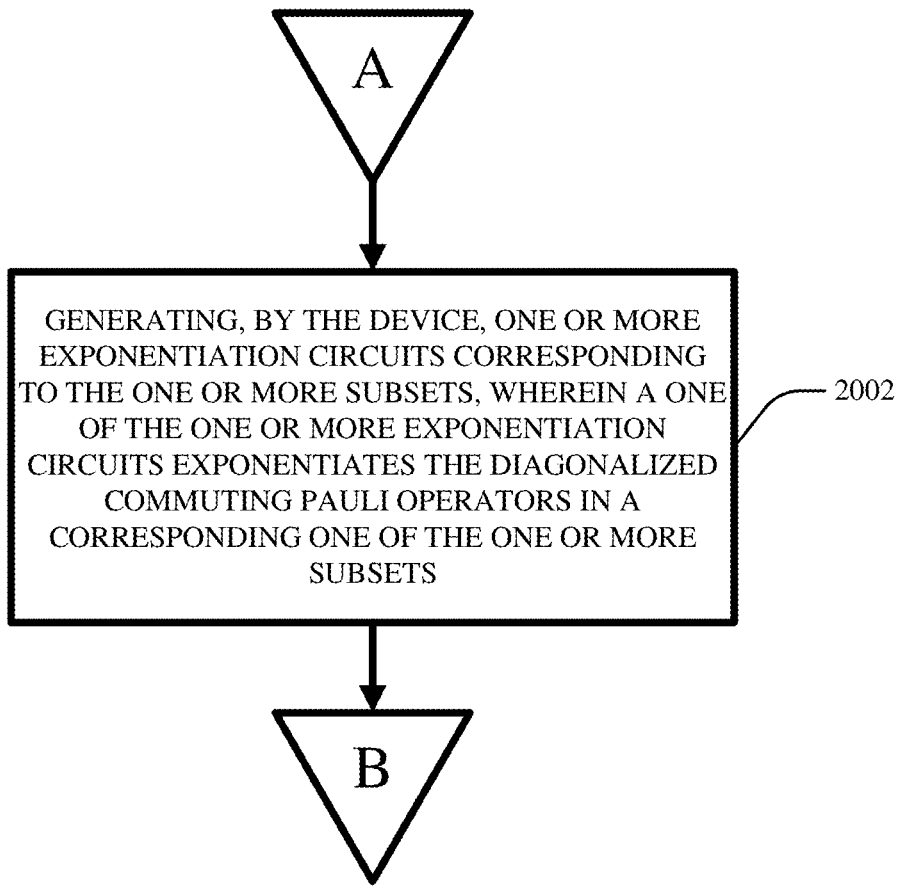
FIG. 20 illustrates a flow diagram of an example, non-limiting computer-implemented method including exponentiation that facilitates Hamiltonian simulation based on simultaneous-diagonalization in accordance with one or more embodiments described herein.

FIG. 20 illustrates a flow diagram of an example, non-limiting computer-implemented method 2000 including exponentiation that can facilitate Hamiltonian simulation based on simultaneous-diagonalization in accordance with one or more embodiments described herein.

In various aspects, act 2002 can include generating, by the device (e.g., 114), one or more exponentiation circuits (e.g., 1 to N in FIG. 18) corresponding to the one or more subsets, wherein a one of the one or more exponentiation circuits exponentiates the diagonalized commuting Pauli operators in a corresponding one of the one or more subsets.

Figure 21:
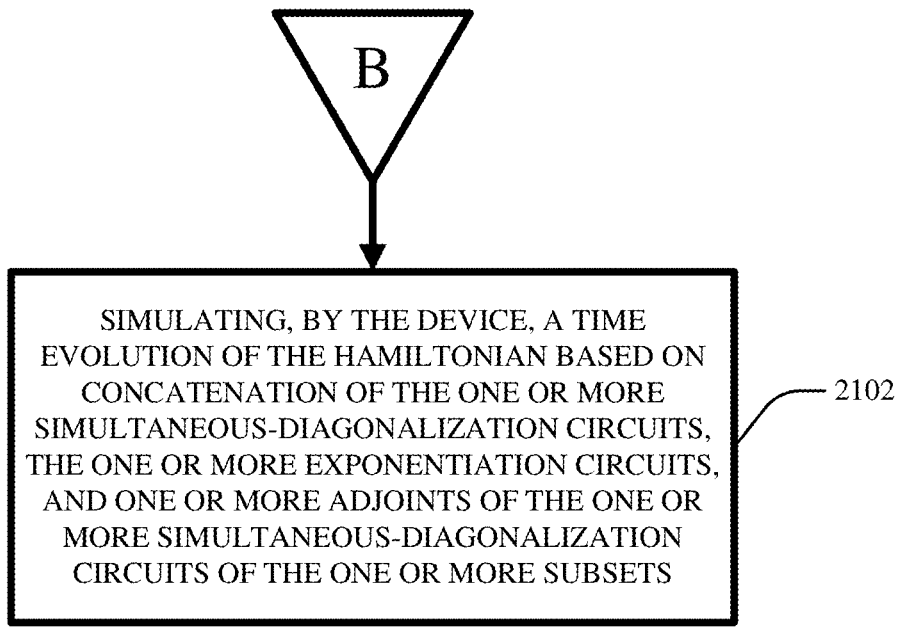
FIG. 21 illustrates a flow diagram of an example, non-limiting computer-implemented method including concatenation that facilitates Hamiltonian simulation based on simultaneous-diagonalization in accordance with one or more embodiments described herein.

FIG. 21 illustrates a flow diagram of an example, non-limiting computer-implemented method 2100 including concatenation that can facilitate Hamiltonian simulation based on simultaneous-diagonalization in accordance with one or more embodiments described herein.

In various instances, act 2102 can include simulating, by the device (e.g., 116), a time evolution of the Hamiltonian based on concatenation of the one or more simultaneous-diagonalization circuits, the one or more exponentiation circuits, and one or more adjoints of the one or more simultaneous-diagonalization circuits of the one or more subsets to simulate a time evolution of the Hamiltonian.

Figure 22:
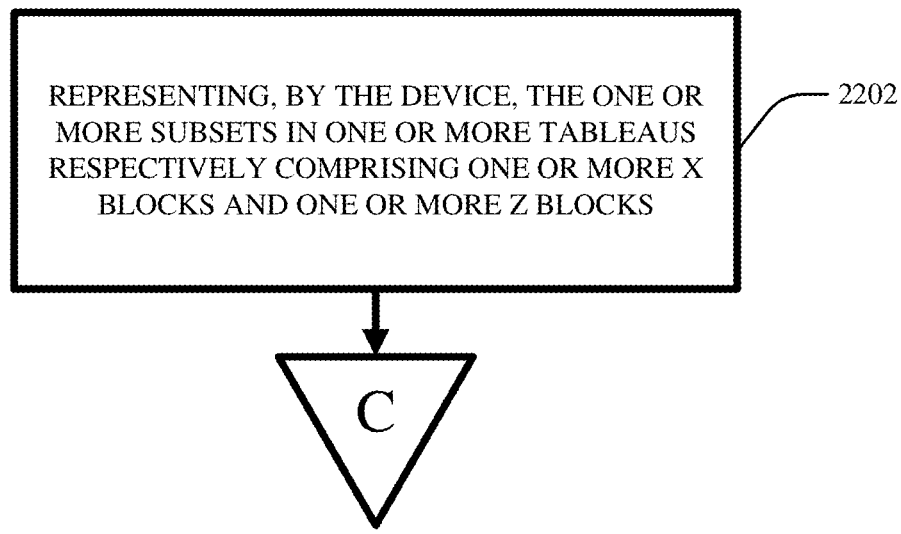
FIG. 22 illustrates a flow diagram of an example, non-limiting computer-implemented method that facilitates generation of simultaneous-diagonalization circuits in accordance with one or more embodiments described herein.

FIG. 22 illustrates a flow diagram of an example, non-limiting computer-implemented method 2200 that can facilitate generation of simultaneous-diagonalization circuits in accordance with one or more embodiments described herein.

In various aspects, act 2202 can include representing, by the device (e.g., 112), the one or more subsets in one or more tableaus respectively comprising one or more X-blocks and one or more Z-blocks.

Figure 23:
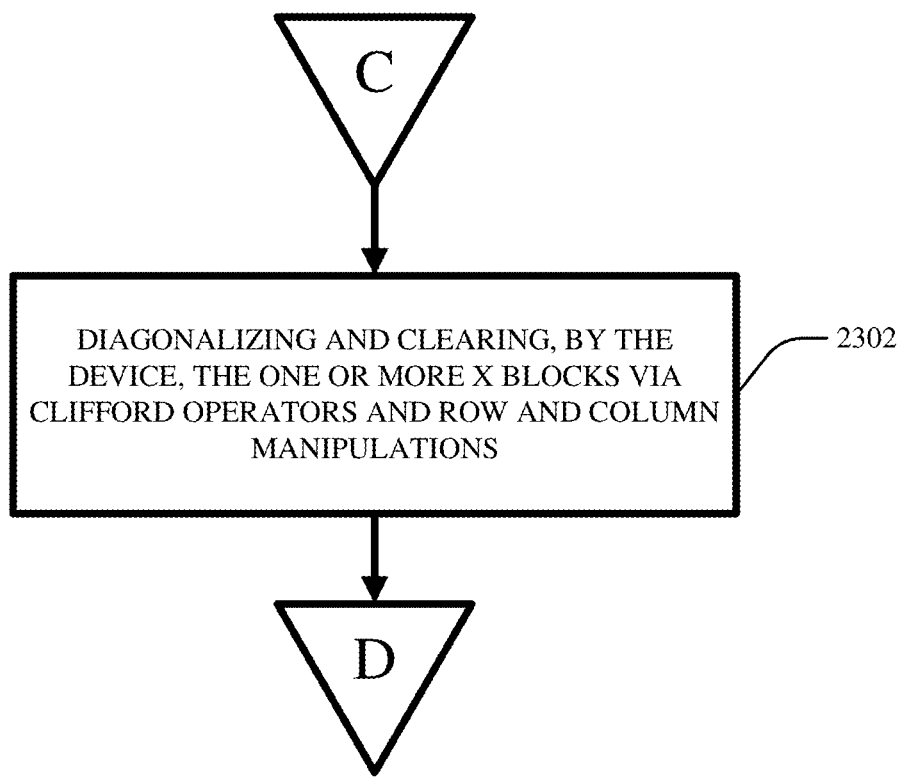
FIG. 23 illustrates a flow diagram of an example, non-limiting computer-implemented method including diagonalizing and clearing an X-block of a tableau that facilitates generation of simultaneous-diagonalization circuits in accordance with one or more embodiments described herein.

FIG. 23 illustrates a flow diagram of an example, non-limiting computer-implemented method 2300 including diagonalizing and clearing an X-block of a tableau that can facilitate generation of simultaneous-diagonalization circuits in accordance with one or more embodiments described herein.

In various cases, act 2302 can include diagonalizing and clearing, by the device (e.g., 112), the one or more X-blocks via Clifford operators and row and column manipulations.

Figure 24:
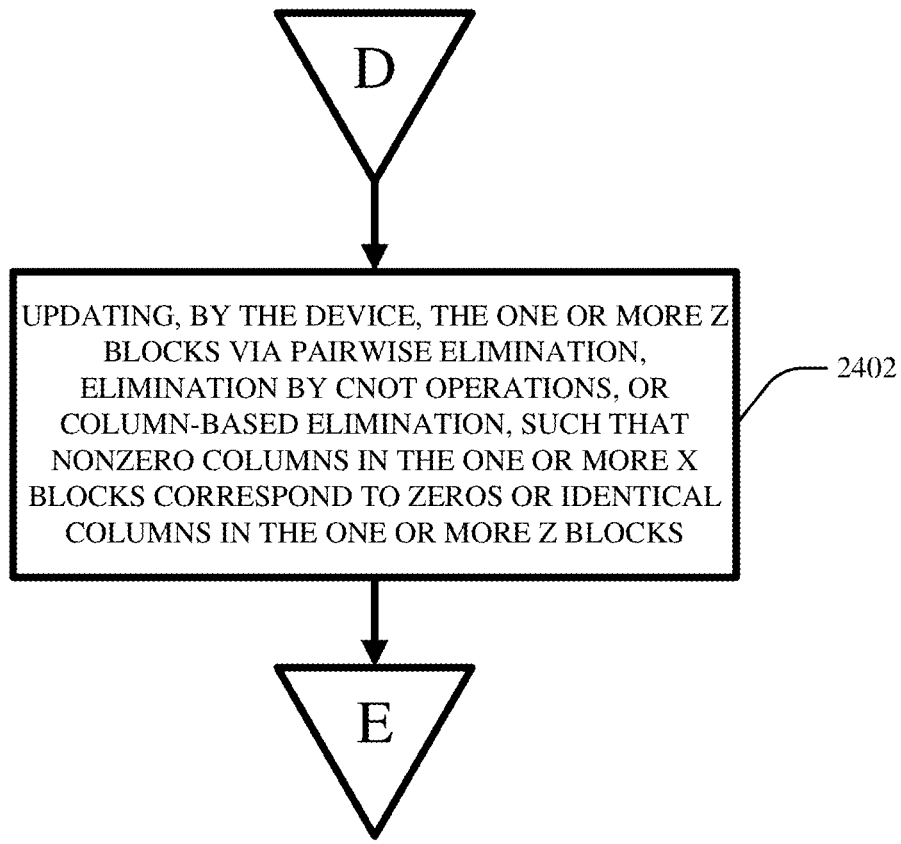
FIG. 24 illustrates a flow diagram of an example, non-limiting computer-implemented method including updating a Z-block of a tableau that facilitates generation of simultaneous-diagonalization circuits in accordance with one or more embodiments described herein.

FIG. 24 illustrates a flow diagram of an example, non-limiting computer-implemented method 2400 including updating a Z-block of a tableau that can facilitate generation of simultaneous-diagonalization circuits in accordance with one or more embodiments described herein.

In various instances, act 2402 can include updating, by the device (e.g., 112), the one or more Z-blocks via pairwise elimination, elimination by CNOT operations, or column-based elimination, such that nonzero columns in the one or more X-blocks correspond to zeros or identical columns in the one or more Z-blocks.

Figure 25:
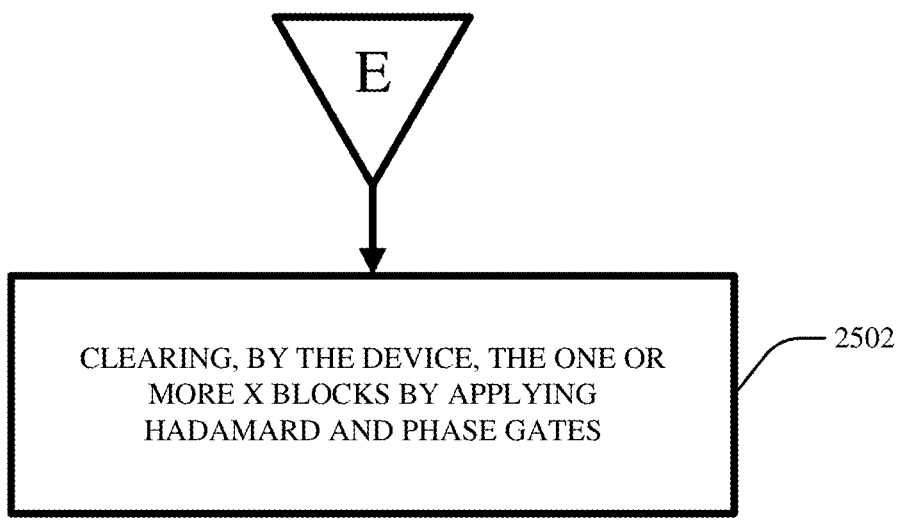
FIG. 25 illustrates a flow diagram of an example, non-limiting computer-implemented method including clearing an X-block of a tableau that facilitates generation of simultaneous-diagonalization circuits in accordance with one or more embodiments described herein.

FIG. 25 illustrates a flow diagram of an example, non-limiting computer-implemented method 2500 including clearing an X-block of a tableau that can facilitate generation of simultaneous-diagonalization circuits in accordance with one or more embodiments described herein.

In various cases, act 2502 can include clearing, by the device (e.g., 112), the one or more X-blocks by applying Hadamard and phase gates.

The inventors of the subject invention performed various experiments to validate that reduced circuit complexity (e.g., reduced CNOT count, reduced circuit depth, reduced single-qubit gates) can be facilitated by various embodiments of the invention. During such experiments, Qiskit circuit optimization was used and the package was used to determine circuit depths. In various experiments, the inventors generated (e.g., via algorithm 2800 in FIG. 28, also referred to as algorithm 4) twenty random sets of commuting n-Pauli operators with n ranging from 3 to 25. The resulting tableaus had rank n by construction. Each set was subjected to either pairwise elimination (denoted CZ); CNOT-based elimination either directly (denoted CNOT), using CNOT reduction with block size equal to $\log_2$ (n) (denoted CNOT-log 2), or CNOT-based elimination with optimal block size in the range 1 through n (denoted CNOT-best); the greedy-1 and/or greedy-2 techniques; and/or suitable tableau normalization techniques associated with efficient inner-product algorithms for stabilizer states (denoted gmc). Results denoted "direct" correspond to Hamiltonian simulation techniques that do not make use of simultaneous diagonalization. The results averaged over the twenty problem instances are summarized in FIG. 26, where the optimized simulation block gives the circuit complexity after appropriately reordering the Pauli operators. As shown, the first column results list the number of CNOT operators, the number of single-qubit gates, and the depth of the generated circuit for diagonalizing the set of Paulis. The second and third columns summarize the circuit complexity when the methods are applied to simulate products of the Pauli exponentials. As shown in FIG. 26, all the techniques that utilize simultaneous diagonalization exhibit significantly lower circuit complexity (e.g., reduction in CNOT count and circuit depth) than the direct approach, especially as the number of qubits increases. FIG. 26 also shows a trend in which techniques that result in larger numbers of CNOT gates tend to have smaller circuit depth. As shown, the total depth of the circuit is approximately twice the diagonalization circuit depth, plus the number of CNOT gates in the central part responsible for exponentiation, plus an additional single-qubit $R_z$ gate for each of the n Pauli operators. Having more CNOT gates in a shallower circuit can indicate a higher level of parallelism where two or more gates can be applied simultaneously. Thus, one improvement to the CZ approach can be, instead of sweeping the entries row by row, the entries can be processed in a way that promotes parallelism by avoiding repeated dependence on a single qubit. Another possible modification can be to connect the CNOT gates between pairs of qubits where the Pauli term is Z, and only eventually connecting the partial parity values to the ancilla. This could, in some cases, help improve locality of the CNOT operators and enable a higher level of parallelism, at the cost of potentially more complex optimization and circuit generation code.

Figure 27:
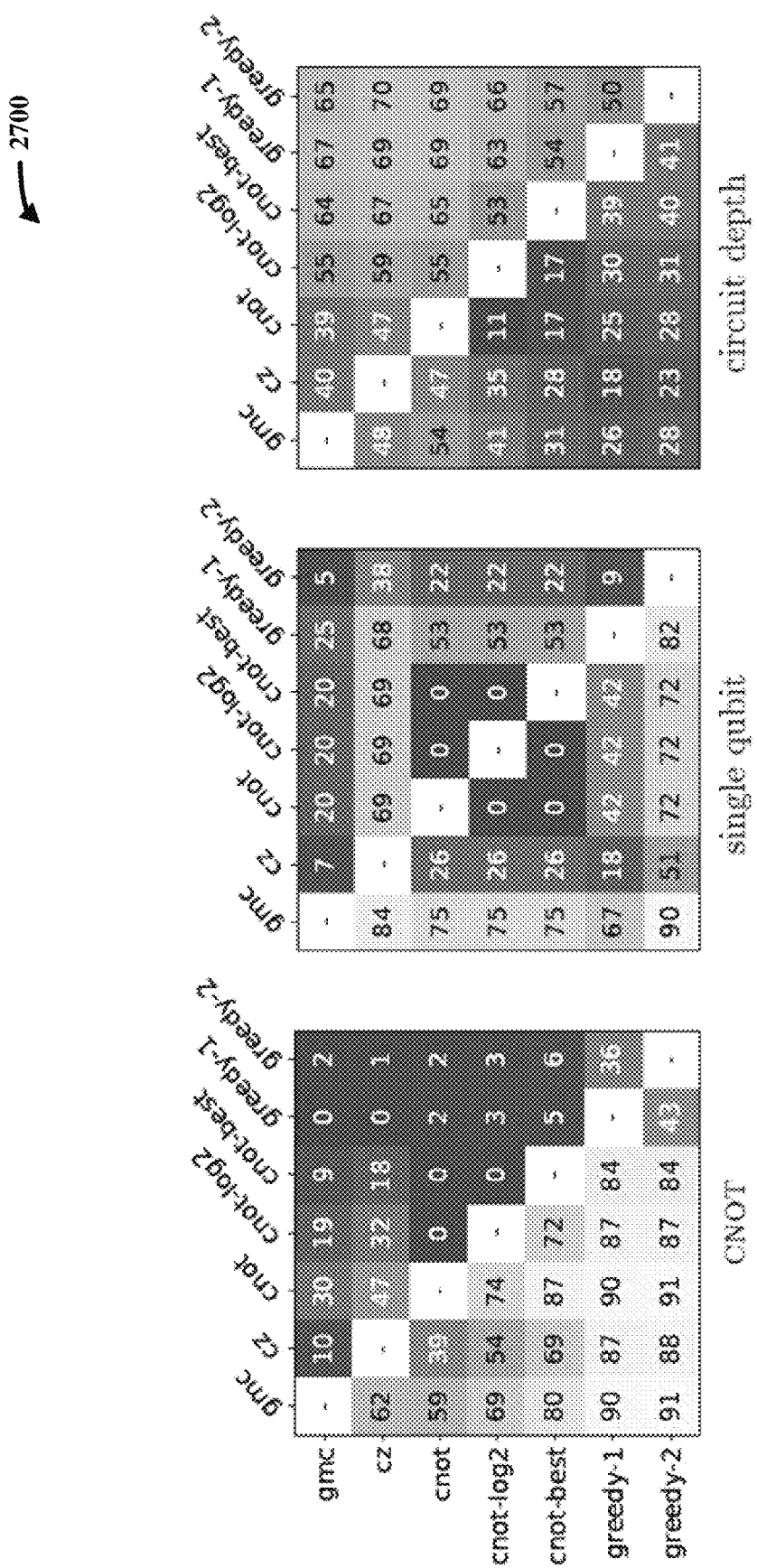

FIG. 27 provides an aggregated comparison of the performance of the different techniques and gives the percentage of problem instances across all problem sizes for which the technique on the vertical axis strictly outperforms the method on the horizontal axis.

FIG. 29 depicts experimental results for experimental tests conducted on general sets of Paulis, using m Pauli operators on 20 qubits with no optimization (base), single-pass optimization (opt), or the best of 100 randomized optimization (rnd). In such experiments, three types of optimization were used: base optimization (denoted base) which uses the operators in the order they are provided; optimization by applying ordering techniques described above (denoted opt); and optimization based on random permutations (denoted rnd) where permutations of 1 to n are used to determine qubit sorting order. For the direct approach, permutations of 1 to m were used to shuffle the operators order before applying the greedy optimization procedure, where the first permutation is the canonical ordering to ensure the results are at least as good as those of the opt strategy. For these experiments, 100 random permutations per setting were used and then the result that has the lowest number of CNOT gates was selected. The gmc method does not apply to non-square tableaus, and so it was not used here. FIG. 29 shows the average circuit complexities for simulation, obtained for the three optimization procedures for n=20 and varying values of m. In FIG. 29, results are grouped by resource type (CNOT and single-qubit counts and depth), whereas in FIG. 26 they were grouped by optimization type (base or opt). As shown in FIG. 29, the simultaneous-diagonalization based techniques are significantly better than the direct approach. As shown, the diagonalization part of the circuit has a complexity that is essentially constant for m≥n, and the overhead therefore diminishes as m grows, thereby leading to a potential further improvement over the direct approach.

FIG. 30 depicts algorithm 3000 (also referred to algorithm 5) which provides a slightly different procedure of diagonalizing the X-block of a tableau. It can be proven that, given a full-rank tableau T=[X, Z] in $F_2^{n \times 2n}$ (where $F_2$ denotes the binary group), then the output of algorithm 3000 applied to tableau B·T gives the same tableau and index set I for any full-rank $B \in F_2^{m \times n}$ with m≥n. For analysis, it can be easier to update the algorithm to omit column exchanges between the X-block and the Z-block, and instead sweep directly based on the entries in the column of the X-block if the index is found there or based on the entries in the column of the Z-block otherwise. Note that full-rankness of the tableau guarantees that at least one of the indices exists. Although algorithm 3000 does not apply the column exchanges, it does maintain index set I. Applying the Hadamard operator to the columns (qubits) in I after normalization gives the original algorithm since row-based operations commute with Hadamard.

All tableaus can be generated as linear combinations of rows in T. It then follows from the full-rankness of B that all Paulis corresponding to the tableaus can be instantiated using the same generator set. The updated normalization of algorithm 3000 produces generator sets of the same form used in algorithm 2800. Since representation in this form is unique, no generator set has more than one tableau representation. So, algorithm 3000 must therefore return the same tableau and index set I. Given that the tableaus after diagonalization of the X-block and the number of Hadamard gates used in the process are identical, it follows that the circuit complexity for simultaneous diagonalization is the same for m≥n. For CZ-based diagonalization, the expected CNOT count then follows directly from the construction of the random Pauli bases in algorithm 2800. For each of the rows that are set in the Z-block, on average half of the entries will be one. In case of the column swap, no additional entries are set to one, and the expected number of elements to sweep is therefore:

$$\sum_{i=0}^{n-1} \frac{n-i}{2} \cdot \frac{2^{n-i}}{2^{n-i}+1} \leq n(n-1)/4$$

A consequence of this result is that algorithm 3000 can be used to generate a unique representation of a stabilizer state, irrespective of its original representation. Moreover, the Z-block and index set I can be concisely represented a n×n+1 binary matrix. Similarly, the technique can be used to check if two sets of commuting Paulis have a common generator set up to signs. In some cases, the full-rankness condition can be relaxed (e.g., the tableau can be augmented by adding rows with the missing diagonal elements, where these basis vectors are not used in linear combinations of the original rows in T and can be discarded after normalization).

Figure 35:
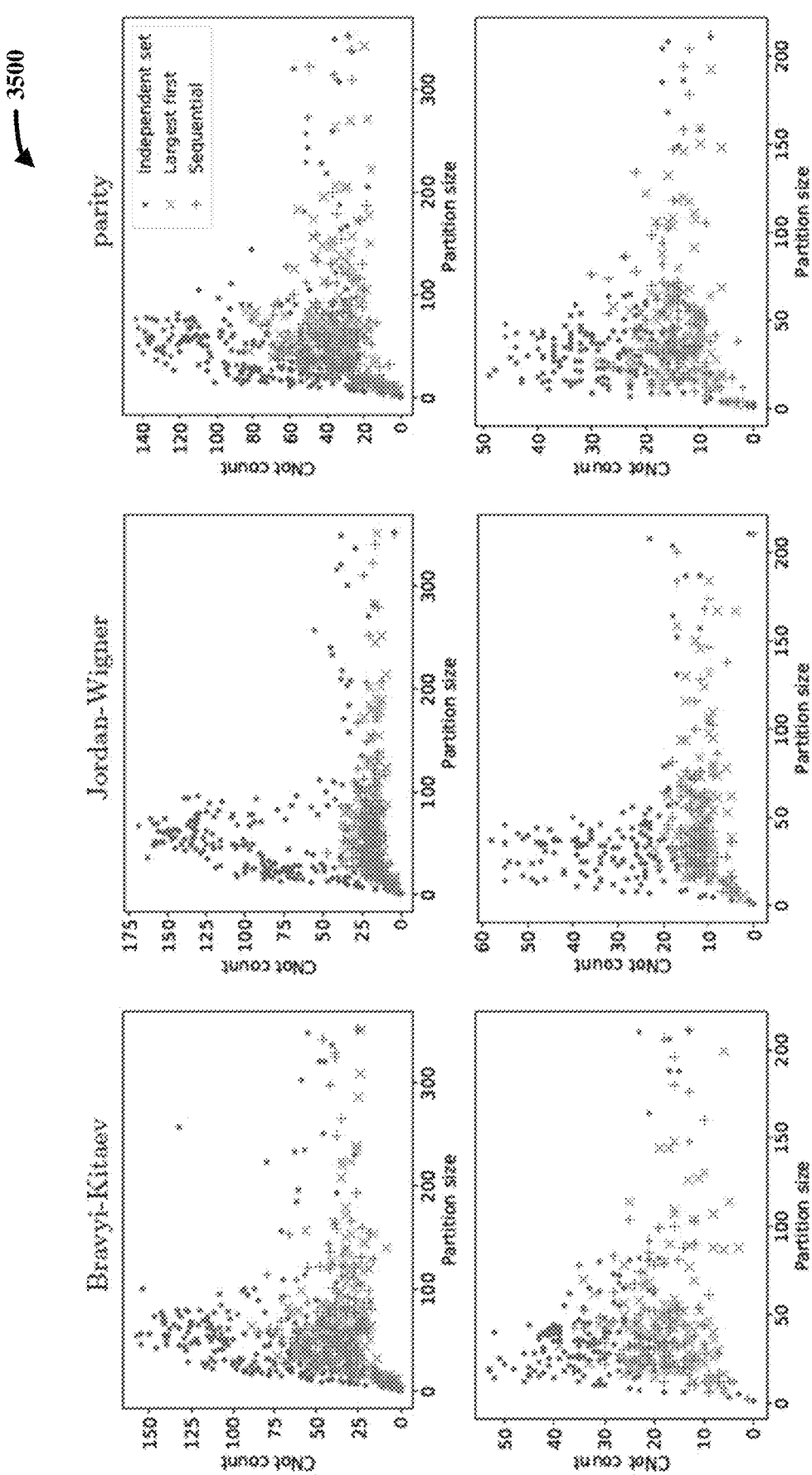

FIG. 31-35 depict experimental results for Hamiltonian simulations arising from fermionic many-body quantum systems. Second quantization formalism was applied, followed by Jordan-Wigner, Bravyi-Kitaev, or parity encodings, to express the Hamiltonians as weighted sums of Paulis. FIG. 31 shows problem instances of different molecules when discretized in given bases, along with number of qubits and resulting number of Pauli terms in the Hamiltonian. FIG. 32 shows circuit complexity when partitioning the Hamiltonians with the greedy sequential approach. FIG. 33 shows CNOT counts for different exponentiation methods. FIG. 34 shows circuit depth for different exponentiation methods. FIG. 35 depicts plots of the number of CNOT gates for the diagonalization circuit for each of the partitions against the size of the partition for various partitioning strategies, with the top plots representing $H_2O$ using the 6-31 G basis and CZ diagonalization, and the bottom plots representing HCl using the STO3g basis and greedy-2 diagonalization.

Figure 36:
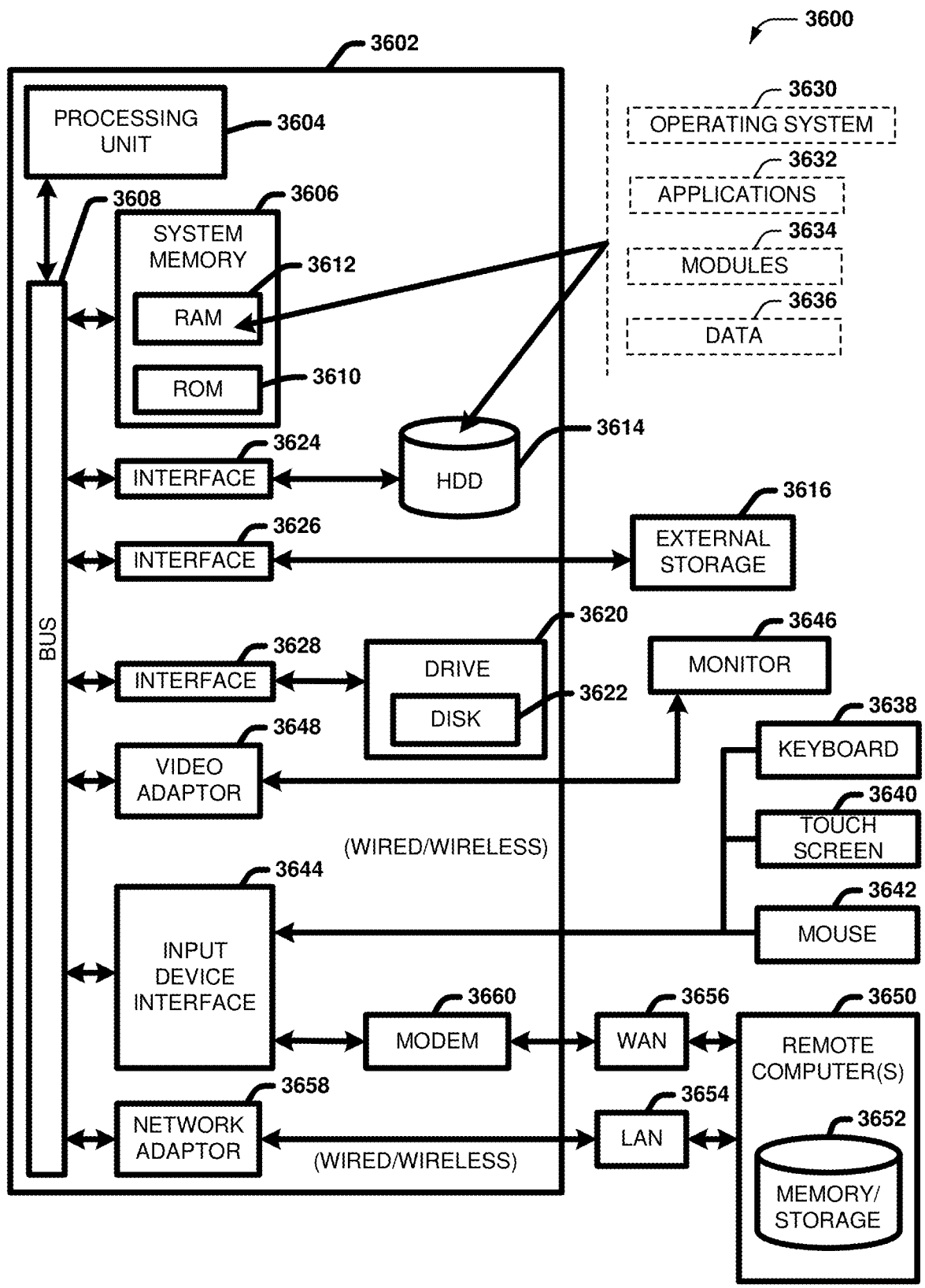
FIG. 36 illustrates a block diagram of an example, non-limiting operating environment in which one or more embodiments described herein can be facilitated.

In order to provide additional context for various embodiments described herein, FIG. 36 and the following discussion are intended to provide a brief, general description of a suitable computing environment 3600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 36, the example environment 3600 for implementing various embodiments of the aspects described herein includes a computer 3602, the computer 3602 including a processing unit 3604, a system memory 3606 and a system bus 3608. The system bus 3608 couples system components including, but not limited to, the system memory 3606 to the processing unit 3604. The processing unit 3604 can be any of various commercially available processors. Dual microprocessors and other multi-processor architectures can also be employed as the processing unit 3604.

The system bus 3608 can be any of several types of bus structure that can further interconnect to a memory bus (with or without a memory controller), a peripheral bus, and a local bus using any of a variety of commercially available bus architectures. The system memory 3606 includes ROM 3610 and RAM 3612. A basic input/output system (BIOS) can be stored in a non-volatile memory such as ROM, erasable programmable read only memory (EPROM), EEPROM, which BIOS contains the basic routines that help to transfer information between elements within the computer 3602, such as during startup. The RAM 3612 can also include a high-speed RAM such as static RAM for caching data.

The computer 3602 further includes an internal hard disk drive (HDD) 3614 (e.g., EIDE, SATA), one or more external storage devices 3616 (e.g., a magnetic floppy disk drive (FDD) 3616, a memory stick or flash drive reader, a memory card reader, etc.) and a drive 3620, e.g., such as a solid state drive, an optical disk drive, which can read or write from a disk 3622, such as a CD-ROM disc, a DVD, a BD, etc. Alternatively, where a solid state drive is involved, disk 3622 would not be included, unless separate. While the internal HDD 3614 is illustrated as located within the computer 3602, the internal HDD 3614 can also be configured for external use in a suitable chassis (not shown). Additionally, while not shown in environment 3600, a solid state drive (SSD) could be used in addition to, or in place of, an HDD 3614. The HDD 3614, external storage device(s) 3616 and drive 3620 can be connected to the system bus 3608 by an HDD interface 3624, an external storage interface 3626 and a drive interface 3628, respectively. The interface 3624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3612, including an operating system 3630, one or more application programs 3632, other program modules 3634 and program data 3636. All or portions of the operating system, applications, modules, and/or data can also be cached in the RAM 3612. The systems and methods described herein can be implemented utilizing various commercially available operating systems or combinations of operating systems.

Computer 3602 can optionally comprise emulation technologies. For example, a hypervisor (not shown) or other intermediary can emulate a hardware environment for operating system 3630, and the emulated hardware can optionally be different from the hardware illustrated in FIG. 36. In such an embodiment, operating system 3630 can comprise one virtual machine (VM) of multiple VMs hosted at computer 3602. Furthermore, operating system 3630 can provide runtime environments, such as the Java runtime environment or the .NET framework, for applications 3632. Runtime environments are consistent execution environments that allow applications 3632 to run on any operating system that includes the runtime environment. Similarly, operating system 3630 can support containers, and applications 3632 can be in the form of containers, which are lightweight, standalone, executable packages of software that include, e.g., code, runtime, system tools, system libraries and settings for an application.

Further, computer 3602 can be enable with a security module, such as a trusted processing module (TPM). For instance with a TPM, boot components hash next in time boot components, and wait for a match of results to secured values, before loading a next boot component. This process can take place at any layer in the code execution stack of computer 3602, e.g., applied at the application execution level or at the operating system (OS) kernel level, thereby enabling security at any level of code execution.

A user can enter commands and information into the computer 3602 through one or more wired/wireless input devices, e.g., a keyboard 3638, a touch screen 3640, and a pointing device, such as a mouse 3642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3604 through an input device interface 3644 that can be coupled to the system bus 3608, but can be connected by other interfaces, such as a parallel port, an IEEE 1394 serial port, a game port, a USB port, an IR interface, a BLUETOOTH® interface, etc.

A monitor 3646 or other type of display device can be also connected to the system bus 3608 via an interface, such as a video adapter 3648. In addition to the monitor 3646, a computer typically includes other peripheral output devices (not shown), such as speakers, printers, etc.

The computer 3602 can operate in a networked environment using logical connections via wired and/or wireless communications to one or more remote computers, such as a remote computer(s) 3650. The remote computer(s) 3650 can be a workstation, a server computer, a router, a personal computer, portable computer, microprocessor-based entertainment appliance, a peer device or other common network node, and typically includes many or all of the elements described relative to the computer 3602, although, for purposes of brevity, only a memory/storage device 3652 is illustrated. The logical connections depicted include wired/wireless connectivity to a local area network (LAN) 3654 and/or larger networks, e.g., a wide area network (WAN) 3656. Such LAN and WAN networking environments are commonplace in offices and companies, and facilitate enterprise-wide computer networks, such as intranets, all of which can connect to a global communications network, e.g., the Internet.

When used in a LAN networking environment, the computer 3602 can be connected to the local network 3654 through a wired and/or wireless communication network interface or adapter 3658. The adapter 3658 can facilitate wired or wireless communication to the LAN 3654, which can also include a wireless access point (AP) disposed thereon for communicating with the adapter 3658 in a wireless mode.

When used in a WAN networking environment, the computer 3602 can include a modem 3660 or can be connected to a communications server on the WAN 3656 via other means for establishing communications over the WAN 3656, such as by way of the Internet. The modem 3660, which can be internal or external and a wired or wireless device, can be connected to the system bus 3608 via the input device interface 3644. In a networked environment, program modules depicted relative to the computer 3602 or portions thereof, can be stored in the remote memory/storage device 3652. It will be appreciated that the network connections shown are example and other means of establishing a communications link between the computers can be used.

When used in either a LAN or WAN networking environment, the computer 3602 can access cloud storage systems or other network-based storage systems in addition to, or in place of, external storage devices 3616 as described above, such as but not limited to a network virtual machine providing one or more aspects of storage or processing of information. Generally, a connection between the computer 3602 and a cloud storage system can be established over a LAN 3654 or WAN 3656 e.g., by the adapter 3658 or modem 3660, respectively. Upon connecting the computer 3602 to an associated cloud storage system, the external storage interface 3626 can, with the aid of the adapter 3658 and/or modem 3660, manage storage provided by the cloud storage system as it would other types of external storage. For instance, the external storage interface 3626 can be configured to provide access to cloud storage sources as if those sources were physically connected to the computer 3602.

The computer 3602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a network or simply an ad hoc communication between at least two devices.

Figure 37:
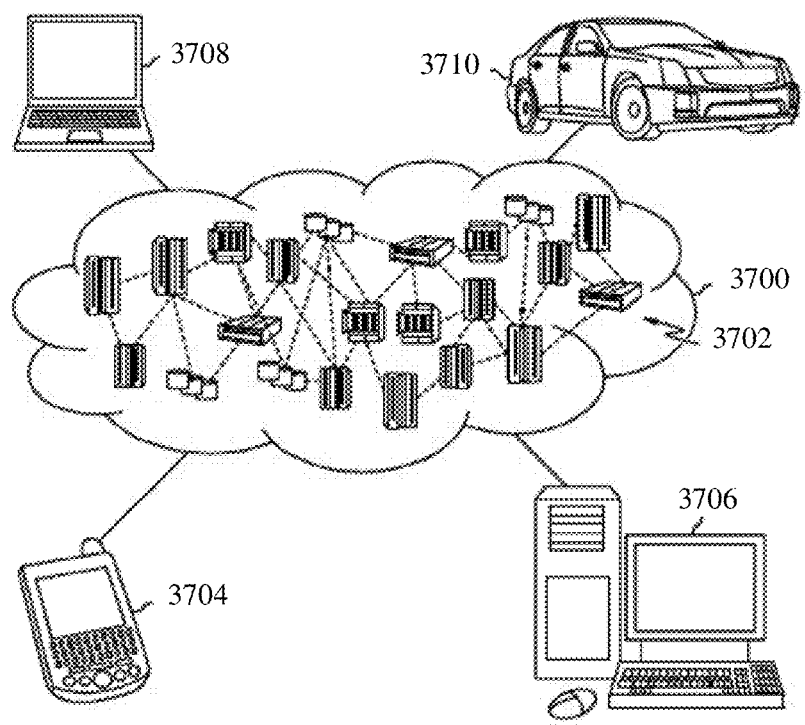
FIG. 37 illustrates an example, non-limiting cloud computing environment in accordance with one or more embodiments described herein.

Referring now to FIG. 37, illustrative cloud computing environment 3700 is depicted. As shown, cloud computing environment 3700 includes one or more cloud computing nodes 3702 with which local computing devices used by cloud consumers, such as, for example, personal digital assistant (PDA) or cellular telephone 3704, desktop computer 3706, laptop computer 3708, and/or automobile computer system 3710 may communicate. Nodes 3702 may communicate with one another. They may be grouped (not shown) physically or virtually, in one or more networks, such as Private, Community, Public, or Hybrid clouds as described hereinabove, or a combination thereof. This allows cloud computing environment 3700 to offer infrastructure, platforms and/or software as services for which a cloud consumer does not need to maintain resources on a local computing device. It is understood that the types of computing devices 3704-3710 shown in FIG. 37 are intended to be illustrative only and that computing nodes 3702 and cloud computing environment 3700 can communicate with any type of computerized device over any type of network and/or network addressable connection (e.g., using a web browser).

Figure 38:
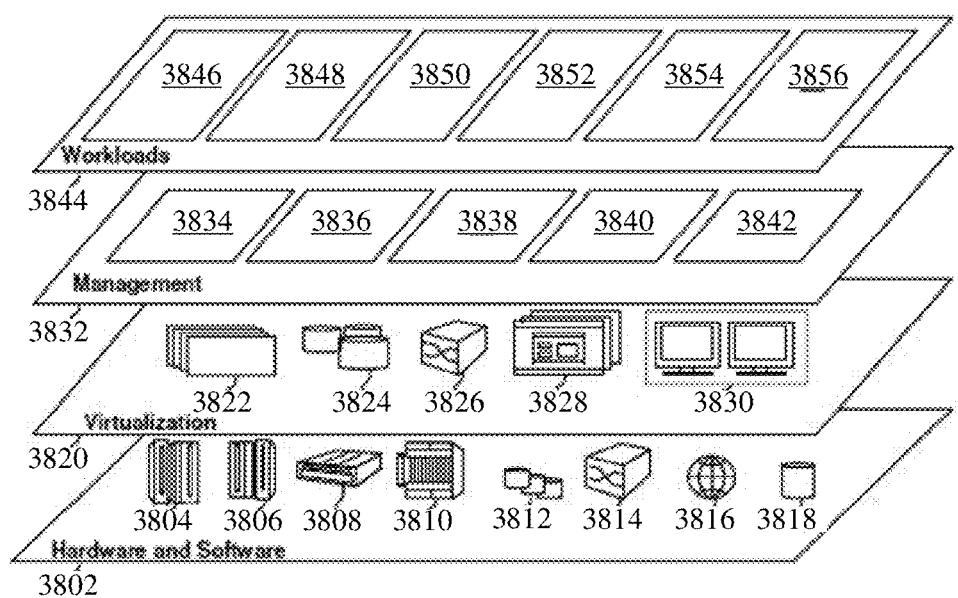
FIG. 38 illustrates example, non-limiting abstraction model layers in accordance with one or more embodiments described herein.

Referring now to FIG. 38, a set of functional abstraction layers provided by cloud computing environment 3700 (FIG. 37) is shown. Repetitive description of like elements employed in other embodiments described herein is omitted for sake of brevity. It should be understood in advance that the components, layers, and functions shown in FIG. 38 are intended to be illustrative only and embodiments of the invention are not limited thereto. As depicted, the following layers and corresponding functions are provided.

Hardware and software layer 3802 includes hardware and software components. Examples of hardware components include: mainframes 3804; RISC (Reduced Instruction Set Computer) architecture based servers 3806; servers 3808; blade servers 3810; storage devices 3812; and networks and networking components 3814. In some embodiments, software components include network application server software 3816 and database software 3818.

Virtualization layer 3820 provides an abstraction layer from which the following examples of virtual entities may be provided: virtual servers 3822; virtual storage 3824; virtual networks 3826, including virtual private networks; virtual applications and operating systems 3828; and virtual clients 3830.

In one example, management layer 3832 may provide the functions described below. Resource provisioning 3834 provides dynamic procurement of computing resources and other resources that are utilized to perform tasks within the cloud computing environment. Metering and Pricing 3836 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 3838 provides access to the cloud computing environment for consumers and system administrators. Service level management 3840 provides cloud computing resource allocation and management such that required service levels are met. Service Level Agreement (SLA) planning and fulfillment 3842 provide pre-arrangement for, and procurement of, cloud computing resources for which a future requirement is anticipated in accordance with an SLA.

Workloads layer 3844 provides examples of functionality for which the cloud computing environment may be utilized. Examples of workloads and functions which may be provided from this layer include: mapping and navigation 3846; software development and lifecycle management 3848; virtual classroom education delivery 3850; data analytics processing 3852; transaction processing 3854; and differentially private federated learning processing 3856. Various embodiments of the present invention can utilize the cloud computing environment described with reference to FIGS. 37 and 38 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor, operably coupled to a memory, that executes computer-executable components stored in the memory, wherein the computer-executable components comprise:
a partition component that partitions Pauli operators of a Hamiltonian into one or more subsets of commuting Pauli operators;
a diagonalization component that generates respective simultaneous-diagonalization circuits corresponding to the one or more subsets, wherein a simultaneous-diagonalization circuit of the respective simultaneous-diagonalization circuits diagonalizes the commuting Pauli operators in a corresponding subset; and
a simulation component that generates a concatenated circuit based on a concatenation of the respective simultaneous-diagonalization circuits, respective exponentiation circuits corresponding to the one or more subsets, and respective adjoints of the respective simultaneous-diagonalization circuits, wherein the simulation component rearranges an order of the commuting Pauli operators in at least one subset of the one or more subsets to cancel one or more adjacent CNOT gates in the concatenated circuit.

2. The system of claim 1, further comprising:
an exponentiation component that generates the respective exponentiation circuits corresponding to the one or more subsets, wherein an exponentiation circuit of the respective exponentiation circuits exponentiates the diagonalized commuting Pauli operators in the corresponding subset.

3. The system of claim 2, wherein the simulation component simulates a time evolution of the Hamiltonian based on the concatenated circuit.

4. The system of claim 1, wherein the partition component partitions the Pauli operators based on sequential greedy partitioning.

5. The system of claim 1, wherein the diagonalization component generates the respective simultaneous-diagonalization circuits by representing the one or more subsets in one or more tableaus respectively comprising one or more X-blocks and one or more Z-blocks.

6. The system of claim 5, wherein the diagonalization component generates the respective simultaneous-diagonalization circuits by diagonalizing and clearing the one or more X-blocks via Clifford operators and row and column manipulations.

7. The system of claim 6, wherein the diagonalization component updates the one or more Z-blocks via pairwise elimination, elimination by CNOT operations, or column-based elimination, wherein nonzero columns in the one or more X-blocks correspond to zeros or identical columns in the one or more Z-blocks.

8. The system of claim 7, wherein the diagonalization component clears the one or more X-blocks by applying Hadamard and phase gates.

9. A computer-implemented method, comprising:
partitioning, by a device operatively coupled to a processor, Pauli operators of a Hamiltonian into one or more subsets of commuting Pauli operators;
generating, by the device, respective simultaneous-diagonalization circuits corresponding to the one or more subsets, wherein a simultaneous-diagonalization circuit of the respective simultaneous-diagonalization circuits diagonalizes the commuting Pauli operators in a corresponding subset; and
generating, by the device, a concatenated circuit based on a concatenation of the respective simultaneous-diagonalization circuits, respective exponentiation circuits corresponding to the one or more subsets, and respective adjoints of the respective simultaneous-diagonalization circuits, wherein the generating of the concatenated circuit comprises rearranging an order of the commuting Pauli operators in at least one subset of the one or more subsets to cancel one or more adjacent CNOT gates in the concatenated circuit.

10. The computer-implemented method of claim 9, further comprising:

generating, by the device, the respective exponentiation circuits corresponding to the one or more subsets, wherein an exponentiation circuit of the respective exponentiation circuits exponentiates the diagonalized commuting Pauli operators in the corresponding subset.

11. The computer-implemented method of claim 10, further comprising:
simulating, by the device, a time evolution of the Hamiltonian based on the concatenated circuit.

12. The computer-implemented method of claim 9, wherein the partitioning the Pauli operators is based on sequential greedy partitioning.

13. The computer-implemented method of claim 9, wherein the generating the respective simultaneous-diagonalization circuits comprises representing, by the device, the one or more subsets in one or more tableaus respectively comprising one or more X-blocks and one or more Z-blocks.

14. The computer-implemented method of claim 13, wherein the generating the respective simultaneous-diagonalization circuits comprises diagonalizing and clearing, by the device, the one or more X-blocks via Clifford operators and row and column manipulations.

15. The computer-implemented method of claim 14, wherein the generating the respective simultaneous-diagonalization circuits comprises updating, by the device, the one or more Z-blocks via pairwise elimination, elimination by CNOT operations, or column-based elimination, wherein nonzero columns in the one or more X-blocks correspond to zeros or identical columns in the one or more Z-blocks.

16. The computer-implemented method of claim 15, wherein the generating the respective simultaneous-diagonalization circuits comprises clearing, by the device, the one or more X-blocks by applying Hadamard and phase gates.

17. A computer program product for facilitating Hamiltonian simulation based on simultaneous-diagonalization, the computer program product comprising a computer readable memory having program instructions embodied therewith, the program instructions executable by a processor to cause the processor to:

partition, by the processor, Pauli operators of a Hamiltonian into one or more subsets of commuting Pauli operators; and
generate, by the processor, respective simultaneous-diagonalization circuits corresponding to the one or more subsets, wherein a simultaneous-diagonalization circuit of the respective simultaneous-diagonalization circuits diagonalizes the commuting Pauli operators in a corresponding one of the one or more subset; and
generate, by the processor, a concatenated circuit based on a concatenation of the respective simultaneous-diagonalization circuits, respective exponentiation circuits corresponding to the one or more subsets, and respective adjoints of the respective simultaneous-diagonalization circuits, wherein the generation of the concatenated circuit comprises rearrangement an order of the commuting Pauli operators in at least one subset of the one or more subsets to cancel one or more adjacent CNOT gates in the concatenated circuit.

18. The computer program product of claim 17, wherein the program instructions are further executable to cause the processor to:
generate, by the processor, the respective exponentiation circuits corresponding to the one or more subsets, wherein an exponentiation circuit of the respective exponentiation circuits exponentiates the diagonalized commuting Pauli operators in the corresponding one of the subset.

19. The computer program product of claim 18, wherein the program instructions are further executable to cause the processor to:
simulate, by the processor, a time evolution of the Hamiltonian based on the concatenated circuit.

20. The computer program product of claim 17, wherein the program instructions are further executable to cause the processor to partition the Pauli operators based on sequential greedy partitioning.

* * * * *